(12) United States Patent
Yeon et al.

(10) Patent No.: US 11,243,738 B2
(45) Date of Patent: Feb. 8, 2022

(54) DISPLAY DEVICE AND METHOD OF DRIVING THE SAME

(71) Applicant: Samsung Display Co., Ltd., Yongin-si (KR)

(72) Inventors: Eun Kyung Yeon, Suwon-si (KR); Yi Joon Ahn, Seoul (KR); Ga Na Kim, Icheon-si (KR); Jung Hun Noh, Yongin-si (KR); Jae Been Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 115 days.

(21) Appl. No.: 16/695,157

(22) Filed: Nov. 25, 2019

(65) Prior Publication Data

US 2020/0233629 A1 Jul. 23, 2020

(30) Foreign Application Priority Data

Jan. 22, 2019 (KR) .................. 10-2019-0008201

(51) Int. Cl.
*G06F 3/16* (2006.01)
*G10K 9/125* (2006.01)
*G06F 1/16* (2006.01)

(52) U.S. Cl.
CPC .............. *G06F 3/16* (2013.01); *G06F 1/1605* (2013.01); *G06F 1/1626* (2013.01); *G10K 9/125* (2013.01); *G06F 1/1688* (2013.01)

(58) Field of Classification Search
USPC ...... 381/61, 63, 64, 164, 178, 191, 333, 388
See application file for complete search history.

(56) References Cited

U.S. PATENT DOCUMENTS

| 8,059,105 | B2 | 11/2011 | Rosenberg et al. |
| 9,285,882 | B2* | 3/2016 | Wang .................... B06B 1/0603 |
| 2018/0317012 | A1* | 11/2018 | Lee ........................ H04R 7/045 |
| 2020/0059713 | A1 | 2/2020 | Noh et al. |
| 2020/0077169 | A1 | 3/2020 | Noh et al. |

FOREIGN PATENT DOCUMENTS

| JP | 2010166515 | 7/2010 |
| KR | 100576266 | 5/2006 |
| KR | 1020100015490 | 2/2010 |
| KR | 1020190076080 | 7/2019 |
| KR | 1020200019811 | 2/2020 |
| KR | 1020200028056 | 3/2020 |

* cited by examiner

*Primary Examiner* — Yosef K Laekemariam
(74) *Attorney, Agent, or Firm* — Cantor Colburn LLP

(57) ABSTRACT

A display device includes: a display panel; a first sound generating device disposed below the display panel, where the first sound generating device generates a sound by causing the display panel to vibrate; and a second sound generating device disposed below the display panel, where the second generating sound generating device generates a sound by causing the display panel to vibrate. The first sound generating device includes: a first vibrator which vibrates in a first direction, which is a thickness direction of the display panel; and a second vibrator which vibrates in the first direction, and the second sound generating device includes: a third vibrator which vibrates in the first direction; and a fourth vibrator which vibrates in a second direction, which is perpendicular to the first direction.

20 Claims, 41 Drawing Sheets

↑ POLARIZATION DIRECTION

DISPLAY DEVICE AND METHOD OF DRIVING THE SAME

This application claims priority to Korean Patent Application No. 10-2019-0008201, filed on Jan. 22, 2019, and all the benefits accruing therefrom under 35 U.S.C. § 119, the content of which in its entirety is herein incorporated by reference.

BACKGROUND

1. Field

The disclosure relates to a display device and a method of driving the display device.

2. Description of the Related Art

As the information society develops, the demand for display devices for displaying images has increased and diversified. Display devices have been applied to a variety of electronic devices such as a smart phone, a digital camera, a notebook computer, a navigation device, and a smart television ("TV"), for example. A display device may include a display panel for displaying images and a sound generating device for providing sounds.

SUMMARY

As display devices are widely applied to various electronic devices, display devices having various designs are desired. For example, for a smart phone, a display device capable of having a sound generating device for outputting the voice of the other party of a call removed from the front surface thereof, and thereby capable of widening a display area, is desired.

Embodiments of the disclosure provide a display device capable of outputting sounds and providing low-noise haptic feedback to a user using a sound generating device that is not exposed to an outside.

Embodiments of the disclosure provide a method of driving a display device capable of outputting sounds and providing low-noise haptic feedback to a user using sound generating devices that are not exposed to the outside.

According to an embodiment of the disclosure, a display device includes: a display panel; a first sound generating device disposed below the display panel, where the first sound generating device generates a sound by causing the display panel to vibrate; and a second sound generating device disposed below the display panel, where the second generating sound generating device generates a sound by causing the display panel to vibrate. In such an embodiment, the first sound generating device includes: a first vibrator which vibrates in a first direction, which is a thickness direction of the display panel; and a second vibrator which is vibrates in the first direction, and the second sound generating device includes: a third vibrator which vibrates in the first direction; and a fourth vibrator which vibrates in a second direction, which is perpendicular to the first direction.

According to an embodiment of the disclosure, a method of driving a display device includes: outputting sounds in a sound output mode by causing a display panel of the display device to vibrate in a first direction using first and second sound generating devices of the display device; and providing haptic feedback in a haptic mode by causing the display panel to vibrate in a second direction, which is perpendicular to the first direction, using the second sound generating device.

According to embodiments of the disclosure, a display device selectively provides sounds and haptic feedback to the user using first and second sound generating devices that are disposed below a display panel. Thus, a front speaker may be removed from the front of a display device, and as a result, an area in which images are displayed may be widened at the front of the display device.

In such embodiments, since the display device includes vibrators vibrating in different directions, not only stereo sounds, but also low-noise haptic feedback, may be provided to the user.

Other features and embodiments may be apparent from the following detailed description, the drawings, and the claims.

BRIEF DESCRIPTION OF THE DRAWINGS

The above and other embodiments and features of the disclosure will become more apparent by describing in detail embodiments thereof with reference to the attached drawings, in which.

DETAILED DESCRIPTION

Figure 1:
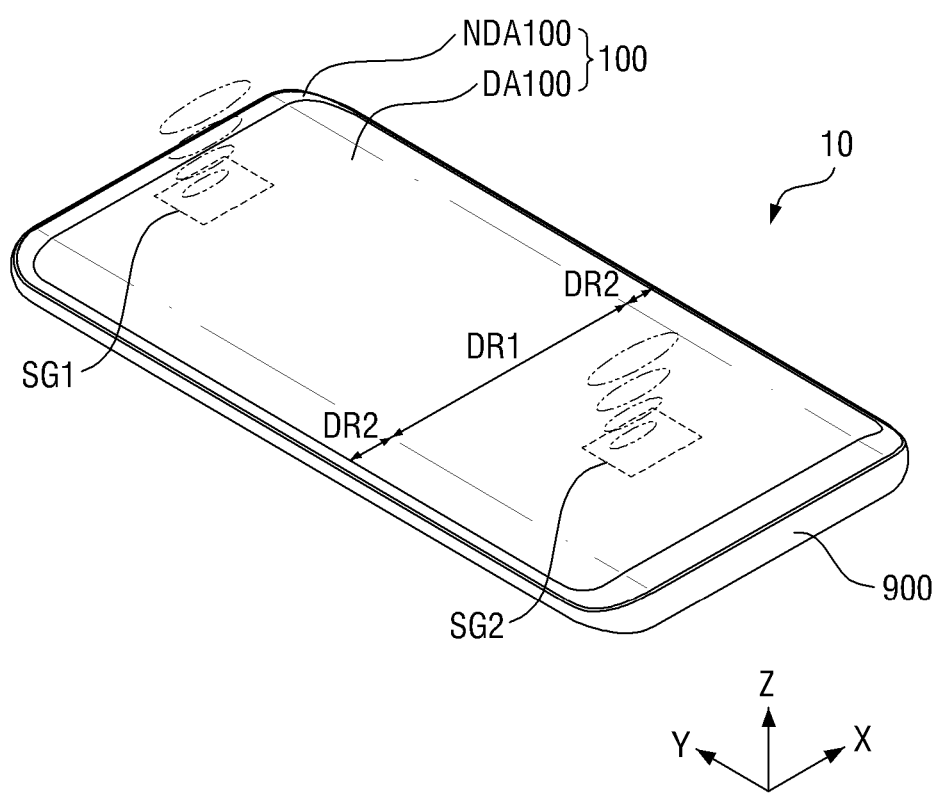
FIG. 1 is a perspective view of a display device according to an embodiment of the disclosure.

Features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. "Or" means "and/or." As used herein, the term "and/or" includes any and all combinations of one or more of the associated listed items. "At least one of A and B" means "A or B." It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Throughout the specification, the same reference numerals are used for the same or similar elements.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Embodiments of the disclosure will hereinafter be described in detail with reference to the accompanying drawings.

Figure 2:
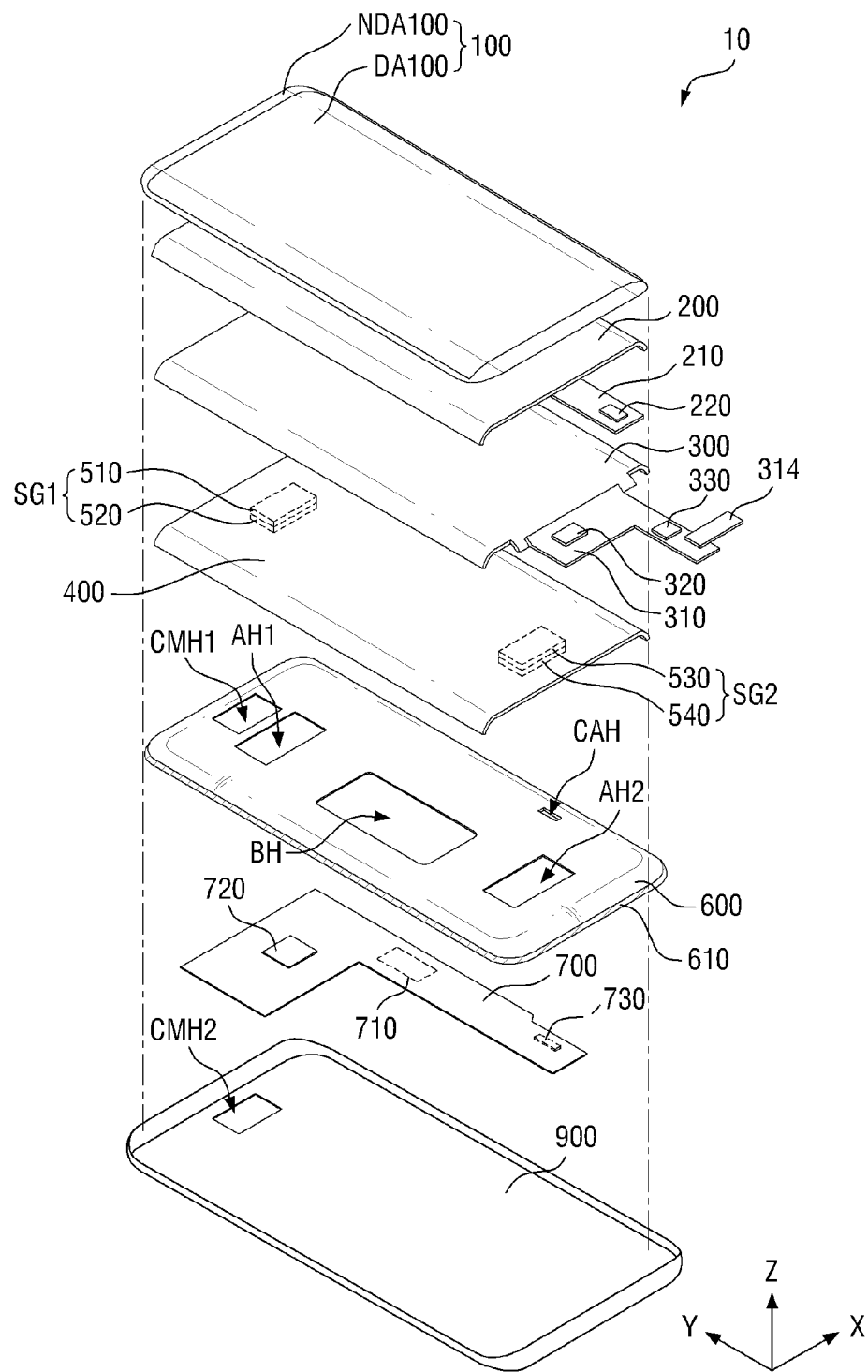
FIG. 2 is an exploded perspective view of the display device of FIG. 1.

FIG. 1 is a perspective view of a display device according to an embodiment of the disclosure. FIG. 2 is an exploded perspective view of the display device of FIG. 1.

Referring to FIGS. 1 and 2, an embodiment of a display device 10 includes a cover window 100, a touch sensing device 200, a touch circuit board 210, a touch driving unit 220, a display panel 300, a display circuit board 310, a display driving unit 320, a panel bottom member 400, a first sound generating device SG1, a second sound generating device SG2, a middle frame 600, a main circuit board 700, and a lower cover 900.

The terms "above", "top", and "top surface", as used herein, denote a direction in which the cover window 100 is disposed with respect to the display panel 300, i.e., a Z-axis direction, and the terms "below", "bottom", and "bottom surface", as used herein, denote a direction in which the middle frame 600 is disposed with respect to the display panel 300, i.e., the direction opposite to the Z-axis direction. Also, the terms "left", "right", "upper", and "lower", as used herein, denote their respective corresponding directions as viewed from above the display panel 300. For example, the term "left" denotes the direction opposite to an X-axis direction, the term "right" denotes the X-axis direction, the term "upper" denotes a Y-axis direction, and the term "lower" denotes the direction opposite to the Y-axis direction.

In an embodiment, the display device 10 may have a rectangular shape in a plan view. Herein, "in a plan view" may mean "when viewed from a plan view in a thickness direction of the display device 10 or the Z-axis direction. In one embodiment, for example, when viewed form a plan view, the display device 10 may have a rectangular shape having short sides extending in a first direction (or the X-axis direction) and long sides extending in a second direction (or a Y-axis direction). The corners where the short sides and the long sides meet may be rounded or right-angled. The planar shape of the display device 10 is not particularly limited, and the display device 10 may be in one of various other shapes other than a rectangular shape such as a polygonal shape, a circular shape, and an elliptical shape.

In an embodiment, as shown in FIG. 1, the display device 10 may include a first area DR1, which is flat, and second areas DR2, which extend from the left and right sides of the first area DR1. The second areas DR2 may be flat or curved. In such an embodiment where the second areas DR2 are flat, the first area DR1 and the second areas DR2 may form an obtuse angle with each other. In an embodiment where the second areas DR2 are curved, the second areas DR2 may have a predetermined curvature or a variable curvature.

FIG. 1 illustrates an embodiment where the second areas DR2 as extending from the left and right sides of the first area DR1, but the disclosure is not limited thereto. Alternatively, the second areas DR2 may extend from only one of the left and right sides of the first area DR1. In some embodiments, the second areas DR2 may extend not only from the left and right sides, but also from the top and bottom sides of the first area DR1. Hereinafter, for convenience of description, embodiments where the second areas DR2 are disposed along the left and right edges of the display device 10 will be described in detail.

Figure 6:
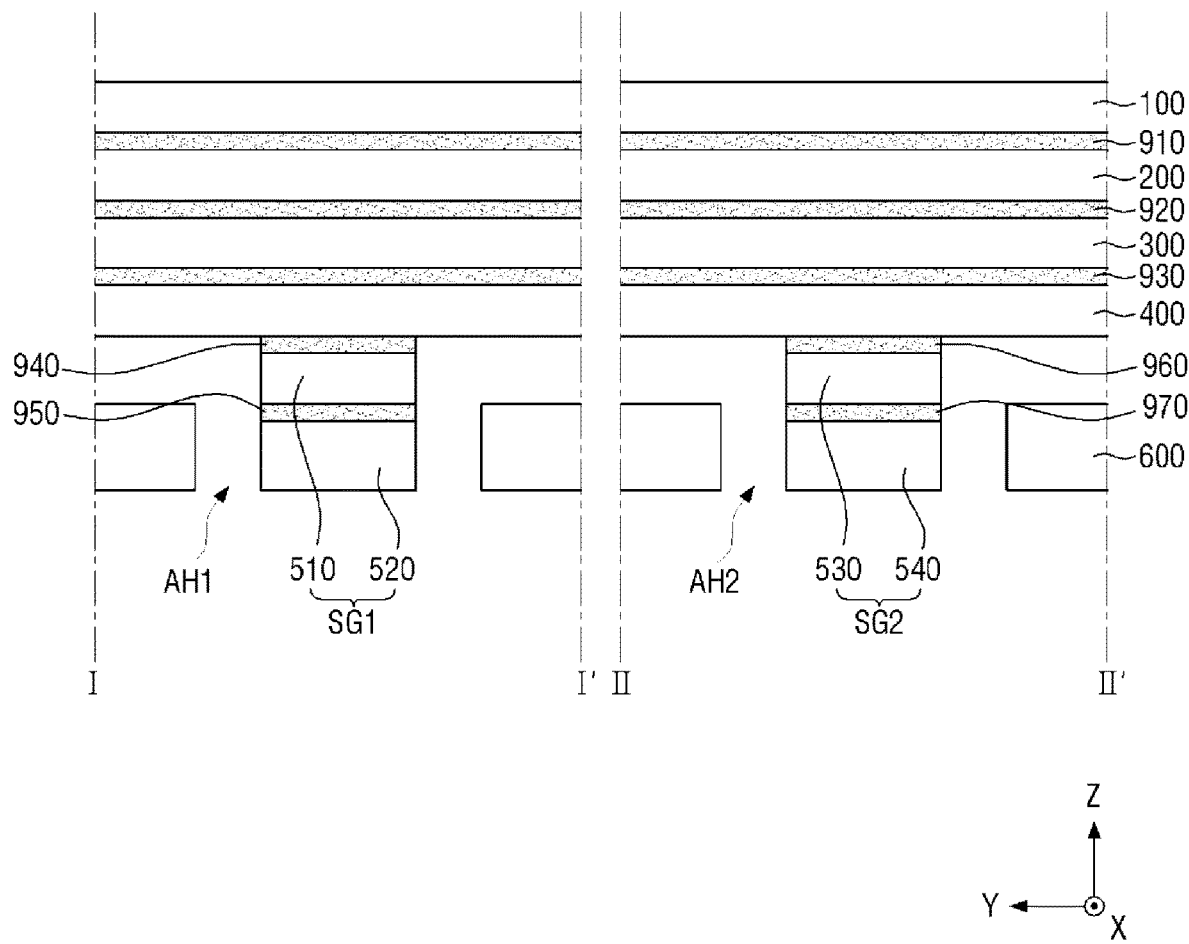
FIG. 6 is a cross-sectional view taken along lines I-I' and II-II' of FIG. 3 or 4.

The cover window 100 may be disposed on the display panel 300 to cover the top surface of the display panel 300. Accordingly, the cover window 100 may protect the top surface of the display panel 300. As illustrated in FIG. 6, the cover window 100 may be attached to the touch sensing device 200 via a first adhesive member 910. The first adhesive member 910 may be an optically clear adhesive ("OCA") or an optically clear resin ("OCR").

The cover window 100 may include a light-transmitting portion DA100, which corresponds to the display panel 300, and a light-blocking portion NDA100, which corresponds to the remaining portion of the display device 10 in a plan view. The cover window 100 may be disposed in the first area DR1 and the second areas DR2. The light-transmitting portion DA100 may be disposed in parts of the first area DR1 and the second areas DR2. The light-blocking portion NDA100 may be opaque. In an embodiment where the light-blocking portion NDA100 does not display an image, the light-blocking portion NDA100 may be a decorative layer that can be seen by a user. In one embodiment, for example, a company's logo such as "SAMSUNG" or a string of various characters or letters may be patterned into the light-blocking portion NDA100. Also, a hole, which are for exposing a front camera, a front speaker, an infrared (IR) sensor, an iris recognition sensor, and an illumination sensor, may be defined or formed in the light-blocking portion NDA100, but the disclosure is not limited thereto. In one embodiment, for example, some or all of the front camera, the front speaker, the IR sensor, the iris recognition sensor, and the illumination sensor may be embedded in the display panel 300, and no holes may be defined or formed in the display panel 300.

The cover window 100 may include or be formed of glass, sapphire, and/or plastic. The cover window 100 may be rigid or flexible.

The touch sensing device 200 may be disposed between the cover window 100 and the display panel 300. The touch sensing device 200 may be disposed in the first area DR1 and the second areas DR2. Accordingly, a touch input from the user may be detected not only in the first area DR1, but also in the second areas DR2.

As illustrated in FIG. 6, the touch sensing device 200 may be attached to the bottom surface of the cover window 100 via the first adhesive member 910. In an embodiment, a polarizing film may be further disposed on the top of the touch sensing device 200 to prevent the degradation of visibility that may be caused by the reflection of external light. In such an embodiment, the polarizing film may be attached to the bottom surface of the cover window 100 via the first adhesive member 910.

The touch sensing device 200, which is a device for detecting the location of a touch input from the user, may be implemented as a capacitive type such as a self-capacitance type or a mutual capacitance type. In an embodiment where the touch sensing device 200 is implemented as the self-capacitance type, the touch sensing device 200 may include only touch driving electrodes. In an alternative embodiment where the touch sensing device 200 is implemented as the mutual capacitance type, the touch sensing device 200 may include touch driving electrodes and touch sensing electrodes. Hereinafter, for convenience of description, embodiments where the touch sensing device 200 is the mutual capacitance type will be described in detail.

In an embodiment, the touch sensing device 200 may be formed as or in the form of a panel or a film. In such an embodiment, the touch sensing device 200 may be attached to a thin-film encapsulation film of the display panel 300 via a second adhesive member 920, as illustrated in FIG. 6. The second adhesive member 920 may be an OCA or an OCR.

Alternatively, the touch sensing device 200 may be integrally formed with the display panel 300 as a single unitary body. In such an embodiment, the touch driving electrodes and the touch sensing electrodes of the touch sensing device 200 may be formed on the thin-film encapsulation film of the display panel 300 or on an encapsulation substrate or film covering a light-emitting element layer of the display panel 300.

Figure 3:
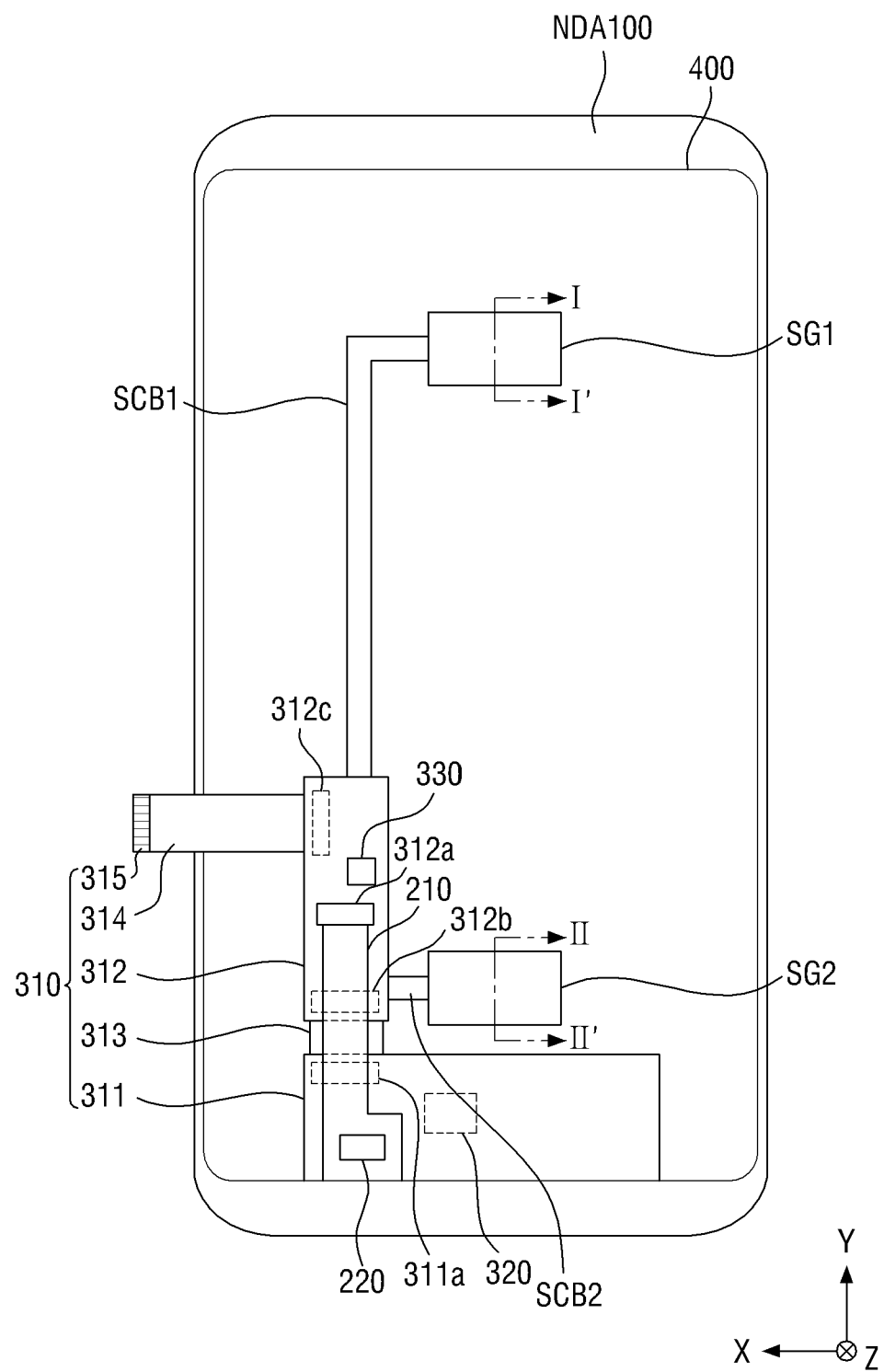
FIG. 3 is a bottom view illustrating a cover window, a touch circuit board, a display panel, a display circuit board, a panel bottom member, a first sound generating device, a second sound generating device, a first sound circuit board, and a second sound circuit board of FIG. 2.

The touch circuit board 210 may be attached to a side of the touch sensing device 200. In an embodiment, one end of the touch circuit board 210 may be attached to pads provided on one side of the touch sensing device 200 via an anisotropic conductive film. As illustrated in FIG. 3, a touch connecting portion may be provided at the other end of the touch circuit board 210 and may be connected to a touch connector 312a of the display circuit board 310. The touch circuit board 210 may be a flexible printed circuit board.

The touch driving unit 220 may apply touch driving signals to the touch driving electrodes of the touch sensing device 200, may detect sensing signals from the touch sensing electrodes of the touch sensing device 200, and may calculate the location of a touch input from the user by analyzing the detected sensing signals. The touch driving unit 220 may be formed as an integrated circuit and may be disposed or mounted on the touch circuit board 210.

The display panel 300 may be disposed below the touch sensing device 200. The display panel 300 may be disposed to overlap the light-transmitting portion 100DA of the cover window 100 in a plan view. The display panel 300 may be disposed in the first area DR1 and the second areas DR2. Accordingly, in such an embodiment, an image from the display panel 300 can be seen not only in the first area DR1, but also in the second areas DR2.

The display panel 300 may be a light-emitting display panel including light-emitting elements. In one embodiment, for example, the display panel 300 may be an organic light-emitting diode ("OLED") display panel using OLEDs, a micro-light-emitting diode ("mLED") display panel using mLEDs, or a quantum-dot light-emitting diode ("QLED") display panel using QLEDs. Hereinafter, for convenience of description, embodiments where the display panel 300 is an OLED display panel will be described in detail. The display panel 300 will be described later in greater detail with reference to FIG. 40.

The display circuit board 310 may be attached to one side of the display panel 300. In an embodiment, one end of the display circuit board 310 may be attached to pads provided on one side of the display panel 300 via an anisotropic conductive film. The display circuit board 310 may be bent toward the bottom surface of the display panel 300. The touch circuit board 210 may also be bent toward the bottom surface of the display panel 300. Accordingly, in such an embodiment, the touch connecting portion provided at the touch circuit board 210 may be connected to the touch connector 312a of the display circuit board 310. The display circuit is board 310 will be described later in greater detail with reference to FIGS. 3 through 5.

The display driving unit 320 outputs, via the display circuit board 310, signals and voltages for driving the display panel 300. The display driving unit 320 may be formed as an integrated circuit and may be disposed or mounted on the display circuit board 310, but the disclosure is not limited thereto. In one alternative embodiment, for example, the display driving unit 320 may be attached directly to the display panel 300, and the display driving unit 320 may be attached to the top surface or the bottom surface of the display panel 300.

The panel bottom member 400 may be disposed below the display panel 300, as illustrated in FIG. 6. The panel bottom member 400 may be attached to the bottom surface of the display panel 300 via a third adhesive member 930. The third adhesive member 930 may be an OCA or an OCR.

The panel bottom member 400 may include at least one of a light-absorbing member for absorbing incident light from the outside, a buffer member for absorbing shock from the outside, a heat dissipation member for effectively releasing heat from the display panel 300, and a light-shielding layer for blocking incident light from the outside.

The light-absorbing member may be disposed below the display panel 300. The light-absorbing member blocks the transmission of light and thus effectively prevents the elements disposed therebelow, e.g., the first sound generating device SG1, the second sound generating device SG2, and the display circuit board 310, from becoming visible from above the display panel 300. The light-absorbing member may include a light-absorbing material such as a black pigment or dye.

The buffer member may be disposed below the light-absorbing member. The buffer member absorbs shock from an outside and thus effectively prevents the display panel 300 from being damaged. The buffer member may have a single layer structure or a multilayer structure.

In one embodiment, for example, the buffer member may include a polymer resin such as polyurethane, polycarbonate, polypropylene, or polyethylene or an elastic material such as a sponge obtained by foam-molding rubber, a urethane-based material or an acrylic material. The buffer member may be a cushion layer.

The heat dissipation member may be disposed below the buffer member. The heat dissipation member may include a first heat dissipation layer including graphite or carbon nanotubes and a second heat dissipation layer formed as a thin metal film using a metal having high thermal conductivity such as Cu, Ni, ferrite, or Ag.

The first and second sound generating devices SG1 and SG2 may be disposed below the panel bottom member 400. In an embodiment, as shown in FIG. 2, the first and second sound generating devices SG1 and SG2 may be disposed in the first area DR1, but the disclosure is not limited thereto. In some embodiments, the first and second sound generating devices SG1 and SG2 may be disposed in the second area DR2.

In some embodiments, the first and second sound generating devices SG1 and SG2 may be disposed adjacent to, and may overlap in the second direction (or the Y-axis direction) with, different short sides, but the disclosure is not limited thereto. In some embodiments, the first and second sound generating devices SG1 and SG2 may be disposed adjacent to, and may overlap in the first direction (or the X-axis direction) with, different long sides. In some embodiments, the first and second sound generating devices SG1 and SG2 may be disposed adjacent to, but may not overlap in the second direction (or the Y-axis direction) with, different short sides. In some embodiments, the first and second sound generating devices SG1 and SG2 may be disposed adjacent to, but may not overlap in the first direction (or the X-axis direction) with, different long sides.

The first sound generating device SG1 may include first and second vibrators 510 and 520. The first and second vibrators 510 and 520 may be disposed to overlap each other in a thickness direction, i.e., in a third direction (or a Z-axis direction). In such an embodiment, the first vibrator 510 may be attached to the bottom surface of the panel bottom member 400, and the second vibrator 520 may be attached to the bottom surface of the first vibrator 510. As illustrated in FIG. 6, the first vibrator 510 may be attached to the bottom surface of the panel bottom member 400 via a fourth adhesive member 940, and the second vibrator 520 may be attached to the bottom surface of the first vibrator 510 via a fifth adhesive member 950.

The second sound generating device SG2 may include third and fourth vibrators 530 and 540. The third and fourth vibrators 530 and 540 may be disposed to overlap each other in the thickness direction, i.e., in the third direction (or the Z-axis direction. In such an embodiment, the third vibrator 530 may be attached to the bottom surface of the panel bottom member 400, and the fourth vibrator 540 may be attached to the bottom surface of the third vibrator 530. As illustrated in FIG. 6, the third vibrator 530 may be attached to the bottom surface of the panel bottom member 400 via a sixth adhesive member 960, and the fourth vibrator 540 may be attached to the bottom surface of the third vibrator 530 via a seventh adhesive member 970.

The fourth, fifth, sixth, and seventh adhesive members 940, 950, 960, and 970 may be pressure sensitive adhesives ("PSA"s).

The first vibrator 510 may include a piezoelectric actuator. In such an embodiment, the first vibrator 510 may vibrate in the third direction (or the Z-axis direction) or in the opposite direction of the third direction (i.e., in the opposite direction of the Z-axis direction) by applying an alternating current ("AC") voltage to the piezoelectric actuator to allow the piezoelectric actuator to contract and expand. Due to the vibration of the first vibrator 510, the display panel 300 may vibrate vertically to output sounds.

The second vibrator 520 may include a linear resonant actuator ("LRA"). In such an embodiment, the second vibrator 520 may vibrate in the third direction (or the Z-axis direction) or in the opposite direction of the third direction (i.e., in the opposite direction of the Z-axis direction) by pressing a mass connected to a spring via a voice coil in response to an AC voltage being applied. Due to the vibration of the second vibrator 520, the display panel 300 may vibrate vertically to output sounds. However, the disclosure is not limited thereto. In some embodiments, the second vibrator 520 may include an exciter. In such an embodiment, the second vibrator 520 may cause the display panel 300 to vibrate in the third direction (or the Z-axis direction) or in the opposite direction of the third direction (i.e., in the opposite direction of the Z-axis direction) by generating a magnetic force using a voice coil.

The third direction (or the Z-axis direction) and the opposite direction of the third direction (i.e., the opposite direction of the Z-axis direction) will hereinafter be referred to as vertical directions, and the first direction (or the X-axis direction) and the opposite direction of the first direction (i.e., the opposite direction of the X-axis direction), or the second direction (or the Y-axis direction) and the opposite direction of the second direction (i.e., the opposite direction of the Y-axis direction), will hereinafter be referred to as horizontal directions. The first and second vibrators 510 and 520 may vibrate in the same vertical direction, such that sounds having a high sound pressure level in both low- and high-frequency ranges may be provided to the user. The sound pressure level of the first sound generating device SG1 will be described later in greater detail.

The third vibrator 530 may include a piezoelectric actuator. In such an embodiment, the third vibrator 530 may vibrate vertically by applying an AC voltage to the piezoelectric actuator so as for the piezoelectric actuator to contract and expand. Due to the vibration of the third vibrator 530, the display panel 300 may vibrate vertically to output sounds.

The fourth vibrator 540 may include an LRA. In such an embodiment, the fourth vibrator 540 may vibrate horizontally, i.e., in the first direction (or the X-axis direction) and the opposite direction of the first direction (i.e., the opposite direction of the X-axis direction), or in the second direction (or the Y-axis direction) and the opposite direction of the second direction (i.e., the opposite direction of the Y-axis direction), by pressing a mass connected to a spring via a voice coil in response to an AC voltage being applied. That is, the fourth vibrator 540 may vibrate in a different direction from the first, second, and third vibrators 510, 520, and 530. In an embodiment, the first, second, and third vibrators 510, 520, and 530 may vibrate vertically, and the fourth vibrator 540 may vibrate horizontally. Due to the vibration of the fourth vibrator 540, the display panel 300 may vibrate vertically. The fourth vibrator 540 may vibrate at a higher amplitude, but within a narrower frequency range, than the first, second, and third vibrators 510, 520, and 530. Accordingly, in such an embodiment, the fourth vibrator 540 may provide haptic feedback to the user.

In some embodiments, the first vibrator 510 of the first sound generating device SG1 may be a piezoelectric actuator capable of vibrating vertically, and the second vibrator 520 of the first sound generating device SG1 may be an LRA capable of vibrating vertically. In such an embodiment, the first vibrator 510 may have a higher sound pressure level than the second vibrator 520 in a high-frequency range, and the second vibrator 520 may have a higher sound pressure level than the first vibrator 510 in a low-frequency range. Here, the low-frequency range refers to a range of frequencies of 1 kilohertz (kHz) or lower, and the high-frequency range refers to a range of frequencies higher than 1 kHz. Since sounds are output using the first and second vibrators 510 and 520, which both have a high sound pressure level in the high-frequency range, a high sound level can be provided for both the high- and low-frequency ranges.

The first sound generating device SG1 may be connected to the first sound circuit board SCB1, and the second sound generating device SG2 may be connected to the second sound circuit board SCB2. In an embodiment, one end of the first sound circuit board SCB1 may be connected to a first sound pad area provided at at least one side of the first sound generating device SG1. One end of the second sound circuit board SCB2 may be connected to a second sound pad area provided at at least one side of the second sound generating device SG2.

The first and second sound circuit boards SCB1 and SCB2 may be connected to the sound driving unit 330 of the display circuit board 310. Accordingly, the first and second sound generating devices SG1 and SG2 may vibrate based on the first and second driving voltages from the sound driving unit 330 and thus may output sounds or provide haptic feedback. In one embodiment, for example, the sound driving unit 330 may output sounds in a sound output mode by causing the display panel 300 to vibrate using the first and second vibrators 510 and 520 of the first sound generating device SG1 and using the third vibrator 530 of the second sound generating device SG2, and may provide haptic feedback to the user in a haptic mode by causing the display panel 300 to vibrate using the fourth vibrator 540 of the second sound generating device SG2.

The sound driving unit 330 may include a digital signal processor ("DSP") for processing a digital signal such as the first sound data or the second sound data, a digital-to-analog converter ("DAC") for converting the digital signal processed by the DSP into an analog signal, and an amplifier ("AMP") for amplifying the analog signal provided by the DAC and outputting the amplified analog signal.

The middle frame 600 may be disposed below the panel bottom member 400. The middle frame 600 may include a synthetic resin, a metal, or a combination thereof.

A first camera hole CMH1 in which a camera device 720 is inserted, a battery hole BH which is for releasing heat from a battery, and a through hole CAH that a second connection cable 314 connected to the display circuit board 310 passes through may be defined or formed in the middle frame 600. In such an embodiment, a first receiving hole AH1 for receiving the first sound generating device SG1 and a second receiving hole AH2 for receiving the second sound generating device SG2 may be defined or formed in the middle frame 600. The width of the first receiving hole AH1 may be greater than the width of the first sound generating device SG1, and the width of the second receiving hole AH2 may be greater than the width of the second sound generating device SG2. In some embodiments, the first and second receiving holes AH1 and AH2 may defined a single hole with the battery hole BH. In such an embodiment, the first and second receiving holes AH1 and AH2 and the battery hole BH may be connected to each other.

In some embodiments, the first and second sound generating devices SG1 and SG2 may be connected to the first heat dissipation layer and/or the second heat dissipation layer of the panel bottom member 400 such that the influence of heat generated by the first and second sound generating devices AG1 and AG2 on the display panel 300 may be minimized. In an embodiment where the first and second sound generating devices SG1 and SG2 overlap the battery hole BH in which a battery may be disposed, heat from the first and second sound generating devices SG1 and sG2 may not be effectively released due to the heat from the battery. Thus, the first and second sound generating devices SG1 and SG2 may be disposed not to overlap the battery hole BH in a plan view.

A waterproof member 610 may be disposed along the edges of the middle frame 600. The waterproof member 610 may be attached to the top surface of the panel bottom member 400 and the bottom surface of the middle frame 600, such that the penetration of moisture or dust between the display panel 300 and the middle frame 600 may be prevented by the waterproof member 610. In such an embodiment, a display device 10 may be waterproof and dustproof.

In an embodiment, the waterproof member 610 may include a base film, a first adhesive film disposed on one surface of the base film, and a second adhesive film disposed on the other surface of the base film. The base film may include polyethylene terephthalate ("PET"), PET and a cushion layer, or polyethylene ("PE") foam. The first and second adhesive films may be PSAs. The first adhesive film may be attached to the bottom surface of the panel bottom member 400, and the second adhesive film may be attached to the top surface of the middle frame 600.

The main circuit board 700 may be disposed below the middle frame 600. The main circuit board 700 may be a printed circuit board or a flexible printed circuit board.

The main circuit board 700 may include a main processor 710, the camera device 720, and a main connector 730. The main processor 710 and the main connector 730 may be disposed on the bottom surface of the main circuit board 700 to face the lower cover 900. The camera device 720 may be disposed on both the top surface and the bottom surface of the main circuit board 700.

The main processor 710 may control entire or overall functions of the display device 10. In one embodiment, for example, the main processor 710 may output image data to the display driving unit 320 of the display circuit board 310 so as for the display panel 300 to display an image. In such an embodiment, the main processor 710 may receive touch data from the touch driving unit 220, may determine the location of touch input from the user, and may execute an application corresponding to an icon displayed at the location of the touch input. In such an embodiment, the main processor 710 may receive touch data from the touch driving unit 220 and may execute an application corresponding to an icon displayed at the location of touch input from the user according to the touch data.

The main processor 710 may be an application processor, a central processing unit, or a system chip, which consists of an integrated circuit.

The camera device 720 processes image frames provided by an image sensor in a camera mode, such as a still image or a moving image, and outputs the processed image frames to the main processor 710.

The second connection cable 314, which passes through a through hole CAH of the middle frame 600, may be connected to the main connector 730 of the main circuit board 700. As a result, the main circuit board 700 may be electrically connected to the display circuit board 310 and the touch circuit board 210.

The sound driving unit 330 of the display circuit board 310 receives sound data from the main processor 710. The sound driving unit 330 may generate first and second driving voltages based on the sound data and may provide the first and second driving voltages to the first sound generating device SG1 via the first sound circuit board SCB1. Accordingly, the first sound generating device SG1 can vibrate and can thus output sounds. Also, the sound driving unit 330 may receive non-sound data or haptic data from the main processor 710, may generate an AC voltage based on the non-sound data or the haptic data, and may provide the AC voltage to the second sound generating device SG2 via the second sound circuit board SCB2. Accordingly, the second sound generating device SG2 may vibrate and thus output sounds or provide haptic feedback to the user. In some embodiments, a plurality of sound drivers may be provided. In one embodiment, for example, the sound driving unit 330 may include first and second sound drivers, and the first sound driver may receive first sound data from the main processor 710, may generate first and second driving voltages based on the first sound data, and may provide the first and second driving voltages to the first sound generating device SG1 via the first sound circuit board SCB1, and the second sound driver may receive second sound data and haptic data from the main processor 710, may generate first and second driving voltages based on the second sound data and the haptic data, and may provide the first and second driving voltages to the second sound generating device SG2 via the second sound circuit board SCB2.

A mobile communication module, which exchanges wireless signals with at least one of a base station, an external terminal, and a server via a mobile communication network, may be further provided on the main circuit board 700. The wireless signals may include various types of data associated with the transmission/reception of audio signals, video call signals, or text/multimedia messages.

The lower cover 900 may be disposed below the middle frame 600 and the main circuit board 700. The lower cover 900 may be coupled or fixed to the middle frame 600. The lower cover 900 may define the bottom exterior of the display device 100. The lower cover 900 may include a plastic and/or a metal.

A second camera hole CMH2, in which the camera device 720 is inserted to protrude outwardly, may be defined or formed in the lower cover 900. The location of the camera device 720 and the locations of the first and second camera holes CMH1 and CMH2 corresponding to the camera device 720 are not limited to those shown in FIG. 2.

According to an embodiment, as shown in FIGS. 1 and 2, the display device 10 not only provides sounds, which are output in the same direction, using the first and second sound generating devices SG1 and SG2, which are disposed below the display panel 300, but also provides haptic feedback to the user by causing the second sound generating device SG2 to vibrate. Accordingly, in such an embodiment a front speaker may be omitted from the front of the display device 10, such that the display area at the front of the display device 10 may be increased or widened.

Figure 4:
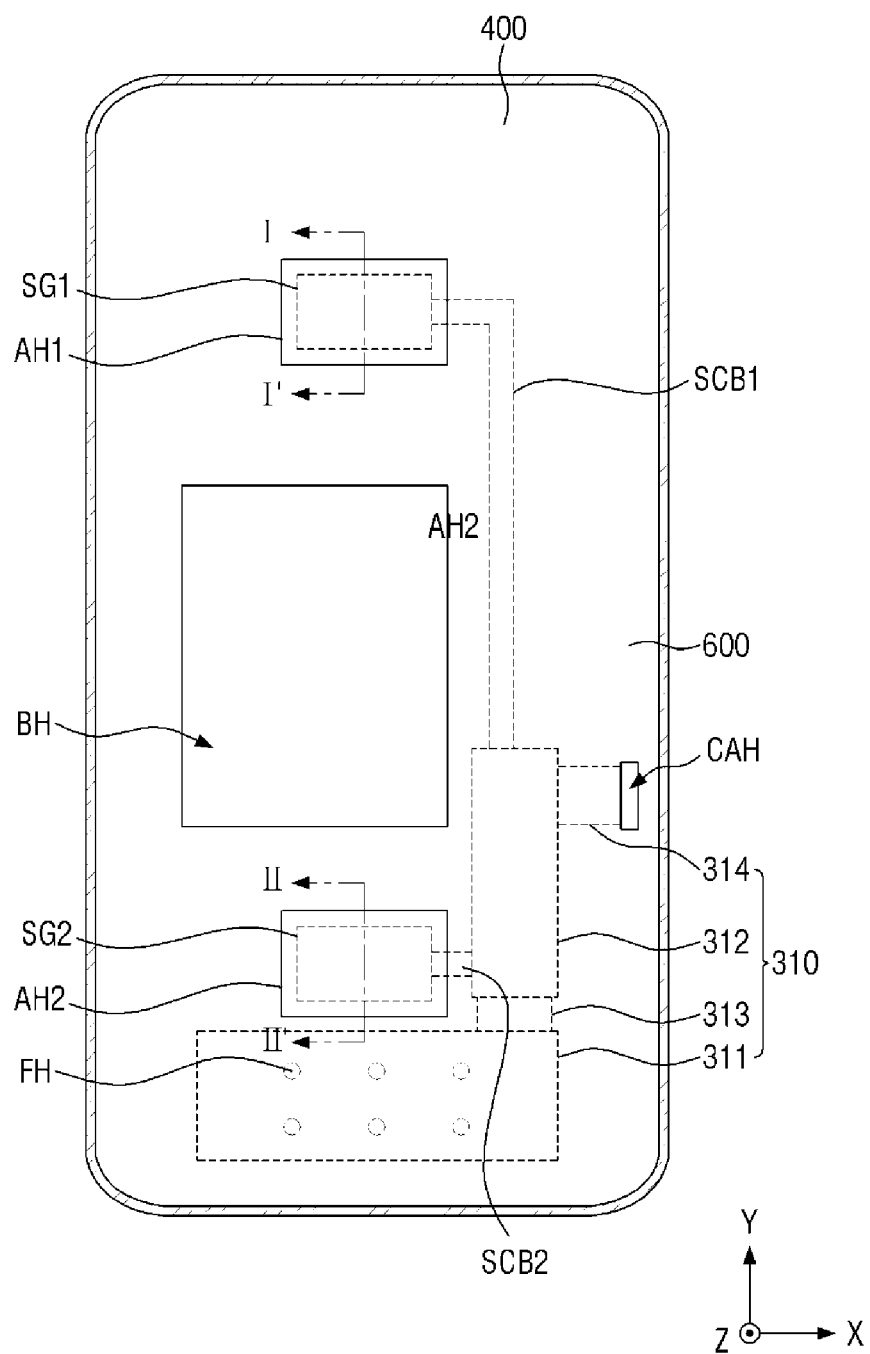
FIG. 4 is a plan view illustrating the display circuit board, a second connection cable, the first sound generating device, the first sound circuit board, the second sound generating device, the second sound circuit board, and a middle frame of FIG. 2.
Figure 5A:
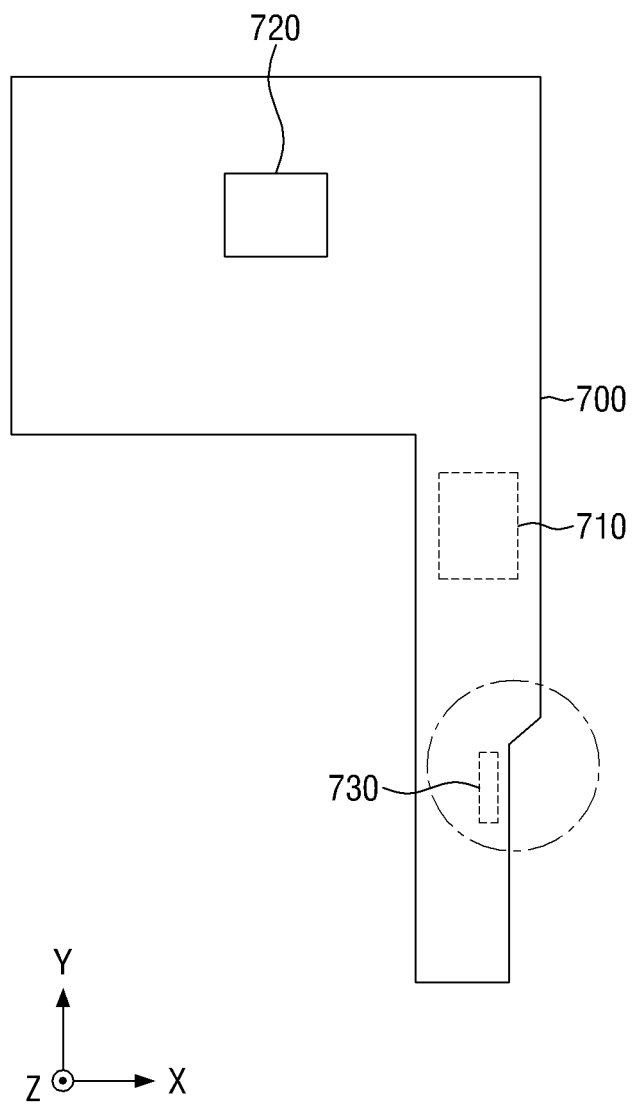
FIG. 5A is a plan view illustrating the second connection cable and the main circuit board of FIG. 2.
Figure 5B:
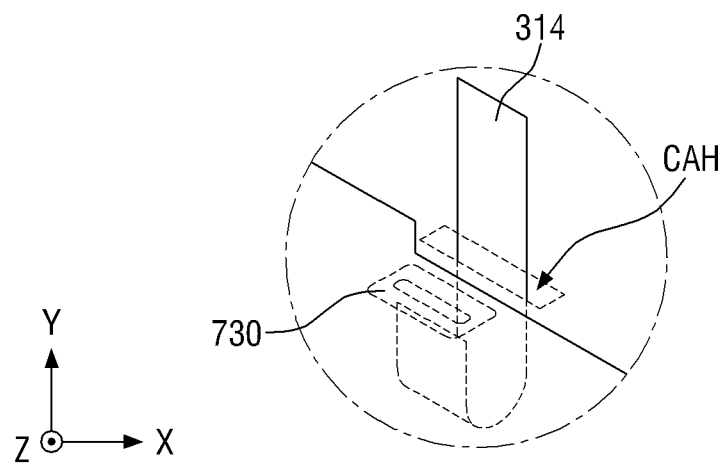
FIG. 5B is an enlarged view of the encircled portion of FIG. 5A.

FIG. 3 is a bottom view illustrating the cover window, the touch circuit board, the display panel, the display circuit board, the panel bottom member, the first sound generating device, the second sound generating device, the first sound circuit board, and the second sound circuit board of FIG. 2. FIG. 4 is a plan view illustrating the display circuit board, the second connection cable, the first sound generating device, the first sound circuit board, the second sound generating device, the second sound circuit board, and the middle frame of FIG. 2. FIG. 5A is a plan view illustrating the second connection cable and the main circuit board of FIG. 2, and FIG. 5B is an enlarged view of the encircled portion of FIG. 5A It will hereinafter be described, with reference to FIGS. 3 through 5B, how the first sound circuit board SCB1, which is connected to the first sound generating device SG1, is connected to the display circuit board 310, how the second sound circuit board SCB2, which is connected to the second sound generating device SG2, is connected to the display circuit board 310, and how the second connection cable 314, which is connected to the display circuit board 310, is connected to the main connector 730 of the main circuit board 700.

Referring to FIGS. 3 through 5B, in an embodiment, one end of the first sound circuit board SCB1 may be connected to the first sound pad area provided at least one side of the first sound generating device SG1. The first sound pad area may include first pad electrodes. In one embodiment, for example, the first sound pad area may include a first pad electrode of the first vibrator 510 and a first pad electrode of the second vibrator 520, and one end of the first sound circuit board SCB1 may be connected to the first pad electrodes of the first and second vibrators 510 and 520. The other end of the first sound circuit board SCB1 may be connected to the display circuit board 310 and may thus be connected to the sound driving unit 330.

One end of the second sound circuit board SCB2 may be connected to the second sound pad area provided at at least one side of the second sound generating device SG2. The second sound pad area may include second pad electrodes. In one embodiment, for example, the second sound pad area may include a second pad electrode of the third vibrator 530 and a second pad electrode of the fourth vibrator 540, and one end of the second sound circuit board SCB2 may be connected to the second pad electrodes of the third and fourth vibrators 530 and 540. The other end of the second sound circuit board SCB2 may be connected to the display circuit board 310 and may thus be connected to the sound driving unit 330.

In an embodiment, as shown in FIG. 3, the display circuit board 310 may include a first circuit board 311, a second circuit board 312, and a first connection cable 313.

The first circuit board 311 may be attached to one side of the top or bottom surface of the display panel 300 and may be bent toward the bottom surface of the display panel 300. In such an embodiment, as illustrated in FIG. 4, the first circuit board 311 may be inserted or fixed into fixing holes FH, which are defined or formed in the middle frame 600, by fixing members.

The first circuit board 311 may include the display driving unit 320 and a first connector 311a. The display driving unit 320 and the first connector 311a may be disposed on one surface of the first circuit board 311.

The first connector 311a may be connected to a first end of the first connection cable 313 connected to the second circuit board 312. As a result, the display driving unit 320 mounted on the first circuit boar 311 is electrically connected to the second circuit board 312 via the first connection cable 313.

The second circuit board 312 may include the sound driving unit 330, the touch connector 312a, a first connection connector 312b, and a second connection connector 312c. The first and second connection connectors 312b and 312c may be disposed on one surface of the second circuit board 312, and the touch connector 312a and the sound driving unit 330 may be disposed on another surface (e.g., the surface opposite to the one surface) of the second circuit board 312. However, the disclosure is not limited thereto. Alternatively, the sound driving unit 330, like the display driving unit 320, may be disposed on the first circuit board 311.

The touch connector 312a may be connected to the touch connecting portion provided at one end of the touch circuit board 210. As a result, the touch driving unit 220 of the touch circuit board 210 is be electrically connected to the second circuit board 312. The first and second sound circuit boards SCB1 and SCB2 may also be connected to the second circuit board 312, but the disclosure is not limited thereto. In some embodiments, the first and second sound circuit boards SCB1 and SCB2 may be connected to the first circuit board 311. In some embodiments, the first sound circuit board SCB1 may be connected to the second circuit board 312, and the second sound circuit board SCB2 may be connected to the first circuit board 311.

The first connection connector 312b may be connected to a second end of the first connection cable 313 connected to the first circuit board 311. As a result, the display driving unit 320 mounted on the first circuit board 311 is electrically connected to the second circuit board 312 via the first connection cable 313.

The second connection connector 312c may be connected to a first end of the second connection cable 314 connected to the main connector 730 of the main circuit board 700. As a result, the second circuit board 312 is electrically connected to the main circuit board 700 via the second connection cable 314.

A connector connection portion 315 may be defined or formed at a second end of the second connection cable 314. As illustrated in FIG. 4, the connector connection portion 315 of the second connection cable 314 may extend to the bottom of the middle frame 600 through the through hole CAH of the middle frame 600. In such an embodiment, as illustrated in FIGS. 5A and 5B, the connector connecting portion 315 of the second connection cable 314 passing through the through hole CAH may extend to the bottom of the main circuit board 700 through the gap between the middle frame 600 and the main circuit board 700. Accordingly, as illustrated in FIGS. 5A and 5B, the connector connecting portion 315 of the second connection cable 314 may be connected to the main connector 730, which is disposed on the bottom surface of the main circuit board 700.

In an embodiment, as shown in FIGS. 3 through 5, the second connection cable 314, which is connected to the display circuit board 310, may extend to the bottom of the middle frame 600 through the through hole CAH of the middle frame 600 and may be connected to the main connector 730 of the main circuit board 700. Accordingly, the display circuit board 310 and the main circuit board 700 can be stably connected.

FIG. 6 is a cross-sectional view taken along lines I-I' and II-II' of FIGS. 3 and 4.

The cover window 100, the touch sensing device 200, the display panel 300, the panel bottom member 400, the first adhesive member 910, the second adhesive member 920, and the third adhesive member 930 shown in FIG. 6 are substantially the same as those described above with reference to FIGS. 1 and 2, and thus, any repetitive detailed descriptions thereof will be omitted.

Referring to FIG. 6, the first sound generating device SG1 may be disposed below the panel bottom member 400. In an embodiment, the first vibrator 510 may be attached to the bottom surface of the panel bottom member 400 via the fourth adhesive member 940, and the second vibrator 520 may be attached to the bottom surface of the first vibrator 510 via the fifth adhesive member 950. However, the disclosure is not limited thereto. In some embodiments, the second vibrator 520 may be attached to the bottom surface of the panel bottom member 400 via the fourth adhesive member 940, and the first vibrator 510 may be attached to the bottom surface of the second vibrator 520 via the fifth adhesive member 950. The fourth and fifth adhesive members 940 and 950 may be PSAs, but the disclosure is not limited thereto. Alternatively, at least one of various other materials having a similar property as PSAs may be used as the fourth and fifth adhesive members 940 and 950.

The first and second vibrators 510 and 520 may overlap each other in the third direction (or the Z-axis direction). In some embodiments, the first and second vibrators 510 and 520 may have a same width as each other in the second direction (or the Y-axis direction), but the disclosure is not limited thereto. Alternatively, the width, in the second direction (or the Y-axis direction), of the second vibrator 520 may be greater than the width, in the second direction (or the Y-axis direction), of the first vibrator 510. The thickness, in the third direction (or the Z-axis direction), of the first vibrator 510 may be smaller than the thickness, in the third direction (or the Z-axis direction), of the second vibrator 520, but the disclosure is not limited thereto. Alternatively, the thickness, in the third direction (or the Z-axis direction), of the first vibrator 510 may be greater than, or the same as, the thickness, in the third direction (or the Z-axis direction), of the second vibrator 520.

The first sound generating device SG1 may overlap the first receiving hole AH1 in the third direction (or the Z-axis direction). In some embodiments, a part of the first sound generating device SG1 may be disposed in the first receiving hole AH1. In one embodiment, for example, the second vibrator 520 may be disposed in the first receiving hole AH1, but the disclosure is not limited thereto. Alternatively, a part of the first vibrator 510 and the entire second vibrator 520 may be disposed in the first receiving hole AH1, the entire first vibrator 510 and the entire second vibrator 520 may be disposed in the first receiving hole AH1, or only a part of the second vibrator 520 may be disposed in the first receiving hole AH1. In an embodiment, as shown in FIG. 6, the first receiving hole AH1 is disposed through the middle frame 600, but the disclosure is not limited thereto. Alternatively, the first receiving hole AH1 may be defined by or formed as a receiving groove where the middle frame 600 becomes relatively thin.

The second sound generating device SG2 may be disposed below the panel bottom member 400. In an embodiment, the third vibrator 530 may be attached to the bottom surface of the panel bottom member 400 via the sixth adhesive member 960, and the fourth vibrator 540 may be attached to the bottom surface of the third vibrator 530 via the seventh adhesive member 970. However, the disclosure is not limited thereto. In some embodiments, the fourth vibrator 540 may be attached to the bottom surface of the panel bottom member 400 via the sixth adhesive member 960, and the third vibrator 530 may be attached to the bottom surface of the fourth vibrator 540 via the seventh adhesive member 970. The sixth and seventh adhesive members 960 and 970 may be PSAs, but the disclosure is not limited thereto. Alternatively, at least one of various other materials having a similar property as PSAs may be used as the sixth and seventh adhesive members 960 and 970.

The third and fourth vibrators 530 and 540 may overlap with each other in the third direction (or the Z-axis direction). In some embodiments, the third and fourth vibrators 530 and 540 may have the same width in the second direction (or the Y-axis direction), but the disclosure is not limited thereto. Alternatively, the width, in the second direction (or the Y-axis direction), of the fourth vibrator 540 may be greater than the width, in the second direction (or the Y-axis direction), of the third vibrator 530. The thickness, in the third direction (or the Z-axis direction), of the third vibrator 530 may be smaller than the thickness, in the third direction (or the Z-axis direction), of the fourth vibrator 540, but the disclosure is not limited thereto. Alternatively, the thickness, in the third direction (or the Z-axis direction), of the third vibrator 530 may be greater than, or the same as, the thickness, in the third direction (or the Z-axis direction), of the fourth vibrator 540.

The second sound generating device SG2 may overlap with the second receiving hole AH2 in the third direction (or the Z-axis direction). In some embodiments, a part of the second sound generating device SG2 may be disposed in the second receiving hole AH2. In one embodiment, for example, the fourth vibrator 540 may be disposed in the second receiving hole AH2, but the disclosure is not limited thereto. Alternatively, a part of the third vibrator 530 and the entire fourth vibrator 540 may be disposed in the second receiving hole AH2, the entire third vibrator 530 and the entire fourth vibrator 540 may be disposed in the second receiving hole AH2, or only a part of the fourth vibrator 540 may be disposed in the second receiving hole AH2. In an embodiment, as shown in FIG. 6, the second receiving hole AH2 is disposed through the middle frame 600, but the disclosure is not limited thereto. Alternatively, the second receiving hole AH2 may be defined by or formed as a receiving groove where the middle frame 600 becomes relatively thin.

Figure 7:
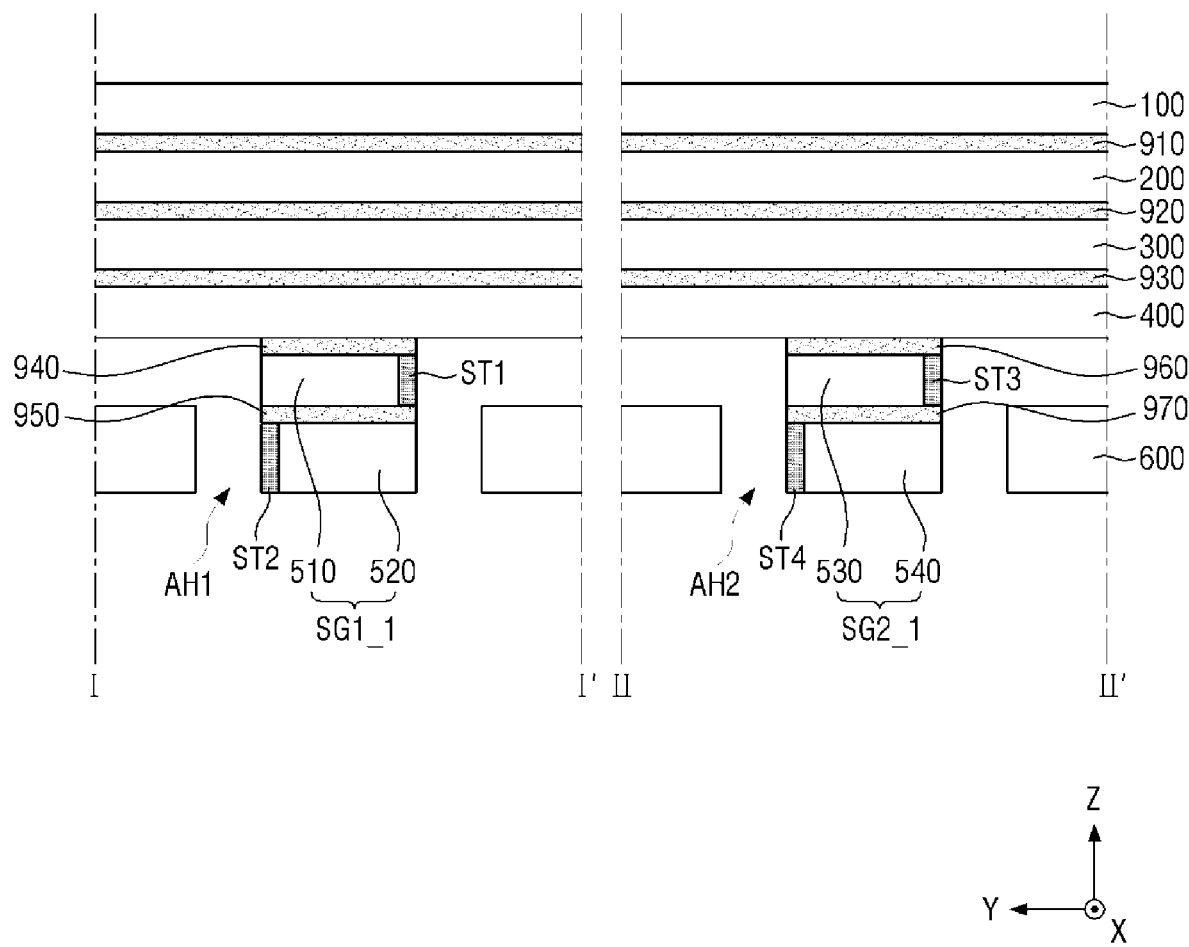
FIG. 7 is a cross-sectional view, taken along lines I-I' and II-II' of FIG. 3 or 4, of a display device according to an alternative embodiment of the disclosure.

FIG. 7 is a cross-sectional view, taken along lines I-I' and II-II' of FIG. 3 or 4, of a display device according to an alternative embodiment of the disclosure. The embodiment of FIG. 7 is substantially the same as the embodiment of FIG. 6 except for the structures of first and second sound generating devices. The embodiment of FIG. 7 will hereinafter be described, focusing mainly on the difference(s) with the embodiment of FIG. 6.

Referring to FIG. 7, in an embodiment, first and second vibrators 510 and 520 may partially overlap each other in a third direction (or a Z-axis direction). In one embodiment, for example, the first and second vibrators 510 and 520 may have areas that do not overlap in the third direction (or the Z-axis direction). In some embodiments, a first stiffener ST1 may be disposed on one side of the first vibrator 510 where the first vibrator 510 does not overlap with the second vibrator 520, and a second stiffener ST2 may be disposed on a side of the second vibrator 520 where the second vibrator 520 does not overlap the first vibrator 510. In one embodiment, for example, the first vibrator 510 and the first stiffener ST1 may be attached to the bottom surface of a panel bottom member 400 via a fourth adhesive member 940, and the second vibrator 520 and the second stiffener ST2 may be attached to the bottom surfaces of the first vibrator 510 and the first stiffener ST1, respectively, via a fifth adhesive member 950. The first and second stiffeners ST1 and ST2 may be disposed on different sides of a first sound generating device SG1_1, and due to the presence of the first and second stiffeners ST1 and ST2, the reliability of the first sound generating device SG1_1 can be ensured even when the first and second vibrators 510 and 520 may have non-overlapping areas that do not overlap each other in the third direction (or the Z-axis direction).

Third and fourth vibrators 530 and 540 may partially overlap each other in a third direction (or a Z-axis direction). In one embodiment, for example, there may be areas in which is the third and fourth vibrators 530 and 540 do not overlap in the third direction (or the Z-axis direction). In some embodiments, a third stiffener ST3 may be disposed on a side of the third vibrator 530 where the third vibrator 530 does not overlap the fourth vibrator 540, and a fourth stiffener ST4 may be disposed on a side of the fourth vibrator 540 where the fourth vibrator 540 does not overlap the third vibrator 530. In one embodiment, for example, the third vibrator 530 and the third stiffener ST3 may be attached to the bottom surface of the panel bottom member 400 via a sixth adhesive member 960, and the fourth vibrator 540 and the fourth stiffener ST4 may be attached to the bottom surfaces of the third vibrator 530 and the third stiffener ST3, respectively, via a seventh adhesive member 970. The third and fourth stiffeners ST3 and ST4 may be disposed on different sides of a second sound generating device SG2_1, and due to the presence of the third and fourth stiffeners ST3 and ST4, the reliability of the second sound generating device SG2_1 can be ensured even when the third and fourth vibrators 530 and 540 have non-overlapping areas that do not overlap each other in the third direction (or the Z-axis direction).

Figure 8:
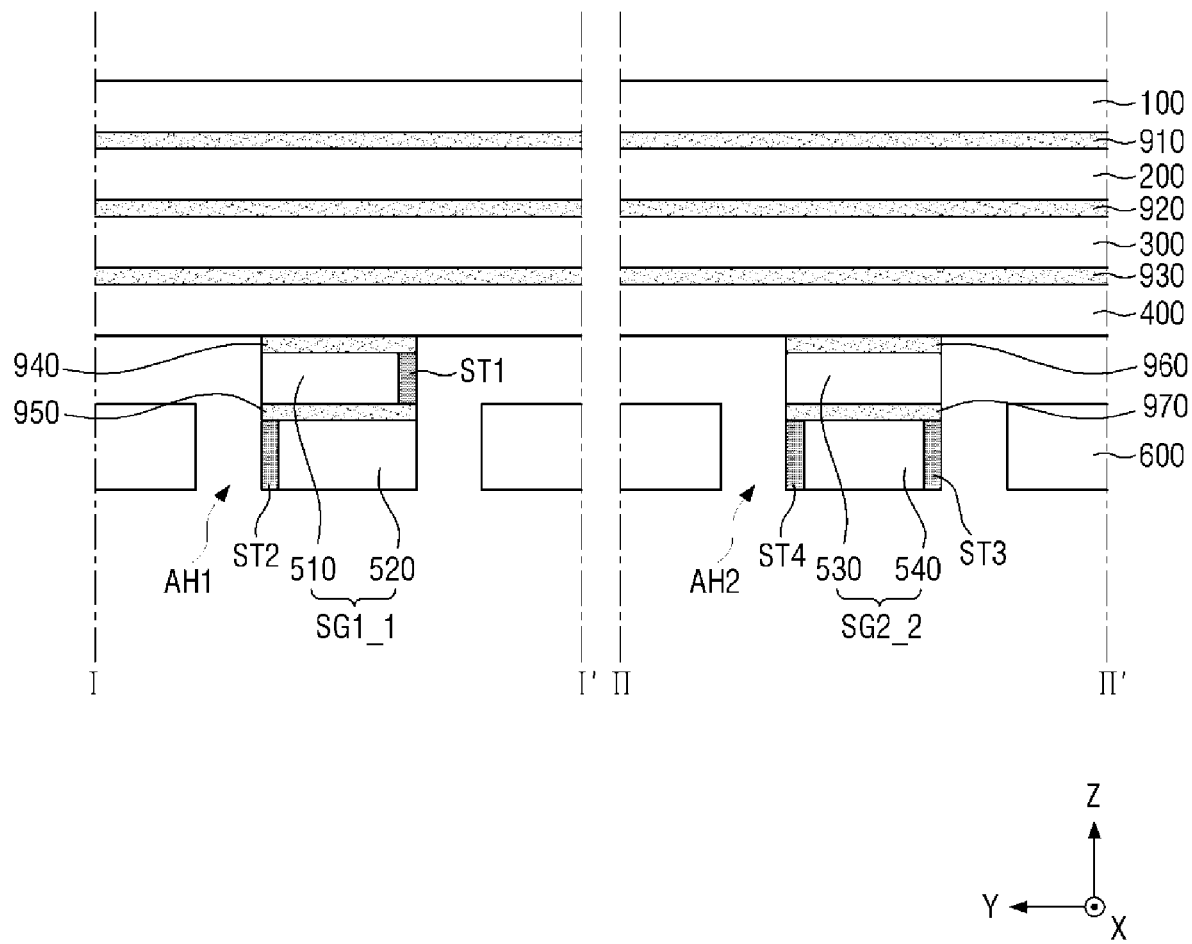
FIG. 8 is a cross-sectional view, taken along lines I-I' and II-II' of FIG. 3 or 4, of a display device according to another alternative embodiment of the disclosure.

FIG. 8 is a cross-sectional view, taken along lines I-I' and II-II' of FIG. 3 or 4, of a display device according to another alternative embodiment of the disclosure. The embodiment of FIG. 8 is substantially the same as the embodiment of FIG. 7 except for the structure of a second sound generating device. The embodiment of FIG. 8 will hereinafter be described, focusing mainly on the difference(s) with the embodiment of FIG. 7.

Referring to FIG. 8, in an embodiment, first and second sound generating devices SG1_1 and SG2_2 may have different structures from each other. In one embodiment, for example, first and second vibrators 510 and 520 of the first sound generating device SG1_1 may have a same width as each other in a second direction (or a Y-axis direction) and may have areas that do not overlap each other in a third direction (or a Z-axis direction), and third and fourth vibrators 530 and 540 of the second sound generating device SG2_2 may have different widths from each other in the second direction (or the Y-axis direction). The first sound generating device SG1_1 has a same structure as that of FIG. 7, and thus, any repetitive detailed description thereof will be omitted.

In some embodiments, the second sound generating device SG2_2 may include the third and fourth vibrators 530 and 540, and the third and fourth vibrators 530 and 540 may have different widths in the second direction (or the Y-axis direction). In one embodiment, for example, the width, in the second direction (or the Y-axis direction), of the third vibrator 530 may be greater than the width, in the second direction (or the Y-axis direction), of the fourth vibrator 540. The third and fourth vibrators 530 and 540 may overlap each other in the third direction (or the Z-axis direction). In one embodiment, for example, third and fourth stiffeners ST3 and ST4 may be disposed on both sides or opposing sides of the fourth vibrator 540 to compensate for the difference between the widths of the third and fourth vibrators 530 and 540. In one embodiment, for example, the third vibrator 530 may be attached to the bottom surface of a panel bottom member 400 via a sixth adhesive member 960, and the fourth vibrator 540 and the third and fourth stiffeners ST3 and ST4 may be attached to the bottom surface of the third vibrator 530 via a seventh adhesive member 970. The third and fourth stiffeners ST3 and ST4 may be disposed on different sides of the fourth vibrator 540, and due to the presence of the third and fourth stiffeners ST3 and ST4, the reliability of the second sound generating device SG2_2 can be ensured even when the third and fourth vibrators 530 and 540 have different widths from each other.

Figure 9:
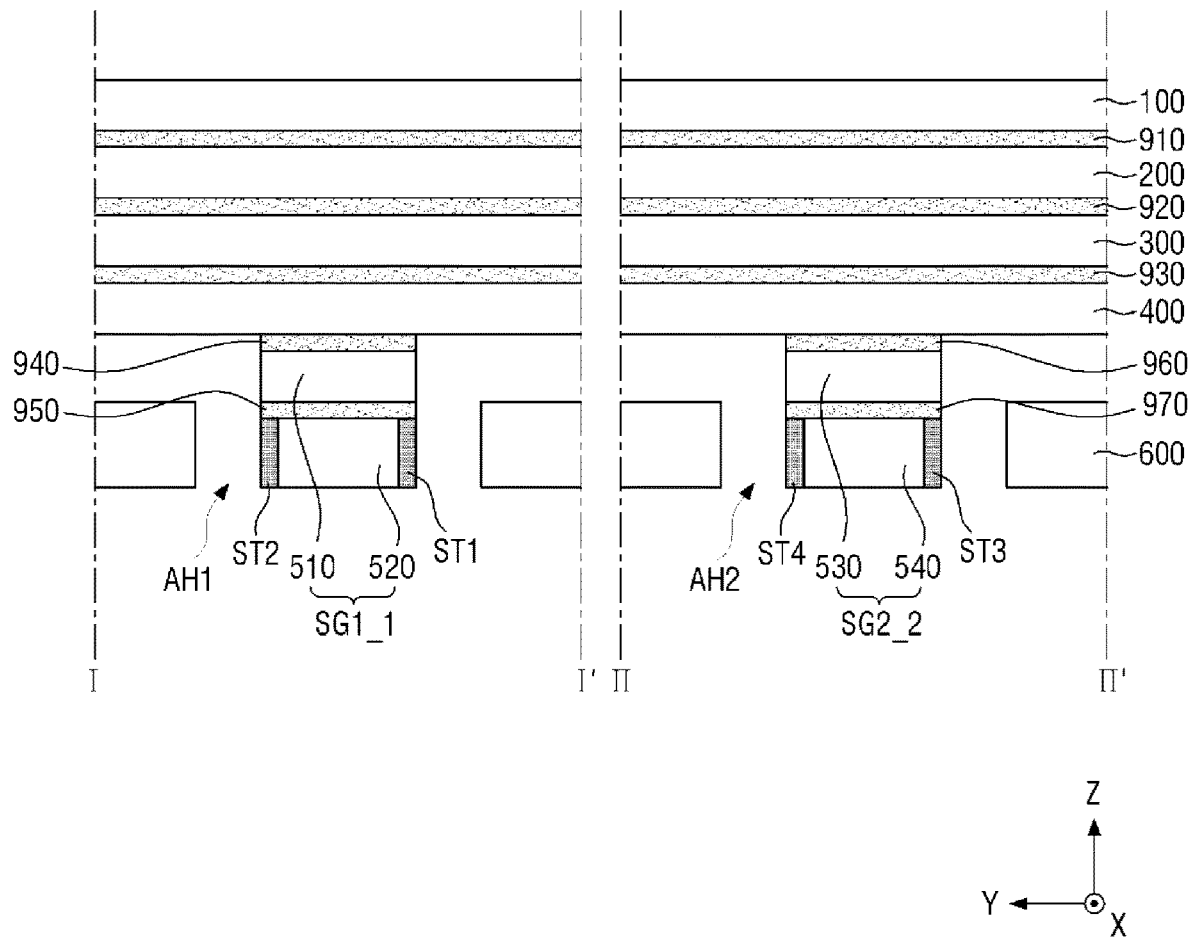
FIG. 9 is a cross-sectional view, taken along lines I-I' and II-II' of FIG. 3 or 4, of a display device according to another alternative embodiment of the disclosure.

FIG. 9 is a cross-sectional view, taken along lines I-I' and II-II' of FIG. 3 or 4, of a display device according to another alternative embodiment of the disclosure. The embodiment of FIG. 9 is substantially the same as the embodiment of FIG. 8 except for the structure of a first sound generating device. The embodiment of FIG. 9 will hereinafter be described, focusing mainly on the difference(s) with the embodiment of FIG. 8.

Referring to FIG. 9, in an embodiment, a first sound generating device SG1_2 may include first and second vibrators 510 and 520, and the first and second vibrators 510 and 520 may have different widths from each other in a second direction (or a Y-axis direction). In one embodiment, for example, the width, in the second direction (or the Y-axis direction), of the first vibrator 510 may be smaller than the width, in the second direction (or the Y-axis direction), of the second vibrator 520. The first and second vibrators 510 and 520 may overlap each other in a third direction (or a Z-axis direction). In one embodiment, for example, first and second stiffeners ST1 and ST2 may be disposed on both sides of the second vibrator 520 to compensate for the difference between the widths of the first and second vibrators 510 and 520. In one embodiment, for example, the first vibrator 510 may be attached to the bottom surface of a panel bottom member 400 via a fourth adhesive member 940, and the second vibrator 520 and the first and second stiffeners ST1 and ST2 may be attached to the bottom surface of the first vibrator 510 via a fifth adhesive member 950. The first and second stiffeners ST1 and ST2 may be disposed on different sides of the second vibrator 520, and due to the presence of the first and second stiffeners ST1 and ST2, the reliability of the first sound generating device SG1_2 can be ensured even when the first and second vibrators 510 and 520 have different widths from each other.

Figure 10:
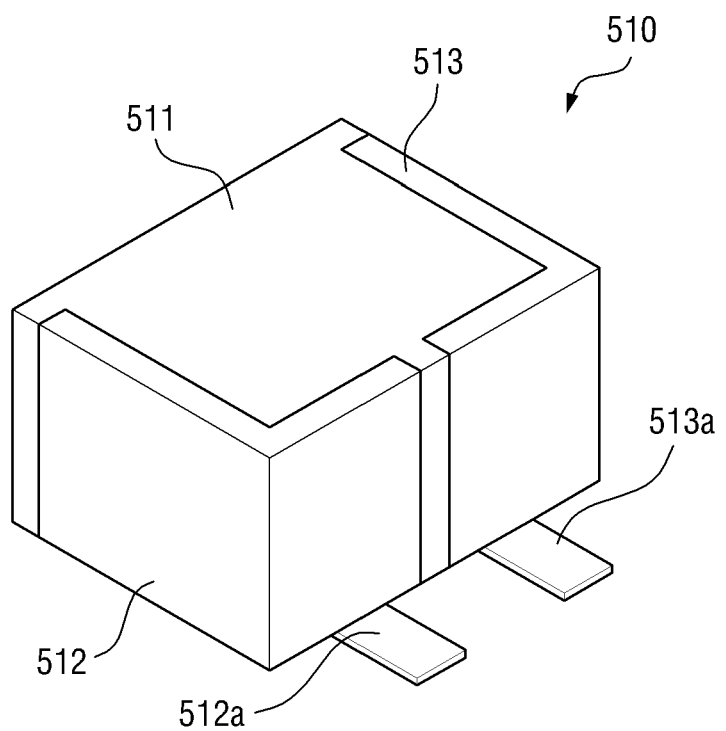
FIG. 10 is a perspective view illustrating an exemplary embodiment of the first vibrator of FIG. 2.
Figure 11:
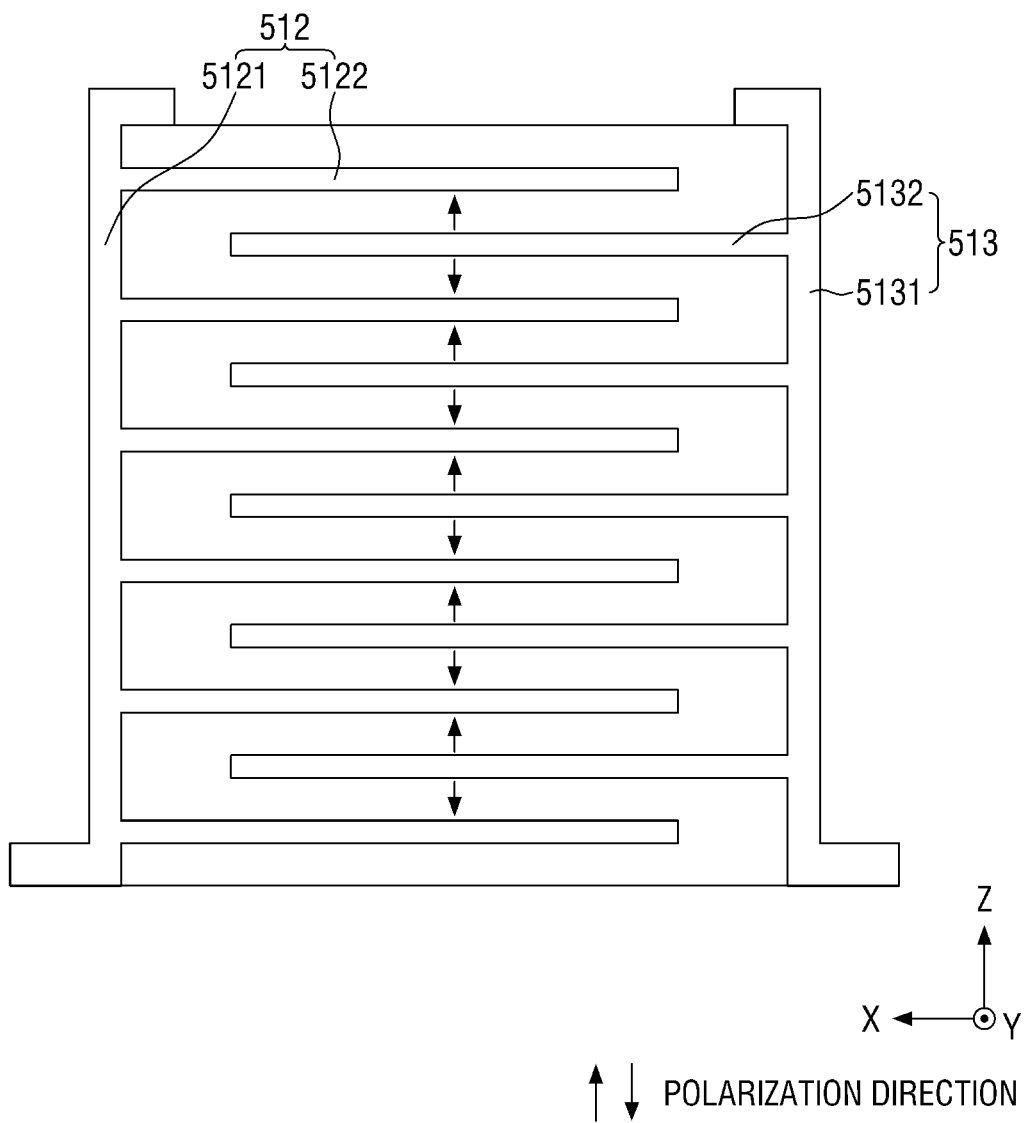
FIG. 11 is a cross-sectional view illustrating the first vibrator of FIG. 10.
Figure 12:
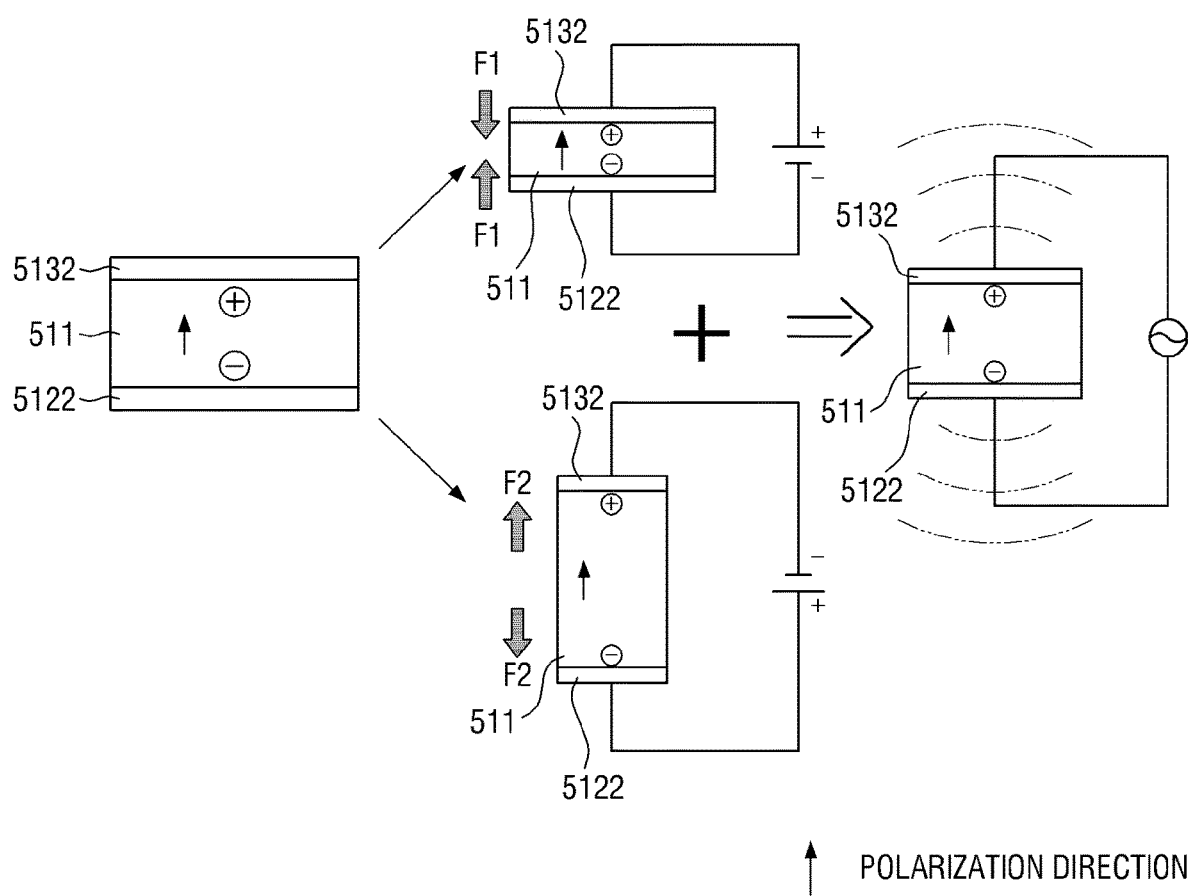
FIG. 12 is a schematic view illustrating how a vibration layer disposed between first branch electrodes and second branch electrodes of the first vibrator of FIG. 10 vibrates.
Figure 13:
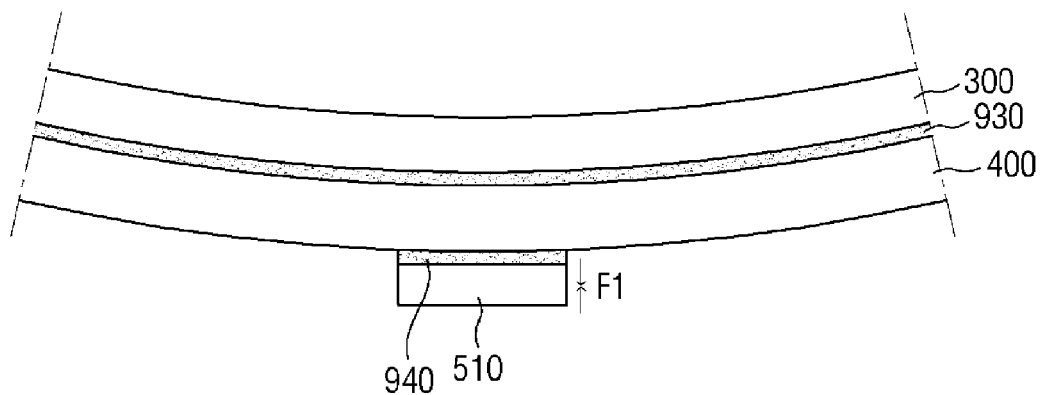
FIGS. 13 and 14 are schematic views illustrating how the panel bottom member and the display panel of FIG. 2 are caused by the first vibrator of FIG. 10 to vibrate.
Figure 14:
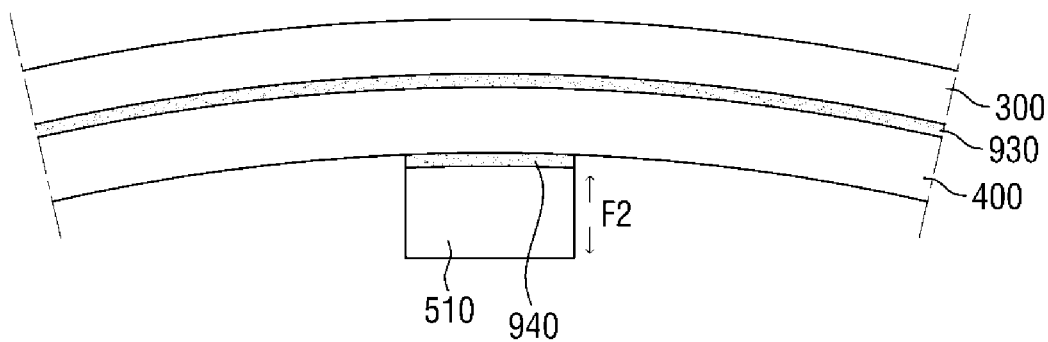

FIG. 10 is a perspective view illustrating an exemplary embodiment of the first vibrator of FIG. 2, FIG. 11 is a cross-sectional view of the first vibrator of FIG. 10, FIG. 12 is a schematic view illustrating how a vibration layer disposed between first branch electrodes and second branch electrodes of the first vibrator of FIG. 10 vibrates, and FIGS. 13 and 14 are schematic views illustrating how the panel bottom member and the display panel of FIG. 2 are caused by the first vibrator of FIG. 10 to vibrate.

Referring to FIGS. 10 and 11, the first vibrator 510 may be a piezoelectric element that contracts or expands in accordance with a voltage applied thereto and thus causes the display panel 300 and the panel bottom member 400 to vibrate. In such an embodiment, the first vibrator 510 may include a vibration layer 511, a first electrode 512, a second electrode 513, a first pad electrode 512a, and a second pad electrode 513a.

The first electrode 512 may include a first stem electrode 5121 and first branch electrodes 5122. The first stem electrode 5121 may be disposed on one side of the vibration layer 511 or may be disposed on more than one side of the vibration layer 511, as illustrated in FIGS. 10 and 11. The first stem electrode 5121 may be disposed on the top surface of the vibration layer 511. The first branch electrodes 5122 may be extending or branched off from the first stem electrode 5121. The first branch electrodes 5122 may be disposed in parallel to one another.

The second electrode 513 may include a second stem electrode 5131 and second branch electrodes 5132. The second stem electrode 5131 may be disposed on another side of the vibration layer 511 to opposite to the first stem electrode 5121 or may be disposed on more than one side of the vibration layer 511, as illustrated in FIGS. 10 and 11. Referring to FIGS. 10 and 11, the first stem electrode 5121 may be disposed on one of the sides of the vibration layer 511 where the second stem electrode 5131 is not disposed. The second stem electrode 5131 may be disposed on the top surface of the vibration layer 511. The first and second stem electrodes 5121 and 5131 may not overlap each other in the Y-axis direction. The second branch electrodes 5132 may be extending or branched off from the second stem electrode 5131. The second branch electrodes 5132 may be disposed in parallel to one another.

The first branch electrodes 5122 and the second branch electrodes 5132 may be disposed in parallel to one another in the horizontal direction (or the X- or Y-axis direction). The first branch electrodes 5122 and the second branch electrodes 5132 may be alternately disposed in the vertical direction (or the Z-axis direction). That is, the first branch electrodes 5122 and the second branch electrodes 5132 may be disposed repeatedly in the order of a first branch electrode 5122, a second branch electrode 5132, a first branch electrode 5122, and a second branch electrode 5132 along the vertical direction (or the Z-axis direction).

The first pad electrode 512a may be connected to the first electrode 512. The first pad electrode 512a may protrude outwardly from the first stem electrode 5121, which is disposed on one side of the vibration layer 511. The second pad electrode 513a may be connected to the second electrode 513. The second pad electrode 513a may protrude outwardly from the second stem electrode 5131, which is disposed on the other side of the vibration layer 511. In such an embodiment, the first and second pad electrodes 512a and 513a may protrude outwardly from portions of the first and second stem electrodes 5121 and 5131 that are disposed on a same side of the vibration layer 511.

The first and second pad electrodes 512a and 513a may be connected to lead lines or pad electrodes of a first flexible printed circuit board. The lead lines or the pad electrodes of the first flexible printed circuit board may be disposed on the bottom surface of the first sound circuit board SCB1.

The vibration layer 511 may be a piezoelectric actuator that is deformed by first and second driving voltages applied to the first and second electrodes 512 and 513, respectively. In such an embodiment, the vibration layer 511 may be one of a piezoelectric material such as a polyvinylidene difluoride ("PVDF") film or lead zirconate titanate ("PZT") and an electroactive polymer.

Since the vibration layer 511 is fabricated at a high temperature, the first and second electrodes 512 and 513 may include or be formed of a metal with a high melting point such as Ag or an alloy of Ag and Pd. In an embodiment where the first and second electrodes 512 and 513 are formed of an alloy of Ag and Pd, the Ag content of the alloy of Ag and Pd may be greater than the Pd content of the alloy of Ag and Pd to raise the melting point of the first and second electrodes 512 and 513.

The vibration layer 511 may be disposed between the first branch electrodes 5122 and the second branch electrodes 5132. The vibration layer 511 contracts or expands depending on the difference between the first driving voltage applied to the first branch electrodes 5122 and the second driving voltage applied to the second branch electrodes 5132.

In an embodiment, as illustrated in FIG. 11, the polarity of the vibration layer 511 between the first branch electrodes 5122 and the respective underlying second branch electrodes 5132 thereof may have an upward direction (↑) In such an embodiment, the vibration layer 511 may have a positive polarity in upper parts thereof adjacent to the first branch electrodes 5122 and a negative polarity in lower parts thereof adjacent to the second branch electrodes 5132.

In such an embodiment, the polarity of the vibration layer 511 between the second branch electrodes 5132 and the respective underlying first branch electrodes 5122 thereof may have a downward direction (↓) In such an embodiment, the vibration layer 511 may have a negative polarity in the upper parts thereof adjacent to the first branch electrodes 5122 and a positive polarity in the lower parts thereof adjacent to the second branch electrodes 5132. The direction of the polarity of the vibration layer 511 may be determined by a poling process for applying an electric field to the vibration layer 511 using the first branch electrodes 5122 and the second branch electrodes 5132.

When the direction of the polarity of the vibration layer 511 between the first branch electrodes 5122 and the respective underlying second branch electrodes 5132 thereof is the upward direction (↑) as illustrated in FIG. 12, the vibration layer 511 may contract in accordance with a first force F1 in response to a positive first driving voltage and a negative second driving voltage being applied to the first branch electrodes 5122 and the second branch electrodes 5132, respectively. The first force F1 may be a contraction force. On the other hand, in response to a negative first driving voltage and a positive second driving voltage being applied to the first branch electrodes 5122 and the second branch electrodes 5132, respectively, the vibration layer 511 may expand in accordance with a second force F2. The second force F2 may be an extension force.

When the direction of the polarity of the vibration layer 511 between the second branch electrodes 5132 and the respective underlying first branch electrodes 5122 thereof is the downward direction (↓), the vibration layer 511 may expand in accordance with an extension force in response to a positive first driving voltage and a negative second driving voltage being applied to the first branch electrodes 5122 and the second branch electrodes 5132, respectively. On the other hand, in response to a negative first driving voltage and a positive second driving voltage being applied to the first branch electrodes 5122 and the second branch electrodes 5132, respectively, the vibration layer 511 may contract in accordance with a contraction force. The second force F2 may be an extension force.

According to an embodiment of FIGS. 10 and 11, when the first and second driving voltages applied to the first and second electrodes 512 and 513, respectively, alternately change from a positive polarity to a negative polarity, the vibration layer 511 repeatedly contracts and expands, such that the first vibrator 510 vibrates.

The first vibrator 510 is disposed on the bottom surface of the display bottom member 400. Thus, as the vibration layer 511 of the first vibrator 510 contracts and expands, the panel bottom member 400 and the display panel 300 vibrates vertically due to stress, as illustrated in FIGS. 13 and 14. Since the panel bottom member 400 and the display panel 300 are caused by the first vibrator 510 to vibrate, the panel bottom member 400 and the display panel 300 may output sounds.

Figure 15:
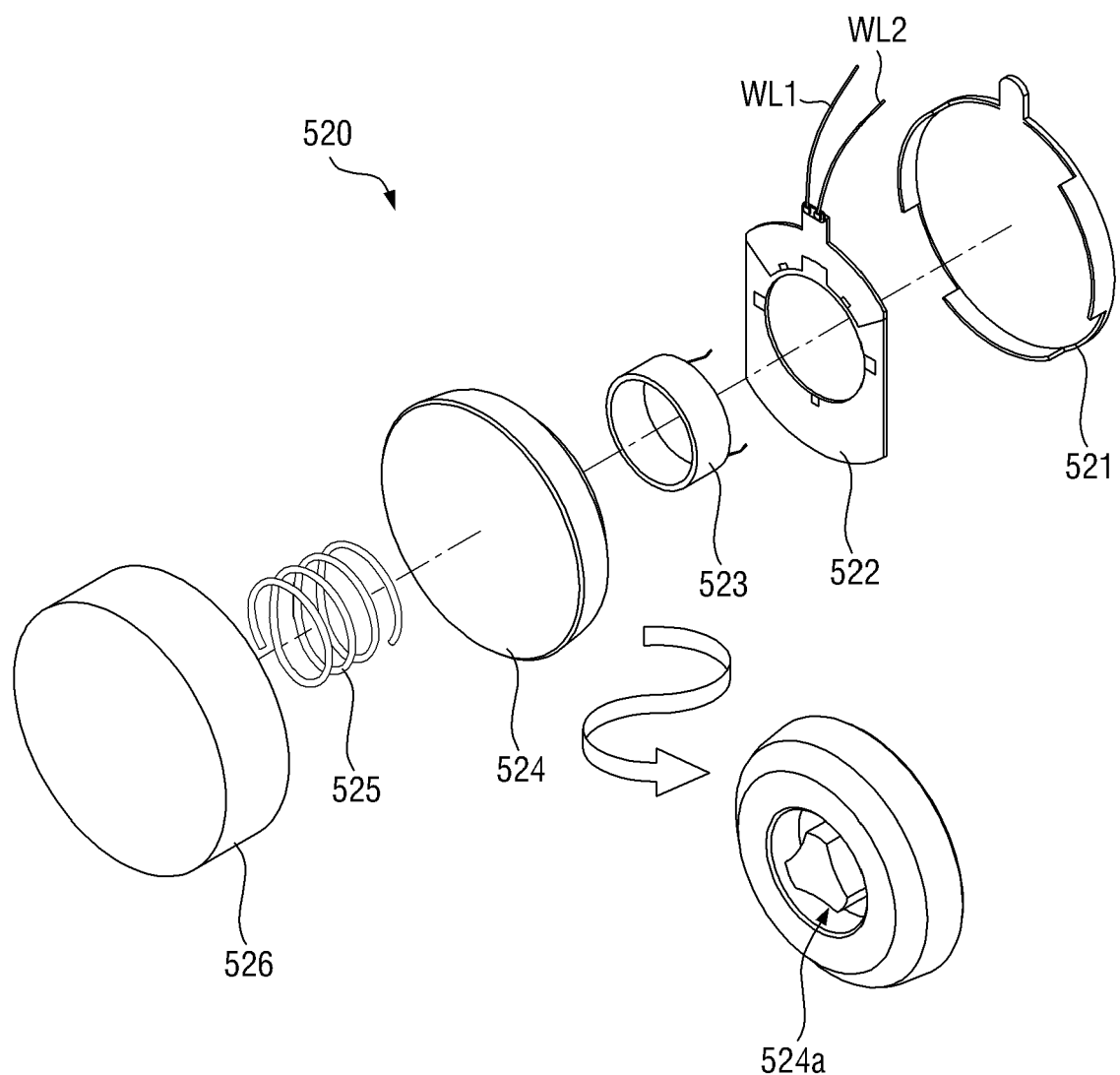
FIG. 15 is an exploded perspective view illustrating an exemplary embodiment of the second vibrator of FIG. 2.
Figure 16:
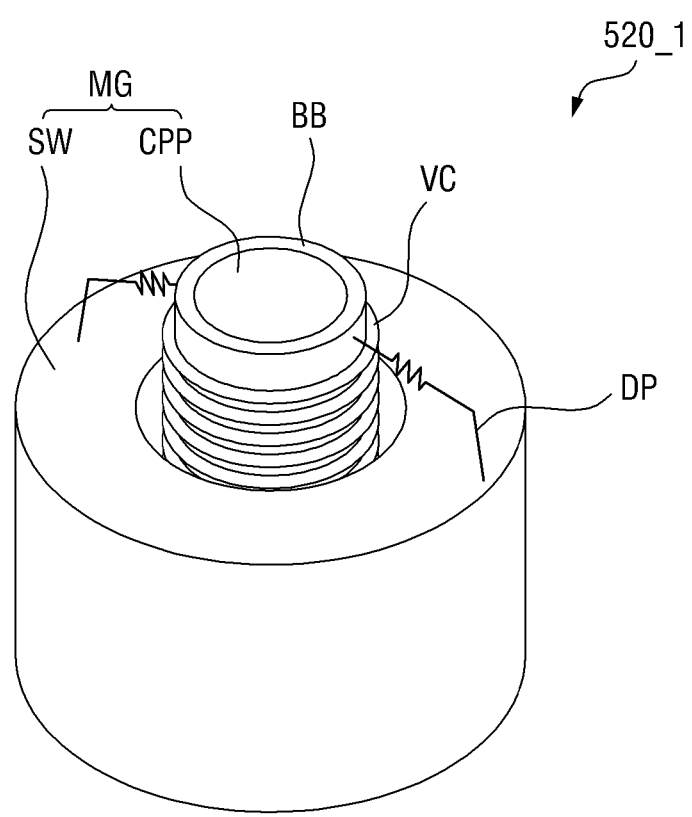
FIG. 16 is a perspective view illustrating an alternative exemplary embodiment of the second vibrator of FIG. 2.
Figure 17:
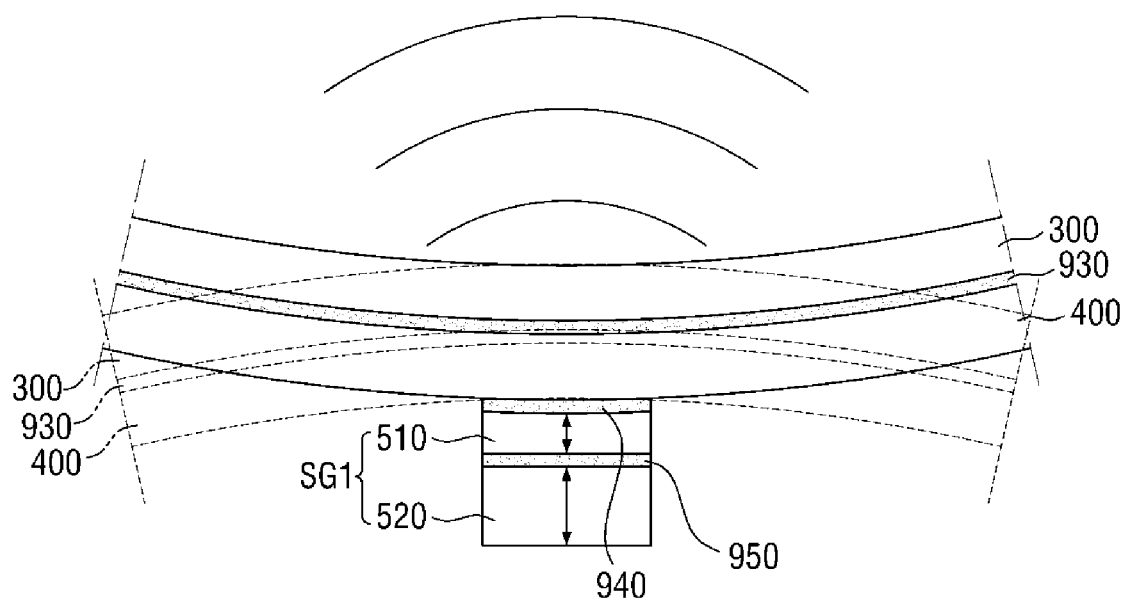
FIG. 17 is a schematic view illustrating how the first sound generating device of FIG. 2 output sounds.

FIG. 15 is an exploded perspective view illustrating an exemplary embodiment of the second vibrator of FIG. 2, FIG. 16 is a perspective view illustrating an alternative exemplary embodiment of the second vibrator of FIG. 2, and FIG. 17 is a schematic view illustrating how the first sound generating device of FIG. 2 output sounds.

Referring to FIG. 15, in some embodiments, the second vibrator 520 may be an LRA for causing the panel bottom member 400 and the display panel 300 to vibrate vertically by generating a magnetic force using a voice coil.

In an embodiment where the second vibrator 520 is an LRA for causing the panel bottom member 400 and the display panel 300 to vibrate vertically, the second vibrator 520 may include a lower chassis 521, a flexible printed circuit board 522, a voice coil 523, a magnet 524, a spring 525, and an upper chassis 526. The lower and upper chassis 521 and 526 may include or be formed of a metal material. The flexible printed circuit board 522 may be disposed on a surface of the lower chassis 521 that faces the upper chassis 526 and may be connected to first and second sound wires WL1 and WL2. The voice coil 523 may be connected to a surface of the flexible printed circuit board 522 that faces the upper chassis 526. Accordingly, one end of the voice coil 523 may be electrically connected to the first sound wire WL1, and the other end of the voice coil 523 may be electrically connected to the second sound wire WL2. The magnet 524 may be a permanent magnet, and a voice coil groove 524a, in which the voice coil 523 is disposed or received, may be defined on a surface of the magnet 524 that faces the voice coil 523. A spring 525 may be disposed between the magnet 524 and the upper chassis 526.

The direction of a current that flows in the voice coil 523 of the second vibrator 520 may be controlled in accordance with first and second driving voltages applied to the first and second sound wires WL1 and WL2. An applied magnetic field may be generated around the voice coil 523 depending on the current that flows in the voice coil 523. That is, the direction of the current that flows in the voice coil 523 when the first driving voltage is a positive voltage and the second driving voltage is a negative voltage may be opposite to the direction of the current that flows in the voice coil 523 when the first driving voltage is a negative voltage and the second driving voltage is a positive voltage. As the first and second driving voltages are alternately driven, an attracting force and a repulsive force may be acted upon the magnet 524 and the voice coil 523 such that the magnet 524 may reciprocate between the voice coil 523 and the upper chassis 526 due to the spring 525. As a result, the vibration surface disposed on the upper chassis 526 is allowed to vibrate to out sounds.

In an embodiment, the first vibrator 510 may function as a tweeter for outputting sounds having a high sound pressure level in a high-frequency range, and the second vibrator 520 may function as a woofer for outputting sounds having a high sound pressure level in a low-frequency range. The high-frequency range may be a range of frequencies of 1 kHz or higher, and the low-frequency range may be a range of frequencies of 1 kHz or lower. Referring to FIG. 17, by forming the first vibrator 510 as a piezoelectric actuator that vibrates vertically, but having a high sound pressure level in a high-frequency range, and by forming the second vibrator 520 as an LRA that vibrates vertically, but having a high sound pressure level in a low-frequency range, the display device 10 may provide the user with sounds having a high sound pressure level in both the low-frequency range and the high-frequency range, sounds having a high sound pressure level in both the low- and high-frequency ranges may be effectively provided to the user.

Referring to FIG. 16, in some embodiments, a second vibrator 520_1 may be an exciter for causing the panel bottom member 400 and the display panel 300 to vibrate by generating a magnetic force using a voice coil. In such an embodiment, the second vibrator 520_1 may include a magnet MG, a bobbin BB, a voice coil VC, and dampers DP.

The magnet MG may be a permanent magnet, and a sintered magnet such as a barium ferrite magnet may be used. The magnet MG may include or be formed with a ferric trioxide ($Fe_2O_3$) magnet, a barium carbonate ($BaCO_3$) magnet, a neodymium magnet, a strontium ferrite magnet with an improved magnetic component, an aluminum (Al), nickel (Ni), or a cobalt (Co) cast alloy magnet, but the disclosure is not limited thereto. The neodymium magnet may be, for example, a neodymium-iron-boron (Nd—Fe—B) magnet.

The magnet MG may include a plate, a central protruding part CPP protruding from the center of the plate, and a sidewall part SW protruding from the edge of the plate. The central protruding part CPP and the sidewall part SW may be a predetermined distance apart from each other, and as a result, a predetermined space may be formed between the central protruding part CPP and the sidewall part SW. In such an embodiment, the magnet MG may have a cylindrical shape. In such an embodiment, the magnet MG may be in the shape of a cylinder with a circular space formed at one of the bases thereof.

The central protruding part CPP of the magnet MG may have N-pole magnetism, and the plate and the sidewall part SW may have S-pole magnetism. As a result, an external magnetic field may be generated between the central protruding part CPP and the plate of the magnet MG and between the central protruding part CPP and the sidewall part SW of the magnet MG.

The bobbin BB may be in a cylindrical shape. The central protruding part CPP of the magnet MG may be disposed in the bobbin BB. In such an embodiment, the bobbin BB may be disposed to surround the central protruding part CPP of the magnet MG. The sidewall part SW of the magnet MG may be disposed on the outside of the bobbin BB. That is, the sidewall part SW of the magnet MG may be disposed to surround the bobbin BB. Spaces may be defined or provided between the bobbin BB and the central protruding part CPP of the magnet MG and between the bobbin BB and the sidewall part SW of the magnet MG.

The bobbin BB may include or be formed of a pulp- or paper-processed material, Al, Mg, or an alloy thereof, a synthetic resin such as polypropylene, or polyamide-based fibers.

The voice coil VC may be wound around the outer circumferential surface of the bobbin BB. One end of the voice coil VC adjacent to one end of the bobbin BB may be connected to a first sound wire, and the other end of the voice coil VC adjacent to the other end of the bobbin BB may be connected to a second sound wire. As a result, a current may flow in the voice coil VC in accordance with first and second driving voltages applied to the first and second sound wires, respectively. An applied magnetic field may be generated around the voice coil VC depending on the current that flows in the voice coil VC. That is, the direction of the current that flows in the voice coil VC when the first driving voltage is a positive voltage and the second driving voltage is a negative voltage may be opposite to the direction of the current that flows in the voice coil VC when the first driving voltage is a negative voltage and the second driving voltage is a positive voltage. As the first and second driving voltages are alternately driven, the N pole and the S pole of the applied magnetic field may be changed so that an attracting force and a repulsive force can be alternately acted upon the magnet MG and the voice coil VC. Accordingly, the bobbin BB, which has the voice coil VC wound therearound, is allowed to reciprocate in the third direction (or the Z-axis direction). As a result, the panel bottom member 400 and the display panel 300 may vibrate in the third direction (or the Z-axis direction) to output sounds.

The dampers DP may be disposed between the top of the bobbin BB and the sidewall part SW of the magnet MG. The dampers DP may contract or expand in accordance with the vertical movement of the bobbin BB and may thus control the vertical vibration of the bobbin BB. That is, since the dampers DP are connected between the bobbin BB and the sidewall part SW of the magnet MG, the vertical movement of the bobbin BB may be limited by the restoring force of the dampers DP. In one embodiment, for example, when the bobbin BB vibrates above or below a predetermined height, the bobbin BB may return to its original location due to the restoring force of the dampers DP. In some embodiments, the first vibrator 510 and the second vibrator 520_1 of the first sound generating device SG1 may be implemented as a piezoelectric actuator and an exciter, respectively, that vibrate vertically, a tweeter for outputting sounds having a high sound pressure level (dB) in a high-frequency range can be realized.

Figure 18:
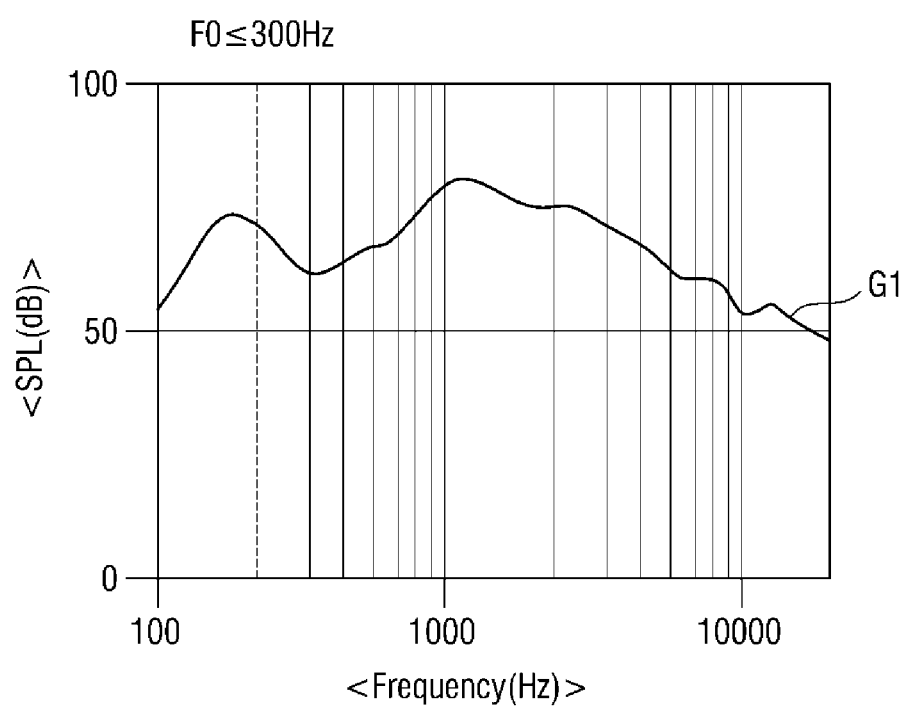
FIG. 18 is a graph showing the sound pressure levels of sounds generated by the second vibrator of FIG. 2.
Figure 19:
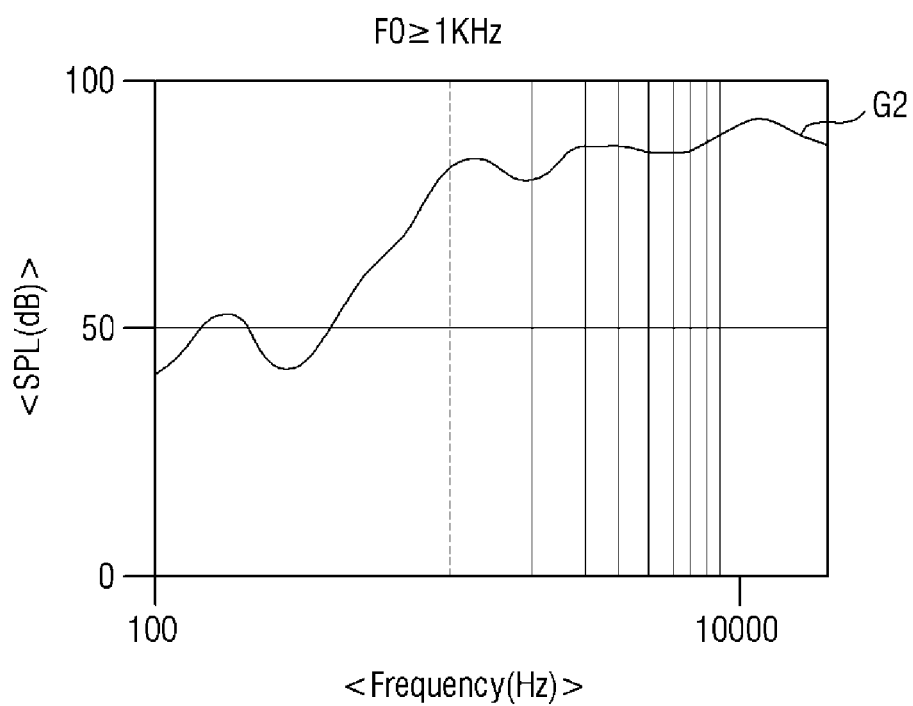
FIG. 19 is a graph showing the sound pressure levels of sounds generated by the first vibrator of FIG. 2.
Figure 20:
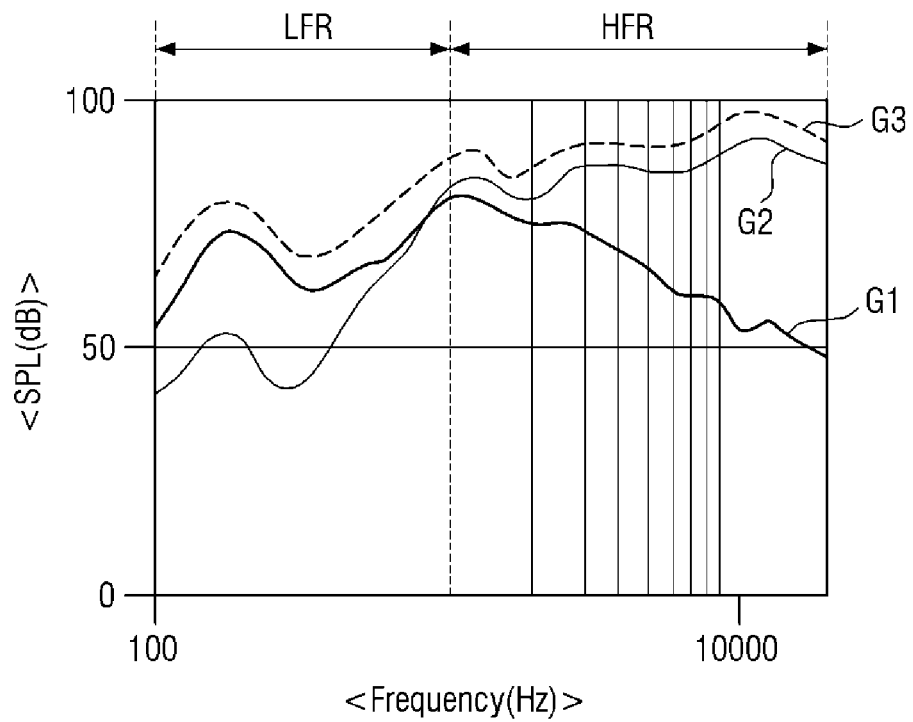
FIG. 20 is a graph showing the sound pressure levels of sounds generated by the first sound generating device of FIG. 2.

FIG. 18 is a graph showing the sound pressure levels of sounds generated by the second vibrator of FIG. 2, FIG. 19 is a graph showing the sound pressure levels of sounds generated by the first vibrator of FIG. 2, and FIG. 20 is a graph showing the sound pressure levels of sounds generated by the first sound generating device of FIG. 2.

In FIGS. 18 through 20, the X axis represents the vibration frequency of the display panel 300, which is caused by the first and second sound generating devices SG1 and SG2, to vibrate, the Y axis represents sound pressure level (SPL), and fundamental zero (F0) denotes the minimum frequency at which the vibration displacement of the display panel 300 exceeds a reference level. A low-frequency range LFR is a range where the vibration frequency of the display panel 300 is 1 kHz or lower, and a high-frequency range HFR is a range where the vibration frequency of the display panel 300 is higher than 1 kHz.

The second vibrator 520 may output sounds having a frequency F0 of 800 megahertz (MHz) or lower, as indicated by a first curve G1 of FIG. 18. On the other hand, the first vibrator 510 may output sounds having a frequency F0 of 1 kHz or higher, as indicated by a second curve G2 of FIG. 19. In such an embodiment, the sounds output by the second vibrator 520 may have a higher sound pressure level than the sounds output by the first vibrator 510 in the low-frequency range LFR, but the sounds output by the first vibrator 510 may have a higher sound pressure level than the sounds output by the second vibrator 520 in the high-frequency range HFR. Thus, in an embodiment where sounds are provided to the user using both the first and second vibrators 510 and 520, the sound pressure level of sounds may be improved in both the low- and high-frequency ranges LFR and HFR, as indicated by a third curve G3 of FIG. 20. In such an embodiment, the first sound generating device SG1 may have expanded frequency band of sounds to be provided to the user and thus provides further richer sounds to the user.

Figure 21:
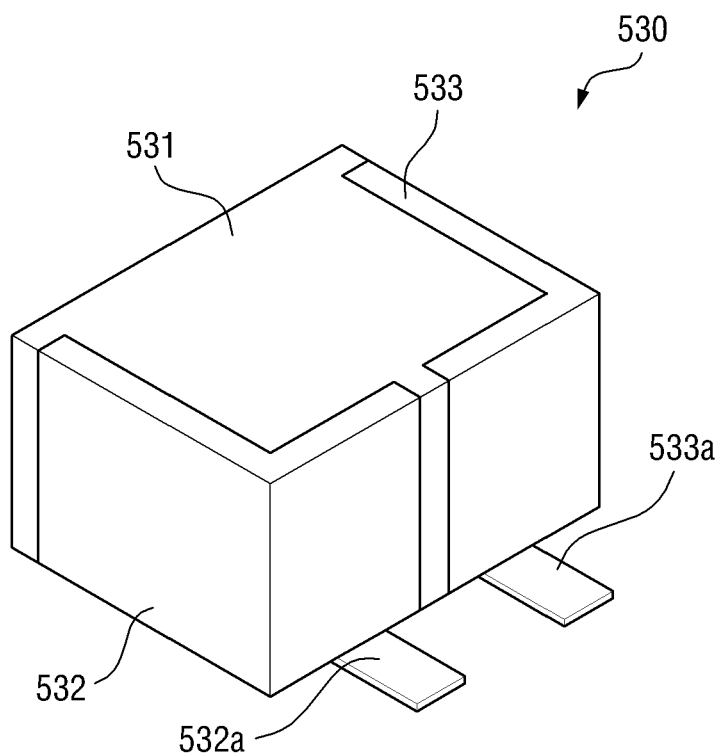
FIG. 21 is a perspective view illustrating an exemplary embodiment of the third vibrator of FIG. 2.
Figure 22:
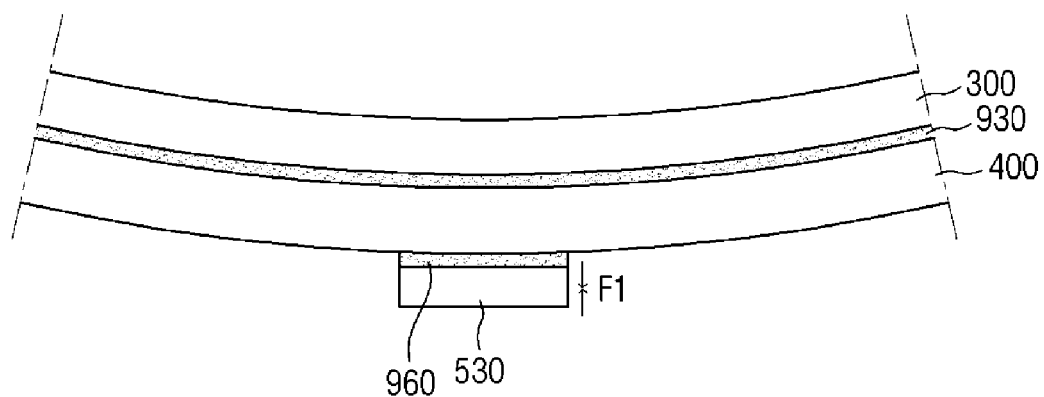
FIGS. 22 and 23 are schematic views illustrating how the panel bottom member and the display panel of FIG. 2 are caused by the third vibrator of FIG. 21 to vibrate.
Figure 23:
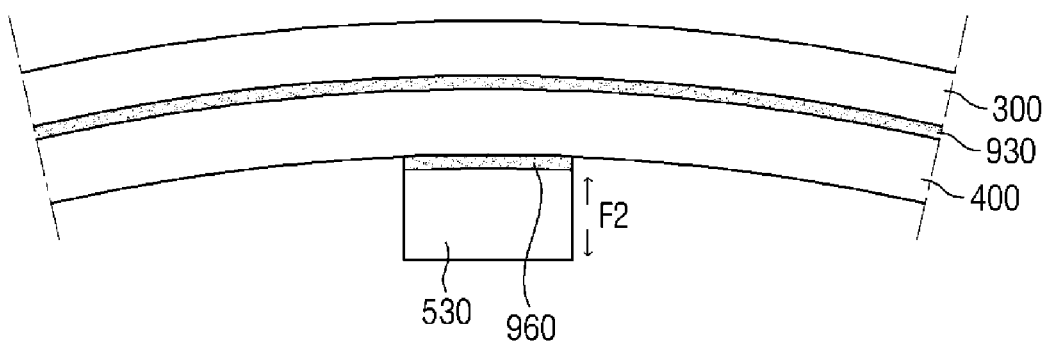
Figure 23:
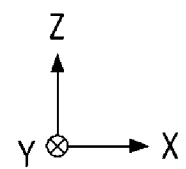

FIG. 21 is a perspective view illustrating an exemplary embodiment of the third vibrator of FIG. 2. FIGS. 22 and 23 are schematic views illustrating how the panel bottom member and the display panel of FIG. 2 are caused by the third vibrator of FIG. 21 to vibrate. The third vibrator of FIGS. 21 through 23 is substantially the same as the first vibrator of FIGS. 10, 13, and 14, and thus, any repetitive detailed description thereof will be omitted.

Figure 24:
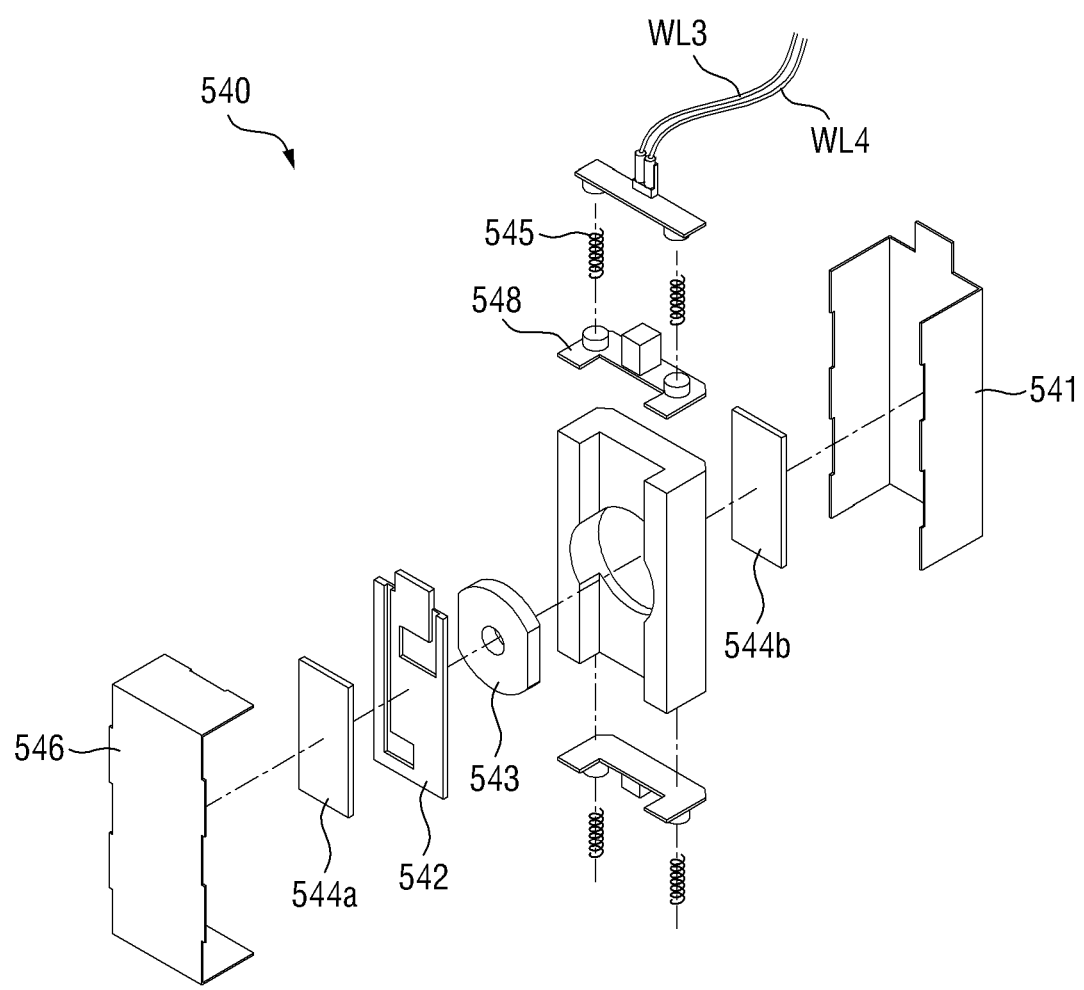
FIG. 24 is an exploded perspective view illustrating an exemplary embodiment of the fourth vibrator of FIG. 2.
Figure 25:
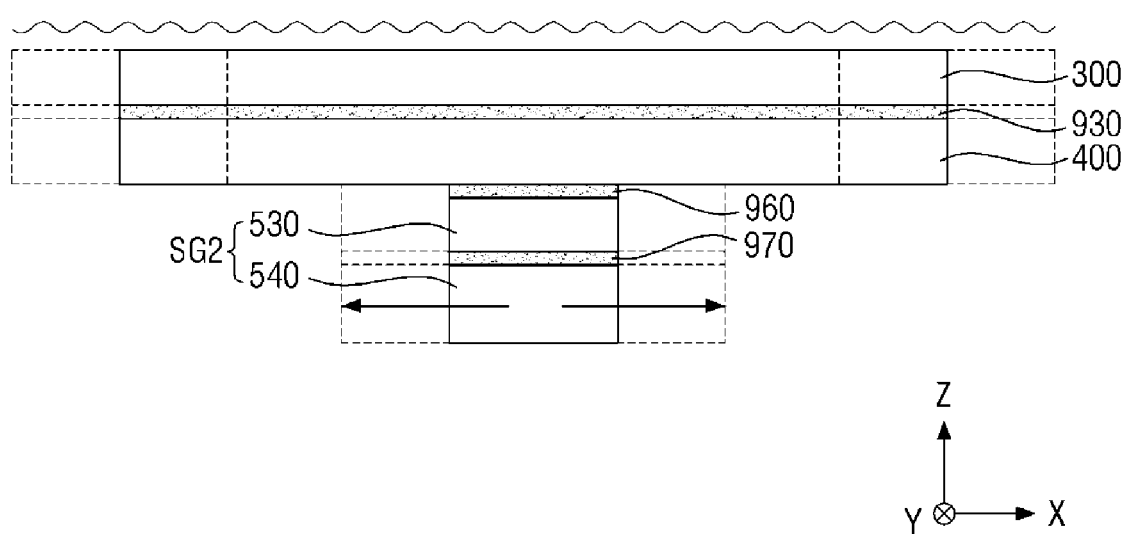
FIG. 25 is a schematic view illustrating how the panel bottom member and the display panel of FIG. 2 are caused by the fourth vibrator of FIG. 24 to vibrate.

FIG. 24 is an exploded perspective view illustrating an exemplary embodiment of the fourth vibrator of FIG. 2, and FIG. 25 is a schematic view illustrating how the panel bottom member and the display panel of FIG. 2 are caused by the fourth vibrator of FIG. 24 to vibrate.

Referring to FIG. 24, in some embodiments, the fourth vibrator 540 may be an LRA for causing the panel bottom member 400 and the display panel 300 to vibrate horizontally (i.e., in the X-axis direction, the opposite direction of the X-axis direction, the Y-axis direction, and the opposite direction of the Y-axis direction) by generating a magnetic force using a voice coil.

In an embodiment where the fourth vibrator 540 is an LRA for causing the panel bottom member 400 and the display panel 300 to vibrate horizontally, the fourth vibrator 540 may include a lower chassis 541, a vibrating part 547, a voice coil 543, a flexible printed circuit board 542, a first magnet 544a, a second magnet 544b, an upper chassis 546, and springs 545. The lower and upper chassis 541 and 546 may include or be formed of a metal material.

The vibrating part 547 may be disposed between the lower and upper chassis 541 and 546. The first magnet 544a, the flexible printed circuit board 542, and the voice coil 543 may be disposed or mounted on the vibrating part 547. In one embodiment, for example, the first magnet 544a, the flexible printed circuit board 542, and the voice coil 543 may be disposed between the vibrating part 547 and the upper chassis 546, and the upper chassis 546 may cover the top of the vibrating part 547 with the voice coil 543, the flexible printed circuit board 542, and the first magnet 544a sequentially mounted on the vibrating part 547.

The second magnet 544b may be disposed between the vibrating part 547 and the lower chassis 541. The lower chassis 541 may be coupled to the upper chassis 546, covering the vibrating part 547 and the second magnet 544b.

When a surface of the vibrating part 547 where the first magnet 544a is disposed is defined as the top surface of the vibrating part 547 and a surface of the vibrating part 547 where the second magnet 544b is disposed is defined as the bottom surface of the vibrating part 547, the springs 545 may be disposed on opposing sides surfaces of the vibrating part 547 that connect the top surface and the bottom surface of the vibrating part 547. That is, the spring 545 may be inserted in a spring fixing part 548 and may be disposed on both of the opposing side surfaces of the vibrating part 547.

The flexible printed circuit board 542 may be connected to third and fourth sound wires WL3 and WL4. The voice coil 543 may be disposed between the vibrating part 547 and the flexible printed circuit board 542 and may be electrically connected to the third and fourth sound wires WL3 and WL4. The lower chassis 541 of the fourth vibrator 540 may be attached and fixed to the bottom surface of the third vibrator 530 via the seventh adhesive member 970. In response to first and second driving voltages being applied to the third and fourth sound wires WL3 and WL4, respectively, the fourth vibrator 540 may vibrate horizontally and may thus cause the panel bottom member 400 and the display panel 300 to vibrate horizontally, as illustrated in FIG. 25, thereby providing haptic feedback to the user. The horizontal vibration of the panel bottom member 400 and the display panel 300 may not only reduce vibration noise, but also improve haptic sensitivity.

Figure 26:
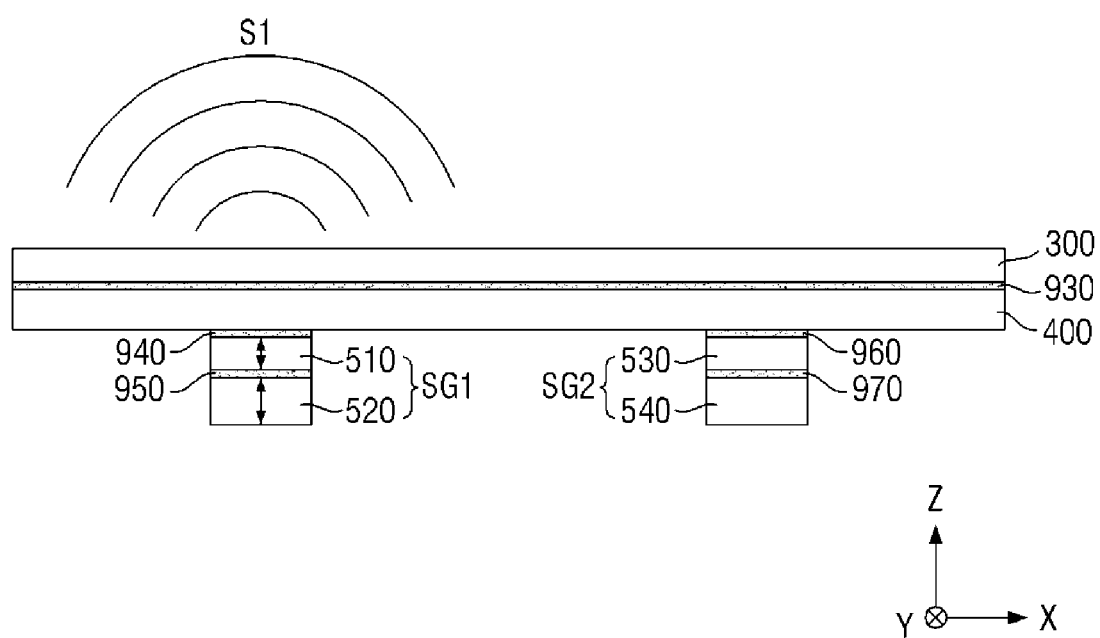
FIG. 26 is a cross-sectional view illustrating how a first sound is generated by the first sound generating device of FIG. 2.
Figure 27:
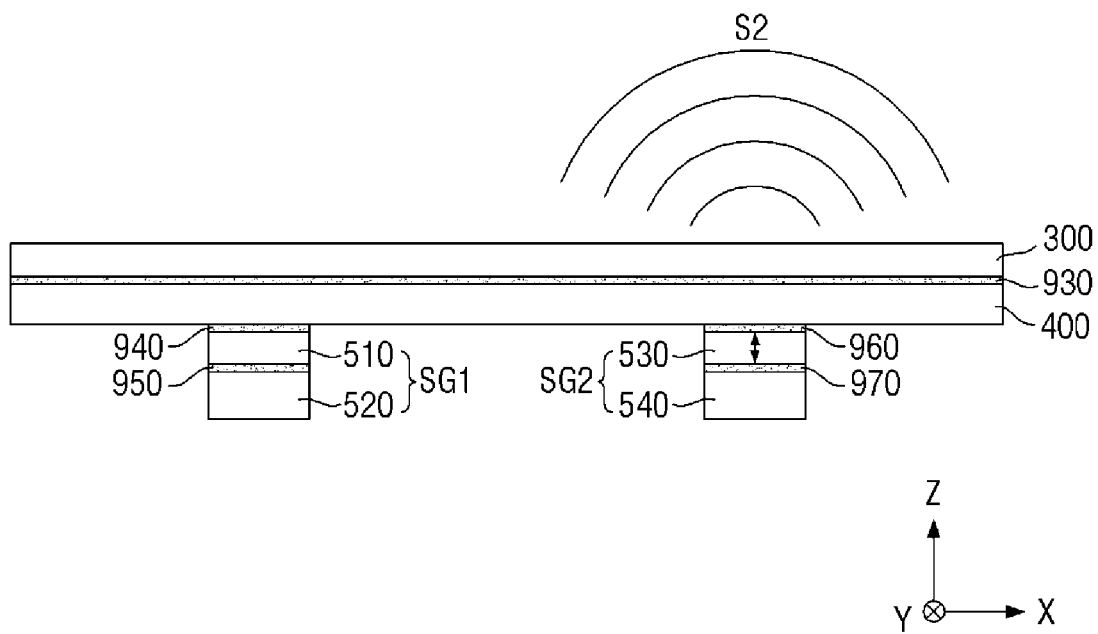
FIG. 27 is a cross-sectional view illustrating how a second sound is generated by the second sound generating device of FIG. 2.
Figure 28:
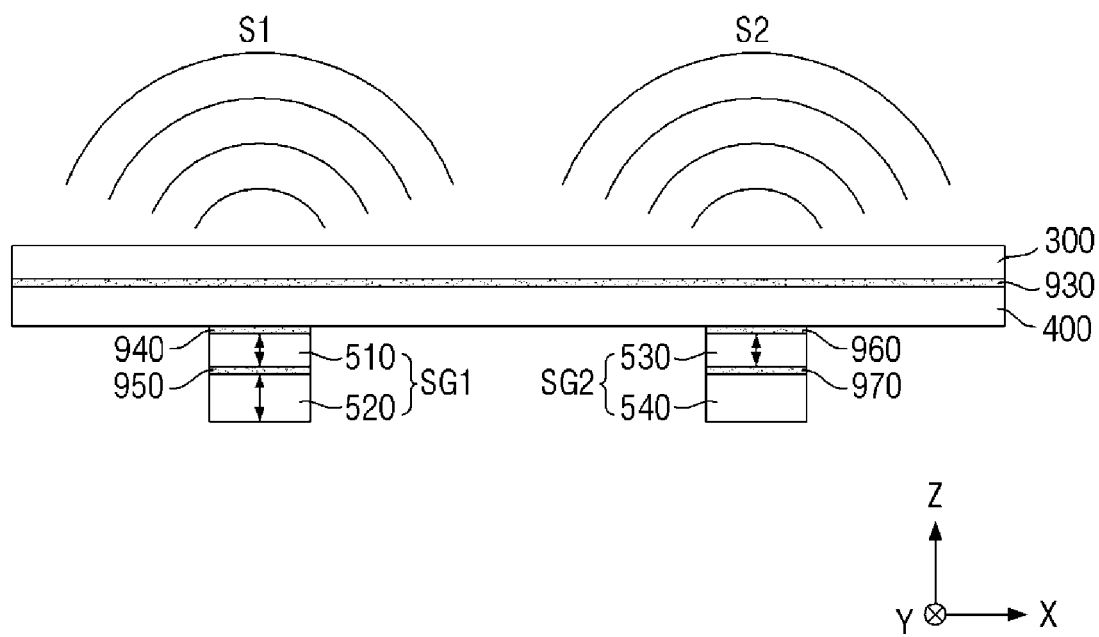
FIG. 28 is a cross-sectional view illustrating how stereo sounds are generated by the first and second sound generating devices of FIG. 2.
Figure 29:
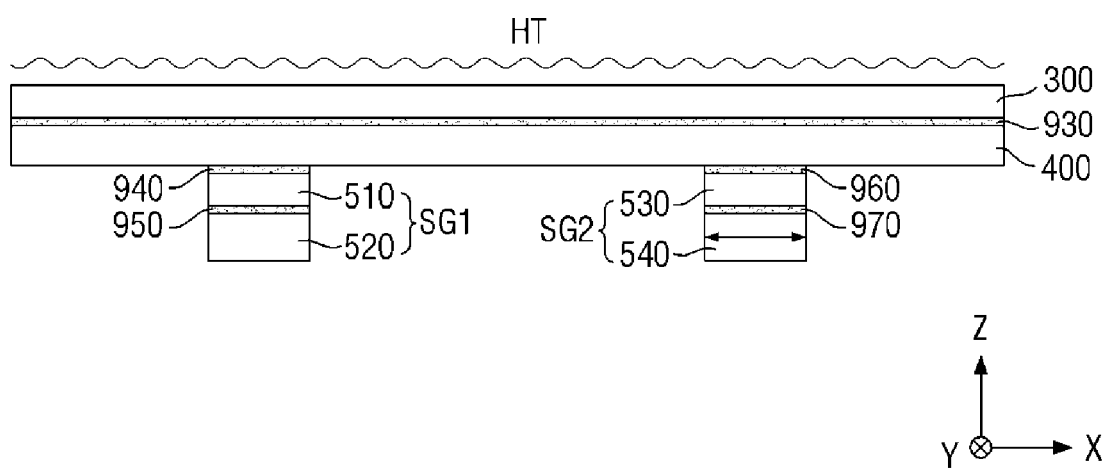
FIG. 29 is a cross-sectional view illustrating how haptic feedback is realized by the second sound generating device of FIG. 2.
Figure 30:
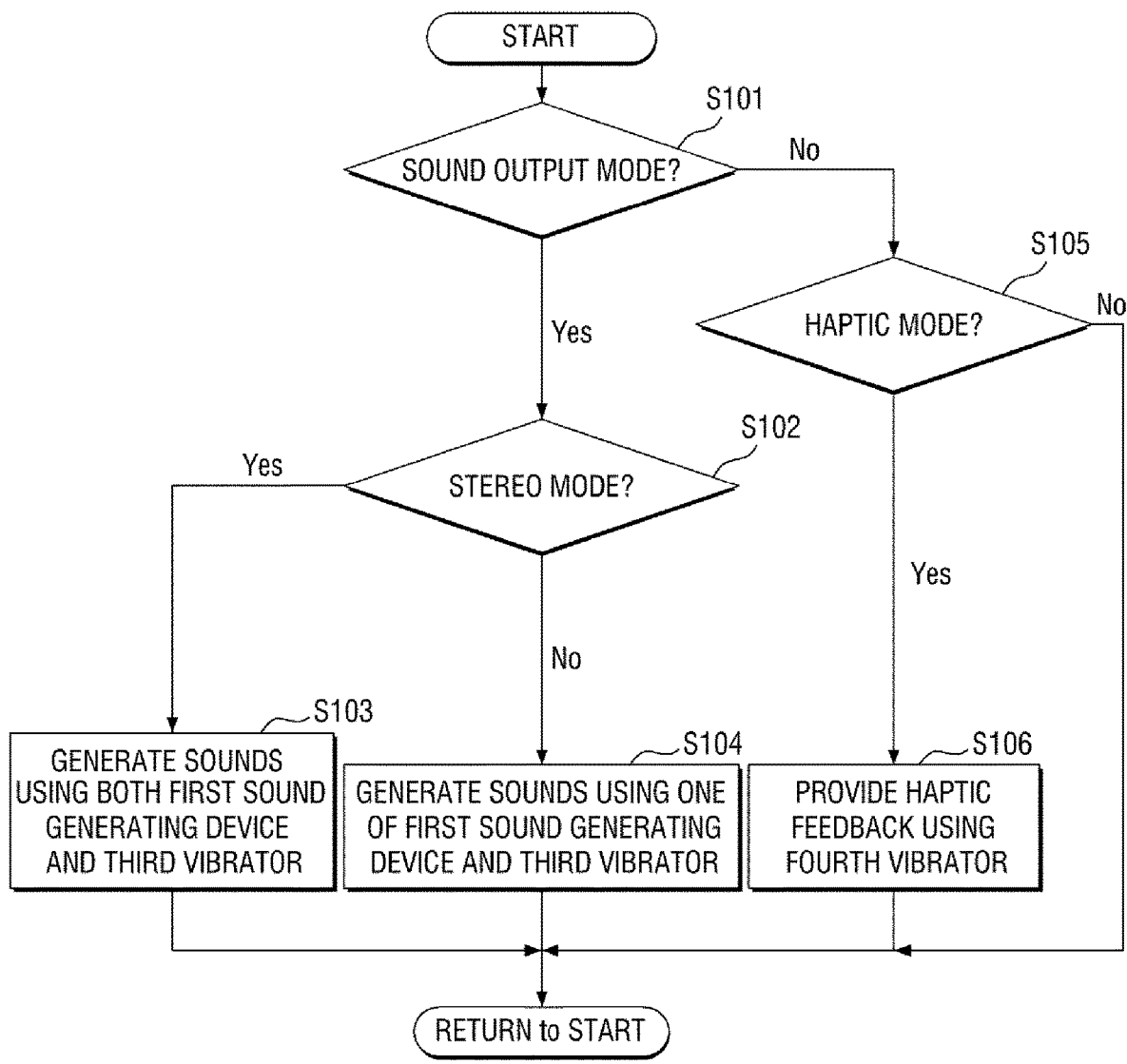
FIG. 30 is a flowchart illustrating a method of driving a display device according to an embodiment of the disclosure.

FIG. 26 is a cross-sectional view illustrating how a first sound is generated by the first sound generating device of FIG. 2, FIG. 27 is a cross-sectional view illustrating how a second sound is generated by the second sound generating device of FIG. 2, FIG. 28 is a cross-sectional view illustrating how stereo sounds are generated by the first and second sound generating devices of FIG. 2, FIG. 29 is a cross-sectional view illustrating how haptic feedback is realized by the second sound generating device of FIG. 2, and FIG. 30 is a flowchart illustrating a method of driving a display device according to an embodiment of the disclosure.

Referring to FIG. 26, in some embodiments, the display device 10 may realize a mono mode using the first sound generating device SG1. The mono mode is a mode for providing 1-channel sounds. In an embodiment, the display device 10 may realize the mono mode, during which a first sound S1 is output, by causing the first and second vibrators 510 and 520 of the first sound generating device SG1 to vibrate vertically.

Referring to FIG. 27, in some embodiments, the display device 10 may realize the mono mode using the second sound generating device SG2. In such an embodiment, the display device 10 may realize the mono mode, during which the first sound S1 is output, by causing the third vibrator 530 of the second sound generating device SG2 to vibrate vertically.

Referring to FIG. 28, in some embodiments, the display device 10 may realize a stereo mode using the first and second sound generating devices SG1 and SG2. The stereo mode may be a mode for providing stereo sounds of two or more channels to the user. In such an embodiment, the display device 10 may realize the stereo mode by causing the first and second vibrators 510 and 520 of the first sound generating device SG1 to vibrate vertically to output the first sound S1 and causing the third vibrator 530 of the second sound generating device SG2 to vibrate vertically to output the second sound S2. In such a manner, the display device 10 may realize the stereo mode. However, the disclosure is not limited thereto. In some embodiments, the display device 10 may realize the stereo mode by causing the first vibrator 510 of the first sound generating device SG1 to vibrate vertically to output the first sound S1 and causing the third vibrator 530 of the second sound generating device SG2 to vibrate vertically to output the second sound S2.

Since the first and second sounds S1 and S2 generated by the first and second sound generating devices SG1 and SG2, respectively, are output in a same direction, i.e., in the third direction (or the Z-axis direction), high-quality stereo sounds may be provided by the display device 10.

Referring to FIG. 29, in some embodiments, the display device 10 may realize a haptic mode using the second sound generating device SG2. The haptic mode is a mode for providing haptic feedback to the user by causing the display device 10 to vibrate horizontally HT. That is, the display device 10 may realize the haptic mode, during which the display device 10 vibrates horizontally HT, by causing the fourth vibrator 540 to vibrate horizontally.

A sound output method of the display device 10 according to an embodiment of the disclosure will hereinafter be described in detail with reference to FIGS. 26 through 29 and further to FIG. 30.

Referring to FIG. 30, the main processor 710 determines whether the display device 10 is being driven in a sound output mode (S101). The sound output mode is a mode for outputting sounds by executing an application such as a music player or a video player. Also, the sound output mode may further include a mode in which the user conducts a voice call or a video call via the display device 10 using a mobile communication module of the main circuit board 700.

Thereafter, when it is determined that the display device 10 is being driven in the sound output mode, the main processor 710 may determine whether the display device 10 is being driven in a stereo mode or a mono mode (S102).

Thereafter, when it is determined that the display device 10 is being driven in the stereo mode, the main processor 710 may control the first and second sounds S1 and S2 to be generated and output using the first and second vibrators 510 and 520 of the first sound generating device SG1 and the third vibrator 530 of the second sound generating device SG2 (S103), as illustrated in FIG. 28. However, the disclosure is not limited thereto. Alternatively, as described above, the stereo mode may be realized only using the third vibrator 530 of the second sound generating device SG2.

The main processor 710 may provide stereo sounds of two channels to the user by controlling the first and second sound generating devices SG1 and SG2 to generate the first and second sounds S1 and S2. In an embodiment, the main processor 710 may output first sound data to the sound driving unit 330 via the main circuit board 700 and the display circuit board 310, and the sound driving unit 330 may generate a first sound signal based on the first sound data and may output the first sound signal to the first sound generating device SG1 via the first sound circuit board SCB1. The first sound generating device SG1 may output the first sound S1 based on the first sound signal. In such an embodiment, the main processor 710 may output second sound data to the sound driving unit 330 via the main circuit board 700 and the display circuit board 310, and the sound driving unit 330 may generate a second sound signal based on the second sound data and may output the second sound signal to the second sound generating device SG2 via the second sound circuit board SCB2. The second sound circuit board SCB2 may output the second sound S2 based on the second sound signal.

When it is determined that the display device 10 is being driven in the mono mode, the main processor 710 may control sounds to be generated and output using the first and second vibrators 510 and 520 of the first sound generating device SG1 and the third vibrator 530 of the second sound generating device SG2 (S104).

In some embodiments, as illustrated in FIG. 26, the main processor 710 may control the first and second vibrators 510 and 520 of the first sound generating device SG1 to generate only the first sound. In an embodiment, the main processor 710 may output first sound data to the sound driving unit 330 via the main circuit board 700 and the display circuit board 310. The sound driving unit 330 may generate a first sound signal based on the first sound data and may output the first sound signal to the first sound generating device SG1. The first sound generating device SG1 may output the first sound S1 based on the first sound signal. In such an embodiment, the first sound generating device SG1 may output the first sound S1 based on the first sound signal via the first and second vibrators 510 and 520, but the disclosure is not limited thereto. Alternatively, the first sound generating device SG1 may output the first sound S1 based on the first sound signal via only one of the first and second vibrators 510 and 520.

In some embodiments, as illustrated in FIG. 27, the main processor 710 may control the second sound generating device SG2 to generate only the second sound S2. In an embodiment, the main processor 710 may output second sound data or a second sound signal to the third vibrator 530 of the second sound generating device SG2. The third vibrator 530 of the second sound generating device SG2 may output the second sound S2 based on the second sound signal generated based on the second sound data or based on the second sound signal from the main processor 710.

Thereafter, when it is determined that the display device 10 is not being driven in the stereo mode, the main processor 710 may determine whether the display device 10 is being driven in a haptic mode (S105).

Thereafter, when it is determined that the display device 10 is being driven in the haptic mode, the main processor 710 may control haptic feedback to be provided to the user (S106) by causing the display panel 300 to vibrate horizontally using the fourth vibrator 540 of the second sound generating device SG2, as illustrated in FIG. 29.

In the haptic mode, the main processor 710 may output haptic data to the sound driving unit 330 via the main circuit board 700 and the display circuit board 310. The sound driving unit 330 may generate an AC voltage based on the haptic data. The sound driving unit 330 may output the AC voltage to the fourth vibrator 540 of the second sound generating device SG2 via the second sound circuit board SCB2.

The fourth vibrator 540 of the second sound generating device SG2 may vibrate horizontally in accordance with an AC voltage. The display panel 300 may vibrate horizontally in accordance with the horizontal vibration of the fourth vibrator 540 of the second sound generating device SG2, and as a result, haptic feedback may be effectively provided to the user. The second sound generating device SG2 may vibrate vertically in the sound output mode and may vibrate horizontally in the haptic mode.

Figure 31:
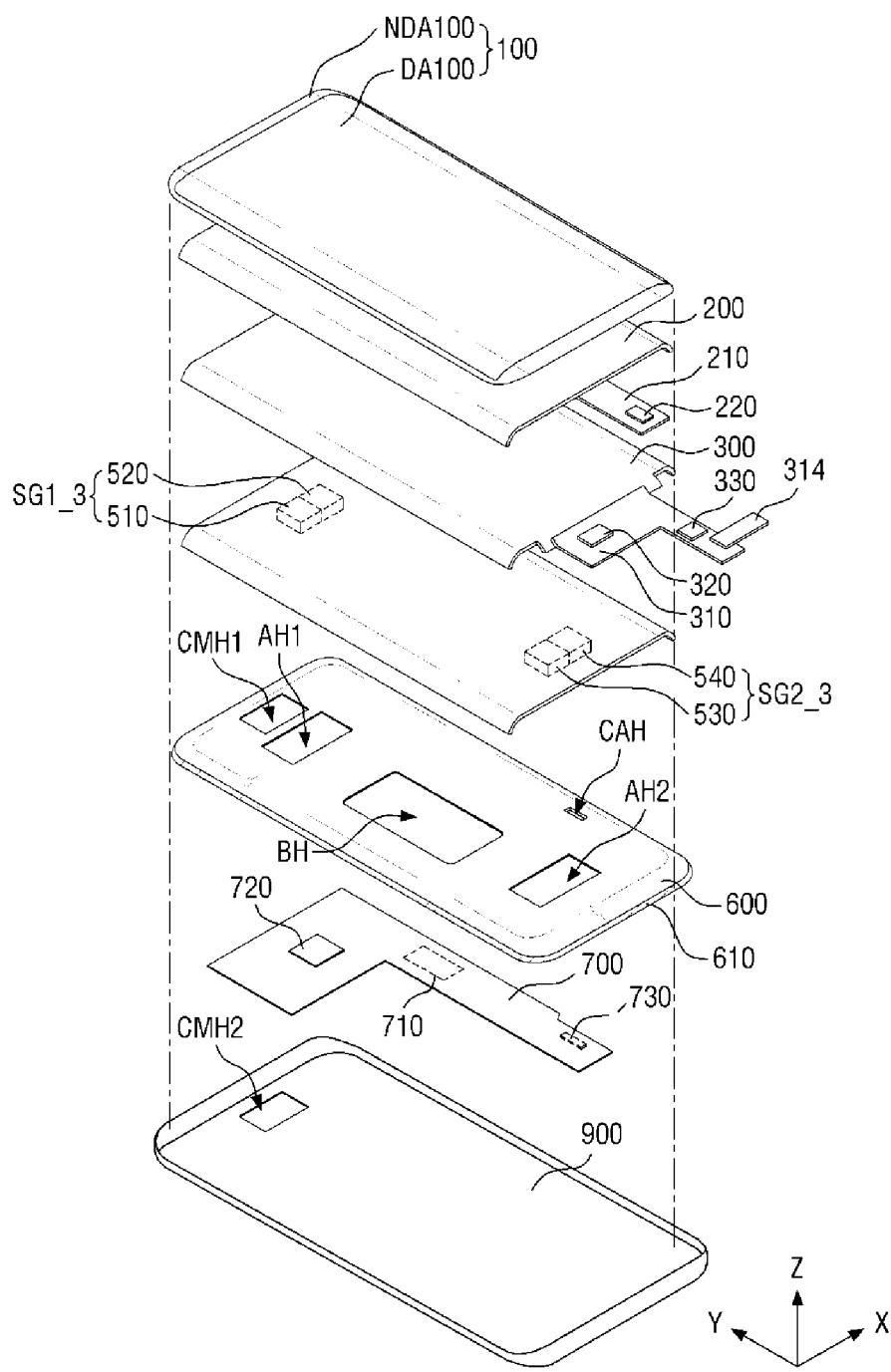
FIG. 31 is an exploded perspective view of a display device according to an alternative embodiment of the disclosure.
Figure 32:
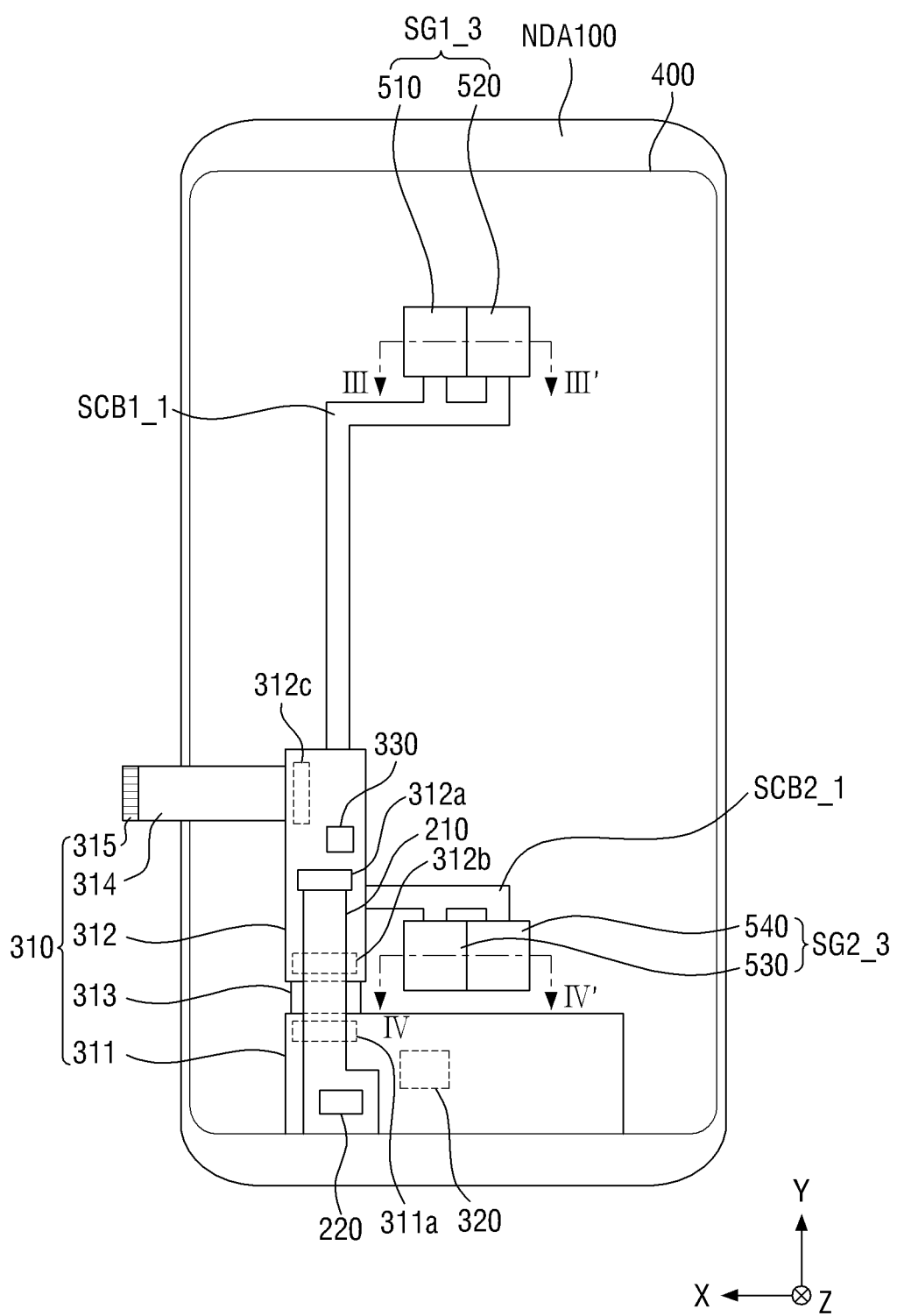
FIG. 32 is a bottom view illustrating a cover window, a touch circuit board, a display panel, a display circuit board, a panel bottom member, a first sound generating device, a second sound generating device, a first sound circuit board, and a second sound circuit board of FIG. 31.
Figure 33:
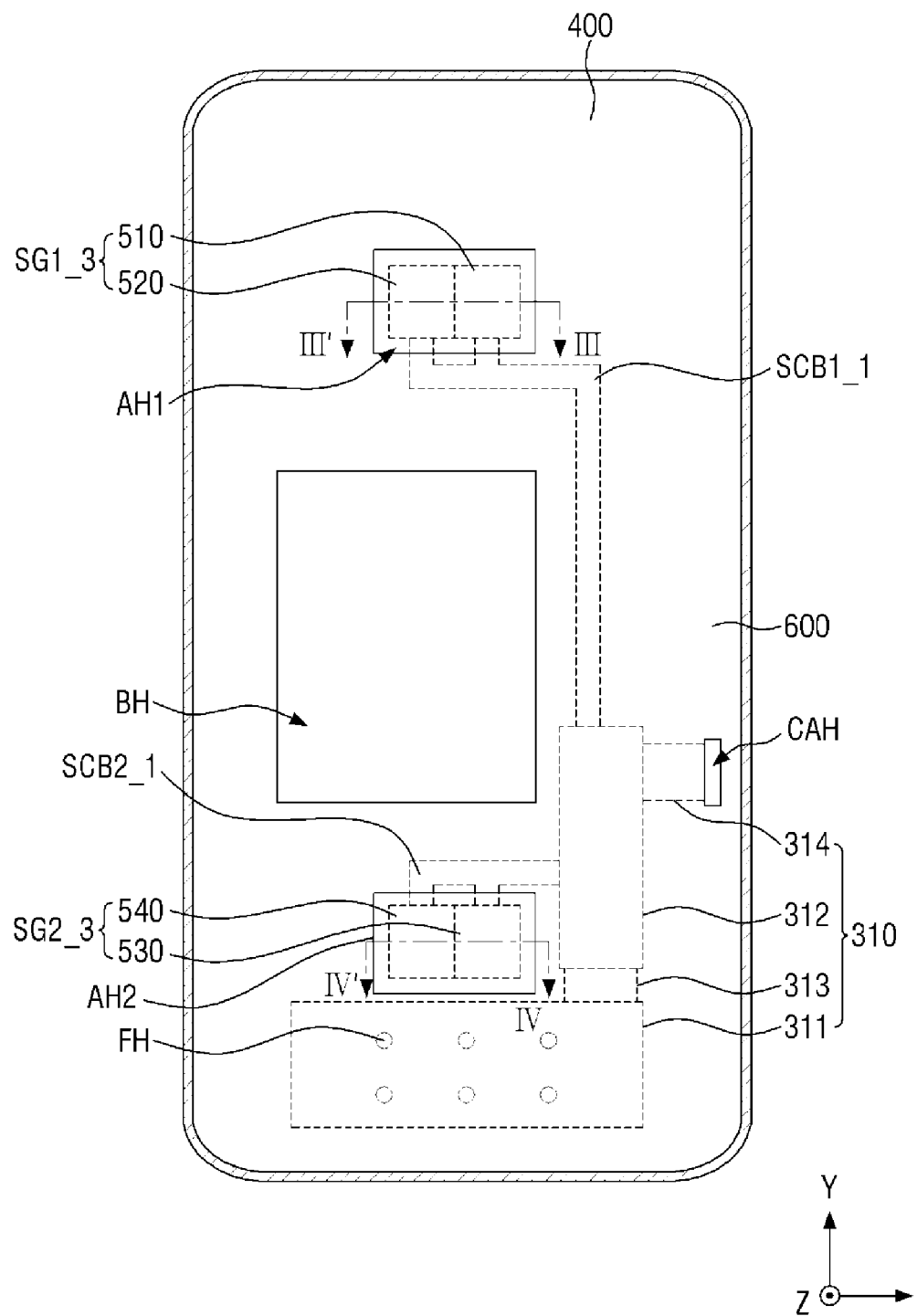
FIG. 33 is a bottom view illustrating the display circuit board, a second connection cable, the first sound generating device, the first sound circuit board, the second sound generating device, the second sound circuit board, and a middle frame of FIG. 31.

FIG. 31 is an exploded perspective view of a display device according to an alternative embodiment of the disclosure, and FIG. 32 is a bottom view illustrating a cover window, a touch circuit board, a display panel, a display circuit board, a panel bottom member, a first sound generating device, a second sound generating device, a first sound circuit board, and a second sound circuit board of FIG. 31. FIG. 33 is a bottom view illustrating the display circuit board, a second connection cable, the first sound generating device, the first sound circuit board, the second sound generating device, the second sound circuit board, and a middle frame of FIG. 31. The embodiment of FIGS. 31 through 33 is substantially the same as the embodiment of FIGS. 2 through 4 except for the arrangement of the first and second sound generating devices. The embodiment of FIGS. 31 through 33 will hereinafter be described, focusing mainly on the difference(s) with the embodiment of FIGS. 2 through 4.

In an embodiment, first and second sound generating devices SG1_3 and SG2_3 may be disposed below a panel bottom member 400.

Figure 34:
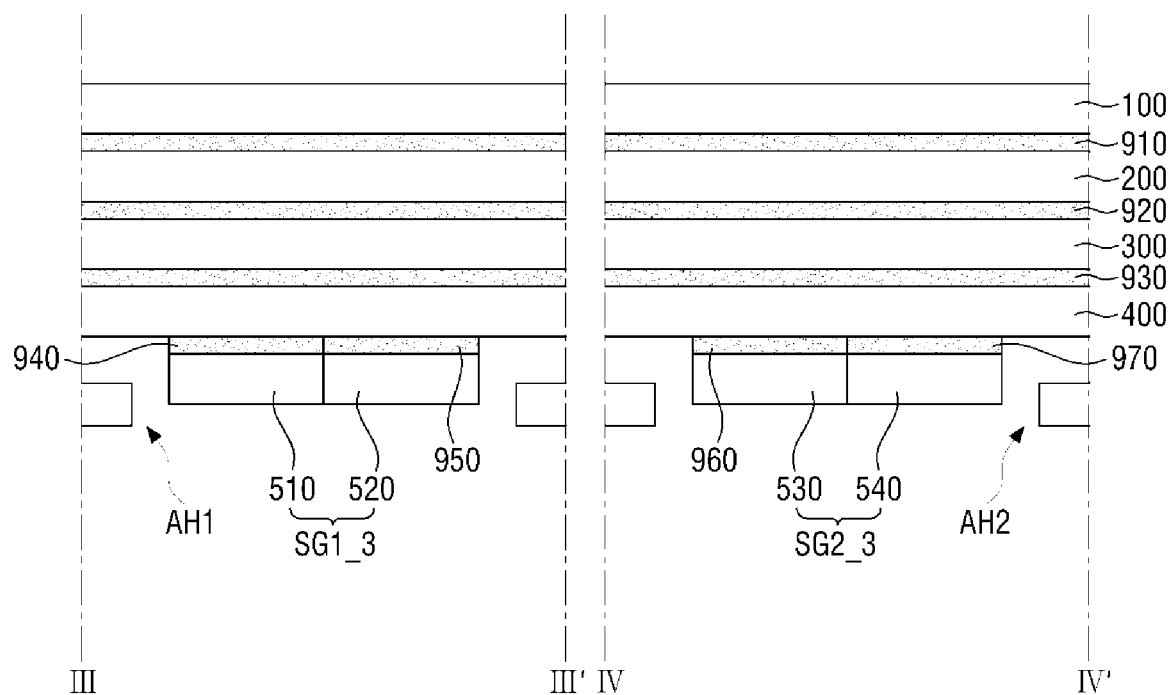
FIG. 34 is a cross-sectional view taken along lines and IV-IV' of FIG. 32 or 33.

The first sound generating device SG1_3 may include first and second vibrators 510 and 520. The first and second vibrators 510 and 520 may be disposed to overlap each other in a first direction (or an X-axis direction). In one embodiment, for example, the first and second vibrators 510 and 520 may overlap each other in the first direction (or the X-axis direction) and may be attached to the bottom surface of the panel bottom member 400. As illustrated in FIG. 34, the first vibrator 510 may be attached to the bottom surface of the panel bottom member 400 via a fourth adhesive member 940, and the second vibrator 520 may be attached to the bottom surface of the panel bottom member 400 via a fifth adhesive member 950. However, the disclosure is not limited thereto. In some embodiments, the first and second vibrators 510 and 520 of the first sound generating device SG1_3 may be disposed to overlap each other in a second direction (or a Y-axis direction) or may be disposed not to overlap each other in the first direction (or the X-axis direction), in the second direction (or the Y-axis direction), or in a third direction (or a Z-axis direction).

The second sound generating device SG2_3 may include third and fourth vibrators 530 and 540. The third and fourth vibrators 530 and 540 may be disposed to overlap each other in the first direction (or the X-axis direction). In one embodiment, for example, the third and fourth vibrators 530 and 540 may overlap each other in the first direction (or the X-axis direction) and may be attached to the bottom surface of the panel bottom member 400. As illustrated in FIG. 34, the third vibrator 530 may be attached to the bottom surface of the panel bottom member 400 via a sixth adhesive member 960, and the fourth vibrator 540 may be attached to the bottom surface of the panel bottom member 400 via a seventh adhesive member 970. However, the disclosure is not limited thereto. In some embodiments, the third and fourth vibrators 530 and 540 of the second sound generating device SG2_3 may be disposed to overlap each other in the second direction (or the Y-axis direction) or may be disposed not to overlap each other in the first direction (or the X-axis direction), in the second direction (or the Y-axis direction), or in a third direction (or a Z-axis direction).

The first sound generating device SG1_3 may include a piezoelectric actuator, an LRA, or an exciter. In some embodiments, the first sound generating device SG1_3 may include the first and second vibrators 510 and 520, and the first and second vibrators 510 and 520 may be implemented as a piezoelectric actuator and an LRA, respectively. In some embodiments, the first sound generating device SG1_3 may include the first and second vibrators 510 and 520, and the first and second vibrators 510 and 520 may be implemented as a piezoelectric actuator and an exciter, respectively. In some embodiments, the first and second vibrators 510 and 520 may be implemented as an LRA and an exciter, respectively. In some embodiments, the first sound generating device SG1_3 may include three or more vibrators, which include a piezoelectric actuator, an LRA and an exciter.

The second sound generating device SG2_3 may include a piezoelectric actuator and an LRA. In some embodiments, the second sound generating device SG2_3 may include the third and fourth vibrators 530 and 540, and the third and fourth vibrators 530 and 540 may be implemented as a piezoelectric actuator and an LRA, respectively.

The first, second, and third vibrators 510, 520, and 530 may vibrate vertically, and the fourth vibrator 540 may vibrate horizontally. In one embodiment, for example, the first, second, and third vibrators 510, 520, and 530 may cause the display panel 300 to vibrate vertically to output sounds, and the fourth vibrator 540 may cause the display panel 300 to vibrate horizontally to provide haptic feedback. The first, second, third, and fourth vibrators 510, 520, 530, and 540 are substantially the same as those described above, and thus, any repetitive detailed descriptions thereof will be omitted.

The first sound generating device SG1_3 may be connected to a first sound circuit board SCB1_1, and the second sound generating device SG2_3 may be connected to a second sound circuit board SCB2_1. In an embodiment, one end of the first sound circuit board SCB1_1 may be connected to sound pad areas provided on first sides of the first and second vibrators 510 and 520 of the first sound generating device SG1_3. One end of the second sound circuit board SCB2_1 may be connected to sound pad areas provided on first sides of the third and fourth vibrators 530 and 540 of the second sound generating device SG2_3.

The first and second sound circuit boards SCB1_1 and SCB2_1 may be connected to a sound driving unit 330 of a display circuit board 310. Accordingly, the first and second sound generating devices SG1_3 and SG2_3 may vibrate in accordance with first and second driving voltages from the sound driving unit 330 and thus output sounds or provide haptic feedback. In one embodiment, for example, in a sound output mode, the sound driving unit 330 may output sounds by causing the display panel 300 to vibrate vertically using the first and second vibrators 510 and 520 of the first sound generating device SG1_3 and the third vibrator 530 of the second sound generating device SG2_3, and in a haptic mode, the sound driving unit 330 may provide haptic feedback to a user by causing the display panel 300 to vibrate horizontally using the fourth vibrator 540 of the second sound generating device SG2_3.

A first receiving hole AH1 for receiving the first and second vibrators 510 and 520 of the first sound generating device SG1_3 and a second receiving hole AH2 for receiving the third and fourth vibrators 530 and 540 of the second sound generating device SG2_3 may be defined or formed in a middle frame 600. The width of the first receiving hole AH1 may be greater than the width of the first sound generating device SG1_3, and the width of the second receiving hole AH2 may be greater than the width of the second sound generating device SG2_3. Also, in some embodiments, the first and second receiving holes AH1 and AH2 may be integrally formed with a battery hole BH as a single hole. In such an embodiment, the first and second receiving holes AH1 and AH2 may be connected to the battery hole BH.

According to an embodiment, as shown in FIGS. 31 through 33, the first and second vibrators 510 and 520 of the first sound generating device SG1_3 may overlap each other in the first direction (or the X-axis direction) and may be attached to the bottom surface of the panel bottom member 400, and the third and fourth vibrators 530 and 540 of the second sound generating device SG2_3 may overlap each other in the first direction (or the X-axis direction) and may be attached to the bottom surface of the panel bottom member 400. Accordingly, stereo sounds that are output in the same direction can become further richer, and high-quality haptic feedback can be provided to the user.

FIG. 34 is a cross-sectional view taken along lines and IV-IV' of FIG. 32 or 33.

A cover window 100, a touch sensing device 200, the display panel 300, the panel bottom member 400, a first adhesive member 910, a second adhesive member 920, and a third adhesive member 930 of FIG. 34 are substantially the same as those described above, and thus, any repetitive detailed descriptions thereof will be omitted.

Referring to FIG. 34, the first sound generating device SG1_3 may be disposed below the panel bottom member 400. In an embodiment, the first vibrator 510 may be attached to the bottom surface of the panel bottom member 400 via the fourth adhesive member 940, and the second vibrator 520 may be attached to the bottom surface of the panel bottom member 400 via the fifth adhesive member 950. In such an embodiment, the first and second vibrators 510 and 520 may be in contact with each other and may overlap each other in the first direction (or the X-axis direction).

The first and second vibrators 510 and 520 of the first sound generating device SG1_3 may overlap the first receiving hole AH1 in the third direction (or the Z-axis direction). In one embodiment, for example, the first and second vibrators 510 and 520 of the first sound generating device SG1_3 may be disposed in the first receiving hole AH1.

The second sound generating device SG2_3 is disposed below the panel bottom member 400. In an embodiment, the third vibrator 530 may be attached to the bottom surface of the panel bottom member 400 via the sixth adhesive member 960, and the fourth vibrator 540 may be attached to the bottom surface of the panel bottom member 400 via the seventh adhesive member 970. In such an embodiment, the first and second vibrators 510 and 520 may be in contact with each other and may overlap each other in the first direction (or the X-axis direction).

The first and second vibrators 530 and 540 of the second sound generating device SG2_3 may overlap the second receiving hole AH2 in the third direction (or the Z-axis direction). In one embodiment, for example, the third and fourth vibrators 530 and 540 of the second sound generating device SG1_3 may be disposed in the second receiving hole AH2.

Figure 35:
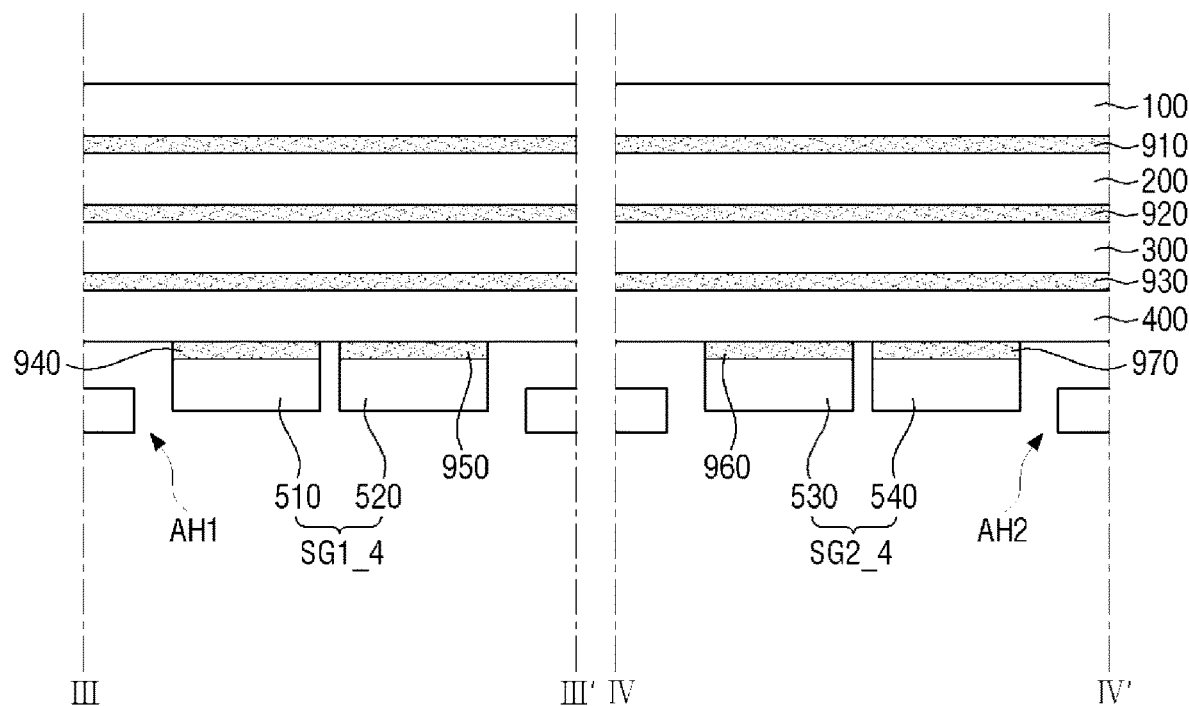
FIG. 35 is a cross-sectional view, taken along lines and IV-IV' of FIG. 32 or 33, of a display device according to an alternative embodiment of the disclosure.
Figure 35:
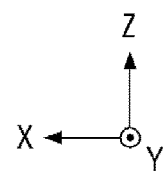

FIG. 35 is a cross-sectional view, taken along lines and IV-IV' of FIG. 32 or 33, of a display device according to an alternative embodiment of the disclosure.

Referring to FIG. 35, a first vibrator 510 of a first sound generating device SG1_4 may be attached to the bottom surface of a panel bottom member 400 via a fourth adhesive member 940, and a second vibrator 520 of the first sound generating device SG1_4 may be attached to the bottom surface of the panel bottom member 400 via a fifth adhesive member 950. The first and second vibrators 510 and 520 of the first sound generating device SG1_4 may not be in contact with each other. In one embodiment, for example, the first and second vibrators 510 and 520 may overlap, but may be spaced apart from, each other in a first direction (or an X-axis direction), but the disclosure is not limited thereto. In some embodiments, the first and second vibrators 510 and 520 may overlap, but may be spaced apart from, each other in a second direction (or a Y-axis direction). In some embodiments, the first and second vibrators 510 and 520 may not overlap and be spaced apart from each other in the first direction (or the X-axis direction), in the second direction (or the Y-axis direction), or in a third direction (or a Z-axis direction).

The first and second vibrators 510 and 520 of the first sound generating device SG1_4 may overlap a first receiving hole AH1 in the third direction (or the Z-axis direction). In one embodiment, for example, the first and second vibrators 510 and 520 of the first sound generating device SG1_4 may be disposed in the first receiving hole AH1, but the disclosure is not limited thereto. Alternatively, the first and second vibrators 510 and 520 may be disposed in different receiving holes from each other.

A third vibrator 530 of a second sound generating device SG2_4 may be attached to the bottom surface of the panel bottom member 400 via a sixth adhesive member 960, and a fourth vibrator 540 of the second sound generating device SG2_4 may be attached to the bottom surface of the panel bottom member 400 via a seventh adhesive member 970. The third and fourth vibrators 530 and 540 of the second sound generating device SG2_4 may not be in contact with each other. In one embodiment, for example, the third and fourth vibrators 530 and 540 may overlap, but may be spaced apart from, each other in the first direction (or the X-axis direction), but the disclosure is not limited thereto. In some embodiments, the third and fourth vibrators 530 and 540 may overlap, but may be spaced apart from, each other in the second direction (or the Y-axis direction). In some embodiments, the third and fourth vibrators 530 and 540 may not overlap and be spaced apart from each other in the first direction (or the X-axis direction), in the second direction (or the Y-axis direction), or in the third direction (or the Z-axis direction).

The third and fourth vibrators 530 and 540 of the second sound generating device SG2_4 may overlap a second receiving hole AH2 in the third direction (or the Z-axis direction). In one embodiment, for example, the third and fourth vibrators 530 and 540 of the second sound generating device SG2_4 may be disposed in the second receiving hole AH2, but the disclosure is not limited thereto. Alternatively, the third and fourth vibrators 530 and 540 may be disposed in different receiving holes from each other.

Figure 36:
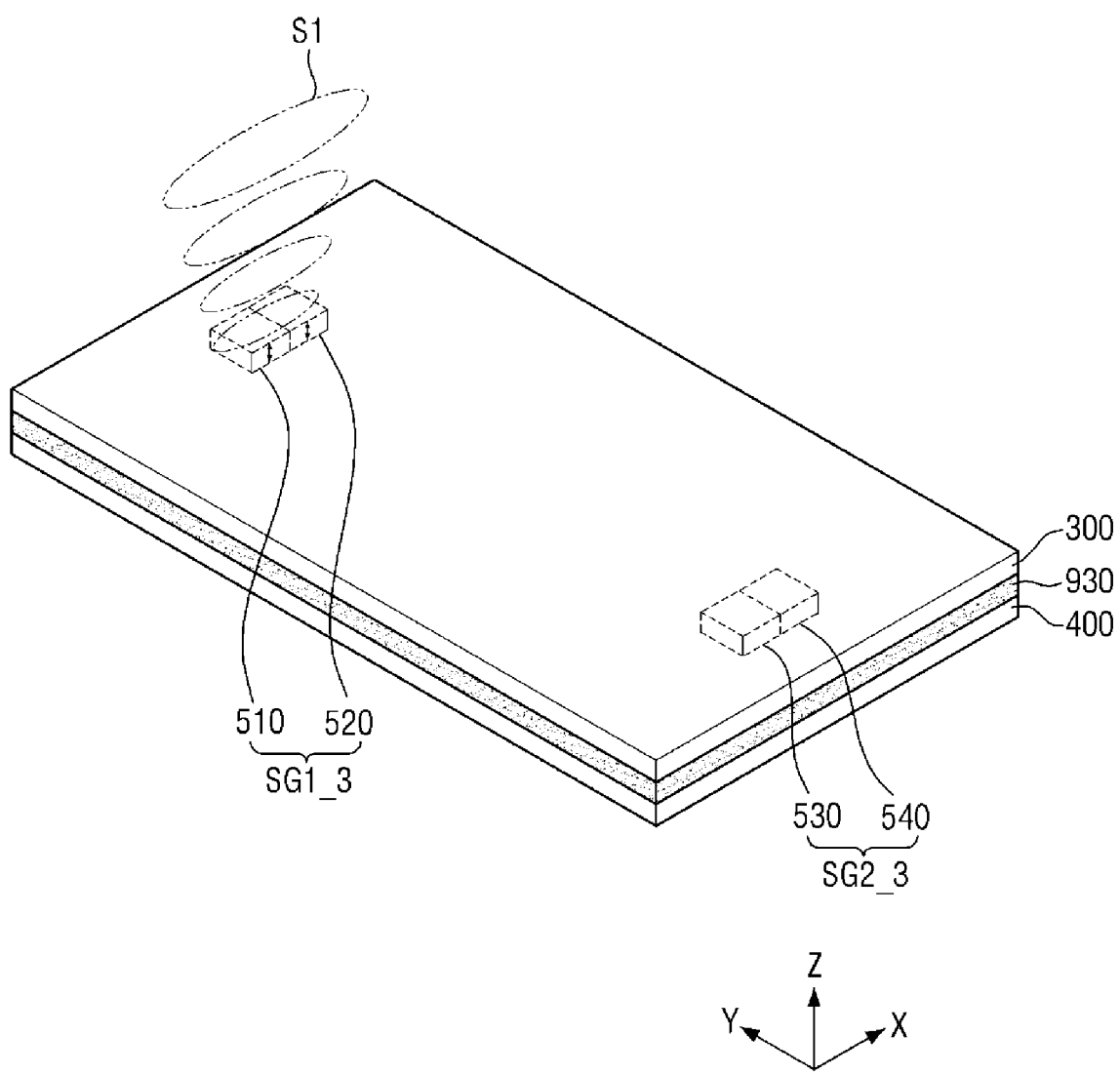
FIG. 36 is a perspective view illustrating how a first sound is generated by the first sound generating device of FIG. 31.
Figure 37:
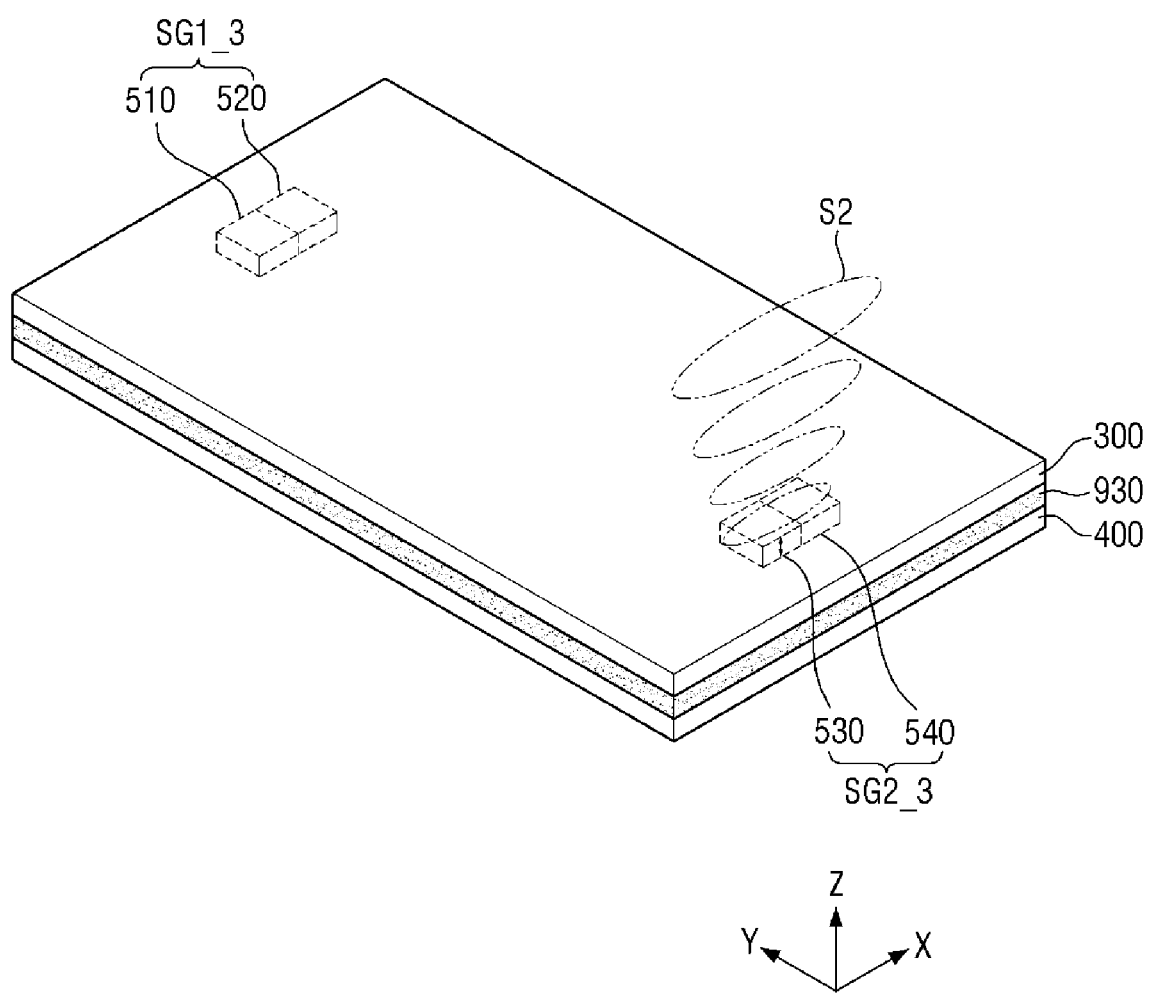
FIG. 37 is a perspective view illustrating how a second sound is generated by the second sound generating device of FIG. 31.
Figure 38:
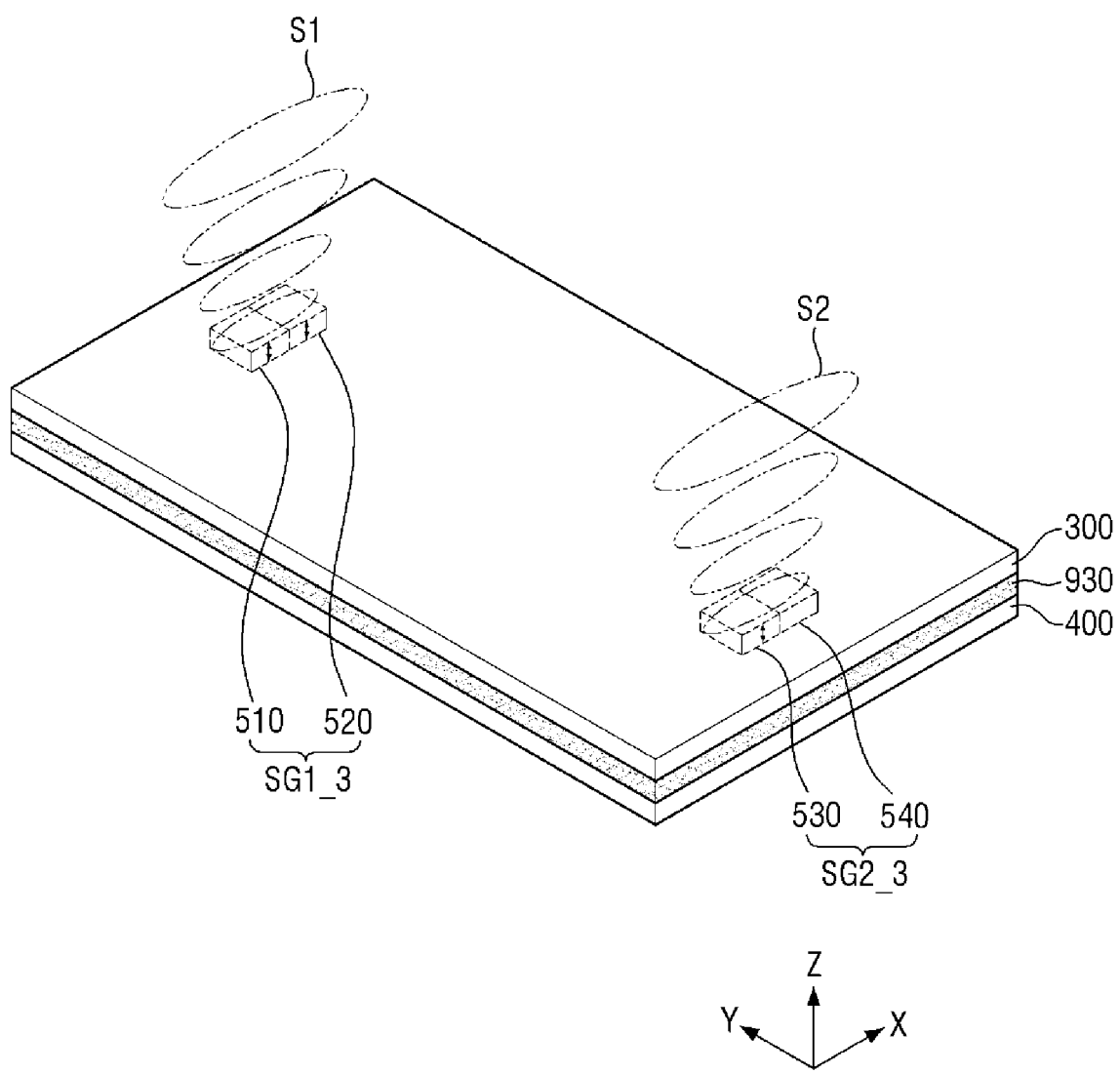
FIG. 38 is a perspective view illustrating how stereo sounds are generated by the first and second sound generating devices of FIG. 31.
Figure 39:
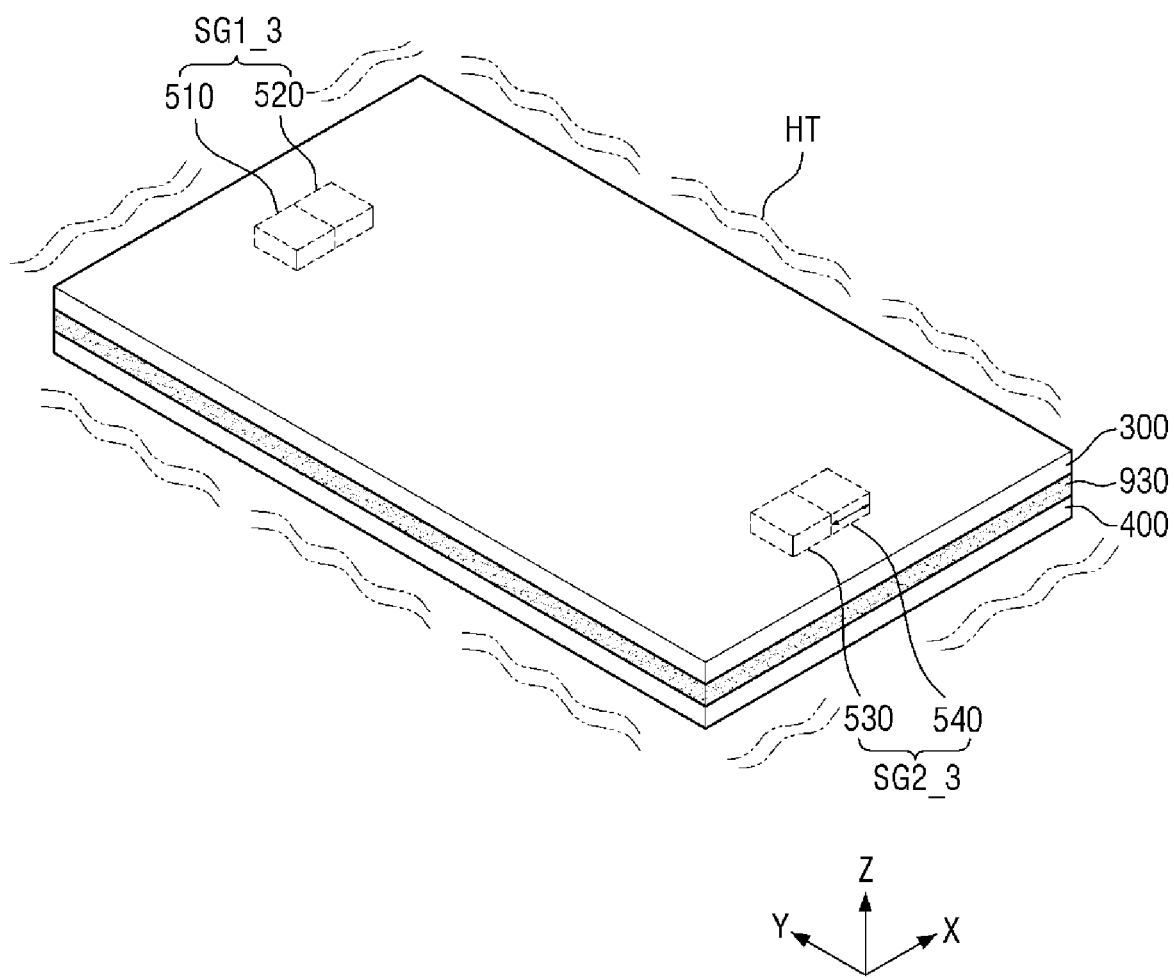
FIG. 39 is a perspective view illustrating how haptic feedback is realized by the second sound generating device of FIG. 31.

FIG. 36 is a perspective view illustrating how a first sound is generated by the first sound generating device of FIG. 31, FIG. 37 is a perspective view illustrating how a second sound is generated by the second sound generating device of FIG. 31, FIG. 38 is a perspective view illustrating how stereo sounds are generated by the first and second sound generating devices of FIG. 31, and FIG. 39 is a perspective view illustrating how haptic feedback is realized by the second sound generating device of FIG. 31.

Referring to FIG. 36, in some embodiments, the first and second sound generating devices SG1_3 and SG2_3 may be disposed adjacent to a pair of short sides of a display device 10 that are opposite to each other, respectively, but the disclosure is not limited thereto. Alternatively, the first and second sound generating devices SG1_3 and SG2_3 may be disposed adjacent to a pair of long sides of the display device 10 that are opposite to each other, respectively. Still alternatively, the first sound generating device SG1_3 may be disposed adjacent to one of the short sides of the display device 10, and the second sound generating device SG2_3 may be disposed adjacent to one of the long sides of the display device 10.

A mono mode may be realized using the first sound generating device SG1_3. In an embodiment, the display device 10 may realize the mono mode, during which a first sound S1 is output, by causing the first and second vibrators 510 and 520 of the first sound generating device SG1_3 to vibrate vertically, but the disclosure is not limited thereto. Alternatively, the first sound generating device SG1_3 may realize the mono mode by causing one of the first and second vibrators 510 and 520 to vibrate vertically.

Referring to FIG. 37, in some embodiments, the display device 10 may realize the mono mode using the second sound generating device SG2_3. In an embodiment, the display device 10 may realize the mono mode, during which the first sound S1 is output, by causing the third vibrator 530 of the second sound generating device SG2_3 to vibrate vertically.

Referring to FIG. 38, in some embodiments, the display device 10 may realize a stereo mode using the first and second sound generating devices SG1_3 and SG2_3. In one embodiment, for example, the display device 10 may realize the stereo mode by causing the first and second vibrators 510 and 520 of the first sound generating device SG1_3 to vibrate vertically output the first sound S1 and causing the third vibrator 530 of the second sound generating device SG2_3 to vibrate vertically to output the second sound S2, but the disclosure is not limited thereto. In some embodiments, the display device 10 may realize the stereo mode by causing the first vibrator 510 of the first sound generating device SG1_3 to vibrate vertically to output the first sound S1 and causing the third vibrator 530 of the second sound generating device SG2_3 to vibrate vertically to output the second sound S2.

Since the first and second sounds S1 and S2 generated by the first and second sound generating devices SG1_3 and SG2_3, respectively, are output in a same direction, i.e., in the third direction (or the Z-axis direction), high-quality stereo sounds may be provided. Also, since the first, second, and third vibrators 510, 520, and 530 are attached to the panel bottom member 400, further richer stereo sounds may be provided.

Referring to FIG. 39, in some embodiments, the display device 10 may realize a haptic mode using the second sound generating device SG2_3. In one embodiment, for example, the display device 10 may realize the haptic mode, during which the display device 10 vibrates horizontally ("HT"), by causing the fourth vibrator 540 of the second sound generating device SG2_3 to vibrate horizontally. In such an embodiment, since the fourth vibrator 530 is attached directly to the panel bottom member 400, high-quality haptic feedback may be provided to the user.

Figure 40:
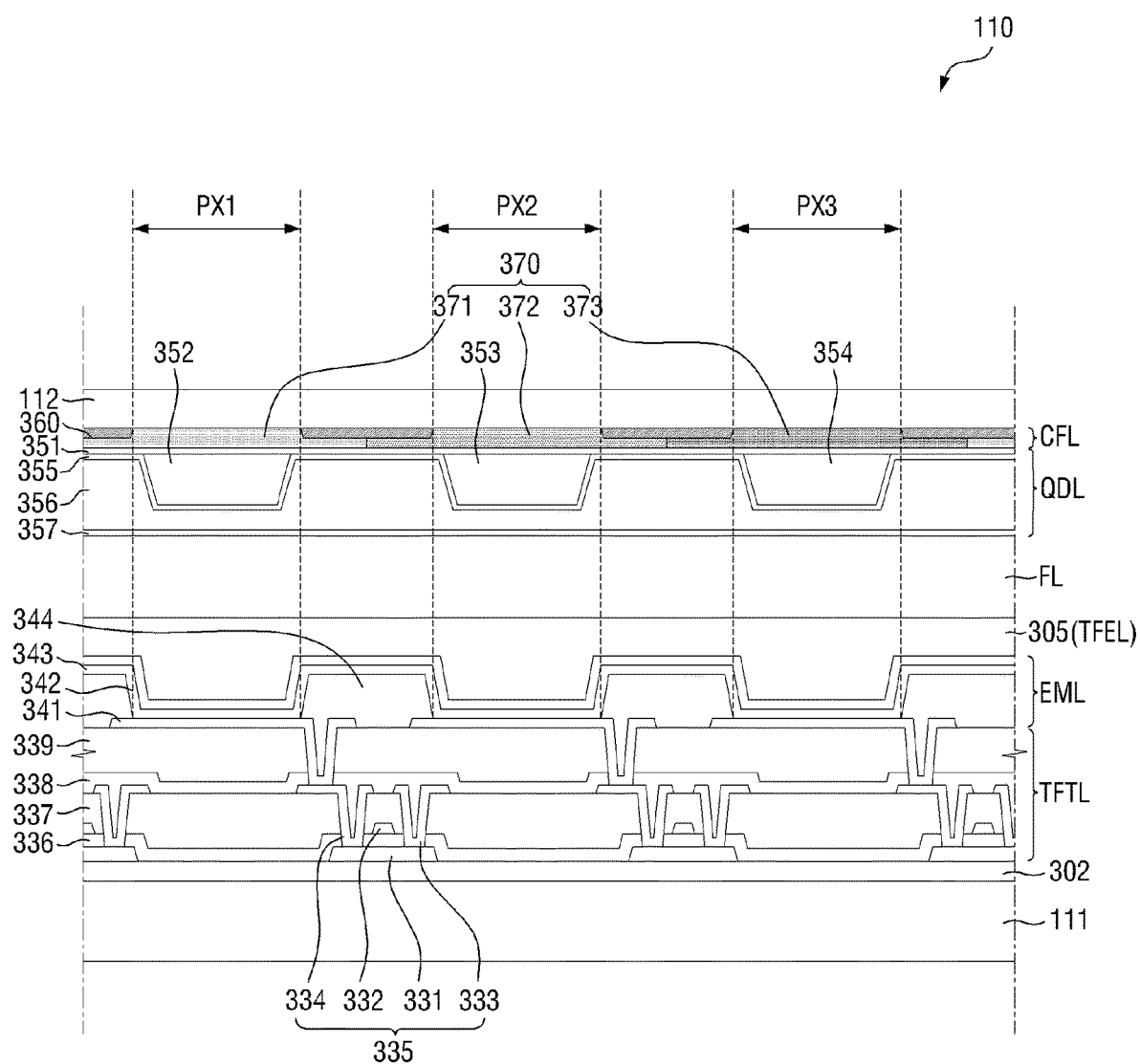
FIG. 40 is a cross-sectional view illustrating a display area of an exemplary embodiment of the display panel.

FIG. 40 is a cross-sectional view illustrating a display area of an exemplary embodiment of the display panel.

Referring to FIG. 40, an embodiment of a display panel 110 may include a first substrate 111, a second substrate 112, a thin-film transistor ("TFT") layer TFTL, a light-emitting element layer EML, a thin-film encapsulation layer ("TFEL") 305, a filler member FL, a wavelength conversion layer QDL, and a color filter layer CFL.

A buffer film 302 may be disposed on a surface of the first substrate 111 that faces the second substrate 112. The buffer film 302 may be disposed on the first substrate 111 to protect TFTs 335 and light-emitting elements against moisture penetrating the first substrate 111, which is susceptible to moisture. The buffer film 302 may include a plurality of inorganic films that are alternately stacked one on another. In one embodiment, for example, the buffer film 302 may be a multilayer film in which a silicon oxide (SiOx) film, a silicon nitride (SiNx) film, and/or a silicon oxynitride (SiON) film are alternately stacked one on another. In an alternative embodiment, the buffer film 302 may be omitted.

The TFT layer TFTL is disposed on the buffer film 302. The TFT layer TFTL includes TFTs 335, a gate insulating film 336, an interlayer insulating film 337, a passivation film 338, and a planarization film 339.

The TFTs 335 are disposed on the buffer film 302. Each of the TFTs 335 includes an active layer 331, a gate electrode 332, a source electrode 333, and a drain electrode 334. FIG. 40 illustrates an embodiment where the TFTs 335 has a top gate structure in which the gate electrode 332 is disposed above the active layer 331, but the disclosure is not limited thereto. Alternative, the TFTs 335 may have a bottom gate structure in which the gate electrode 332 is disposed below the active layer 331 or a double gate structure in which the gate electrode 332 is disposed both above and below the active layer 331.

The active layer 331 is disposed on the buffer film 302. The active layer 331 may include or be formed of a silicon-based semiconductor material or an oxide-based semiconductor material. A light-shielding layer for blocking external light incident on the active layer 331 may be disposed between the buffer layer and the active layer 331.

A gate insulating film 336 may be disposed on the active layer 331. The gate insulating film 336 may be an inorganic film such as, for example, a silicon oxide film, a silicon nitride film, or a multilayer film thereof.

The gate electrode 332 and a gate line may be disposed on the gate insulating film 316. The gate electrode 332 and the gate line may have a single-layer structure or a multilayer structure including layers, each formed of molybdenum (Mo), Al, chromium (Cr), gold (Au), titanium (Ti), Ni, neodymium (Ne), copper (Cu), or an alloy thereof.

The interlayer insulating film 337 may be disposed on the gate electrode 332 and the gate line. The interlayer insulating film 337 may be an inorganic film such as, for example, a silicon oxide film, a silicon nitride film, or a multilayer film thereof.

The source electrode 333, the drain electrode 334, and a data line may be disposed on the interlayer insulating film 337. The source electrode 333 and the drain electrode 334 may be connected to the active layer 331 through contact holes defined through the gate insulating film 336 and the interlayer insulating film 337. The source electrode 333, the drain electrode 334, and the data line may have a single-layer structure or a multilayer structure including a plurality of layers, each including Mo, Al, Cr, Au, Ti, Ni, Ne, Cu, or an alloy thereof.

The passivation film 338 may be disposed on the source electrode 333, the drain electrode 334, and the data line to insulate the TFTs 335. The passivation film 338 may be an inorganic film such as, for example, a silicon oxide film, a silicon nitride film, or a multilayer film thereof.

The planarization film 339 may be disposed on the passivation film 338 to planarize height differences formed by the TFTs 335. The planarization film 339 may be an organic film using an acrylic resin, an epoxy resin, a phenolic resin, a polyamide resin, or a polyimide resin.

The light-emitting element layer EML is disposed on the TFT layer TFTL. The light-emitting element layer EML includes light-emitting elements and a pixel defining film 344.

The light-emitting elements and the pixel defining film 344 are disposed on the planarization film 339. The light-emitting elements may be OLEDs. In such an embodiment, each of the light-emitting elements may include an anode electrode 341, a light-emitting layer 342, and a cathode electrode 343.

The anode electrode 341 may be disposed on the planarization film 339. The anode electrode 341 may be connected to the source electrode 333 through a contact hole defined through the passivation film 338 and the planarization film 339.

The pixel defining film 344 may be disposed to cover the edges of the anode electrode 341 to define a corresponding pixel. In an embodiment, the pixel defining film 344 may define a plurality of first, second, and third subpixels PX1, PX2, and PX2. Each of the first, second, and third subpixels PX1, PX2, and PX3 may be a region in which the anode electrode 341, the light-emitting layer 342, and the cathode electrode 343 are sequentially stacked and holes from the anode electrode 341 and electrons from the cathode electrode 343 are combined in the light-emitting layer 342 to emit light.

The light-emitting layer 342 may be disposed on the anode electrode 341 and the pixel defining film 344. The light-emitting layer 342 may be an organic light-emitting layer. The light-emitting layer 342 may emit a blue light or short-wavelength light such as ultraviolet ("UV") light. The peak wavelength range of the blue light may be about 450 nanometers (nm) to 490 nm, and the peak wavelength range of the UV light may be 450 nm or shorter. In such an embodiment, the light-emitting layer 342 may be a common layer formed in common for all the first, second, and third subpixels PX1, PX2, and PX3, and the display panel 110 may include the light wavelength conversion layer QDL, which converts the blue light or the short-wavelength light (such as UV light) emitted by the light-emitting layer 342 into a red light, a green light, and a blue light, and the color filter layer CFL, which transmits a red light, a green light, and a blue light therethrough.

The light-emitting layer 342 may include a hole transport layer, an emission layer, and an electron transport layer. The light-emitting layer 342 may have a tandem structure with two or more stacks, in which case, a charge generating layer may be formed between the stacks.

The cathode electrode 343 may be disposed on the light-emitting layer 342. The cathode electrode 343 may be disposed to cover the light-emitting layer 342. The cathode electrode 343 may be a common layer formed commonly for all pixels or disposed to cover all pixels.

The light-emitting element layer EML may be formed as a top emission-type light-emitting element layer that emits light in a direction toward the second substrate 112, i.e., in an upper direction. In such an embodiment, the anode electrode 341 may include or be formed of a metal material with high reflectance such as a stack of Al and Ti (e.g., Ti/Al/Ti), a stack of Al and indium tin oxide ("ITO") (e.g., ITO/Al/ITO), a silver (Ag)-palladium (Pd)-copper (Cu) ("APC") alloy, or a stack of an APC alloy and ITO (e.g., ITO/APC/ITO), and the cathode electrode 343 may include or be formed of a transparent conductive oxide ("TCO") material such as ITO or indium zinc oxide ("IZO") that transmits light therethrough or a semi-transmissive conductive material such as magnesium (Mg), Ag, or an alloy thereof. In an embodiment where the cathode electrode 343 is formed of a semi-transmissive conductive material, the emission efficiency of the light-emitting element layer EML may be improved due to a micro-cavity effect.

The TFEL 305 is disposed on the light-emitting element layer EML. The TFEL 305 effectively prevents oxygen or moisture from infiltrating into the light-emitting layer 342 and the cathode electrode 343. In such an embodiment, the TFEL 305 may include an inorganic film. The inorganic film may include or be formed of silicon nitride, aluminum nitride, zirconium nitride, titanium nitride, hafnium nitride, tantalum nitride, silicon oxide, aluminum oxide, or titanium oxide. The TFEL 305 may further include an organic film. The organic film may have a sufficient thickness to effectively prevent foreign particles from entering into the light-emitting layer 342 and the cathode electrode 343 through the TFEL 305. The organic film may include at least one of epoxy, acrylate, and urethane acrylate.

The color filter layer CFL is disposed on a surface of the second substrate 112 that faces the first substrate 111. The color filter layer CFL may include a black matrix 360 and color filters 370.

The black matrix 360 may be disposed on the second substrate 112. The black matrix 360 may be disposed to overlap the pixel defining film 344, but may not overlap the first, second, and third subpixels PX1, PX2, and PX3. The black matrix 360 may include a black pigment or an opaque metal material capable of blocking the transmission of light without transmitting light therethrough.

The color filters 370 may be disposed to overlap the first, second, and third subpixels PX1, PX2, and PX3. A first color filter 371 may be disposed to overlap the first subpixel PX1, a second color filter 372 may be disposed to overlap the second subpixel PX2, and a third color filter 373 may be disposed to overlap the third subpixel PX3. In such an embodiment, the first color filter 371 may be a first-color light transmitting filter for transmitting light of a first color, the second color filter 372 may be a second-color light transmitting filter for transmitting light of a second color, and the third color filter 373 may be a third-color light transmitting filter for transmitting light of a third color. In one embodiment, for example, the first, second, and third colors may be a red color, a green color, and a blue color, respectively, but the disclosure is not limited thereto. The peak wavelength range of red light passing through the first color filter 371 may be about 620 nm to 750 nm, the peak wavelength range of green light passing through the second color filter 372 may be about 500 nm to 570 nm, and the peak wavelength range of blue light passing through the third color filter 373 may be about 450 nm to 490 nm.

The boundaries between the color filters 370 may overlap the black matrix 360. Accordingly, the black matrix 360 may effectively prevent light emitted from the light-emitting layer 342 of one subpixel from entering into the color filter 370 of another subpixel to cause color mixing.

An overcoat layer may be disposed on the color filters 370 to planarize height differences caused by the color filters 370 and the black matrix 360. Alternatively, the overcoat layer may be omitted.

The wavelength conversion layer QDL is disposed on the color filter layer CFL. The wavelength conversion layer QDL may include a first capping layer 351, a first wavelength conversion layer 352, a second wavelength conversion layer 353, a third wavelength conversion layer 354, a second capping layer 355, an interlayer organic film 356, and a third capping layer 357.

The first capping layer 351 may be disposed on the color filter layer CFL. The first capping layer 351 effectively prevents moisture or oxygen from infiltrating into the first, second, and third wavelength conversion layers 352, 353, and 354 through the color filter layer CFL. The first capping layer 351 may include or be formed as an inorganic film including, for example, silicon nitride, aluminum nitride, zirconium nitride, titanium nitride, hafnium nitride, tantalum nitride, silicon oxide, aluminum oxide, or titanium oxide.

The first, second, and third wavelength conversion layers 352, 353, and 354 may be disposed on the first capping layer 351.

The first wavelength conversion layer 352 may be disposed to overlap the first subpixel PX1. The first wavelength conversion layer 352 may convert the blue light or the short-wavelength light (such as UV light) emitted from the light-emitting layer 342 of the first subpixel PX1 into light of the first color. In such an embodiment, the first wavelength conversion layer 352 may include a first base resin, a first wavelength shifter, and a first scatterer.

The first base resin may include or be formed of a material having high light transmittance and high dispersion characteristics for the first wavelength shifter and the first scatterer. In one embodiment, for example, the first base resin may include an organic material such as an epoxy resin, an acrylic resin, a cardo resin, or an imide resin.

The first wavelength shifter may convert or shift the wavelength of incident light. The first wavelength shifter may be quantum dots, quantum rods, or a phosphor. In an embodiment where the first wavelength shifter is quantum dots, which are a semiconductor nanocrystal material, may have a predetermined band gap depending on the composition and the size thereof. Thus, the first wavelength shifter may absorb incident light and may then emit light of a predetermined wavelength. The first wavelength shifter may have a core-shell structure including a core including nanocrystals and a shell surrounding the core. In such an embodiment, examples of the nanocrystals include group IV nanocrystals, group II-VI compound nanocrystals, group III-V compound nanocrystals, group IV-VI nanocrystals, or a combination thereof. The shell may serve as a passivation layer for preventing chemical deformation of the core to maintain semiconductor characteristics and/or as a charging layer for imparting the quantum dots electrophoretic characteristics. The shell may be a single- or multilayer film. In one embodiment, for example, the shell include an oxide of a metal or a non-metal, a semiconductor compound, or a combination thereof.

The first scatterer may have a refractive index different from a refractive index of the first base resin and may form an optical interface with the first base resin. In one embodiment, for example, the first scatterer may be light-scattering particles. In one embodiment, for example, the first scatterer may be metal oxide particles such as particles of titanium oxide ($TiO_2$), silicon oxide ($SiO_2$), zirconium oxide ($ZrO_2$), aluminum oxide ($Al_2O_3$), zinc oxide (ZnO), or tin oxide ($SnO_2$). In an alternative embodiment, the first scatterer may be organic particles such as particles of an acrylic resin or a urethane resin.

The first scatterer may scatterer incident light in random directions without substantially changing the wavelength of light passing through the first wavelength conversion layer 352. In such an embodiment, the path of light transmitting the first wavelength conversion layer 352 may be lengthened, and the color conversion efficiency of the first wavelength shifter may be improved.

The first wavelength conversion layer 352 may overlap the first color filter 371. Thus, some of the blue light or the short-wavelength light (such as UV light) provided by the first subpixel PX1 may pass through the first wavelength conversion layer 352 as it is without being converted into light of the first color by the first wavelength shifter. However, the blue light or the short-wavelength light (such as UV light) incident upon the first color filter 371 without being converted by the first wavelength conversion layer 352 is not allowed to pass through the first color filter 371. In such an embodiment, the light of the first color obtained by the first wavelength conversion layer 352 is allowed to pass through the first color filter 371 and may be emitted in the direction toward the second substrate 112.

The second wavelength conversion layer 353 may be disposed to overlap the second subpixel PX2. The second wavelength conversion layer 353 may convert the blue light or the short-wavelength light (such as UV light) emitted from the light-emitting layer 342 of the second subpixel PX2 into light of the second color. In such an embodiment, the second wavelength conversion layer 353 may include a second base resin, a second wavelength shifter, and a second scatterer. The second base resin, the second wavelength shifter, and the second scatterer of the second wavelength conversion layer 353 are substantially the same as the first base resin, the first wavelength shifter, and the first scatterer, respectively, of the first wavelength conversion layer 352, and thus, any repetitive detailed descriptions thereof will be omitted. In an embodiment where the first and second wavelength shifters are both quantum dots, the diameter of the second wavelength shifter may be smaller than the diameter of the first wavelength shifter. The second wavelength conversion layer 353 may overlap the second color filter 372.

Thus, some of the blue light or the short-wavelength light (such as UV light) provided by the second subpixel PX2 may pass through the second wavelength conversion layer 353 as it is without being converted into light of the second color by the second wavelength shifter. However, the blue light or the short-wavelength light (such as UV light) incident upon the second color filter 372 without being converted by the second wavelength conversion layer 353 is not allowed to pass through the second color filter 372. In such an embodiment, the light of the second color obtained by the second wavelength conversion layer 353 is allowed to pass through the second color filter 372 and may be emitted in the direction toward the second substrate 112.

The third wavelength conversion layer 354 may be disposed to overlap the third subpixel PX3. The third wavelength conversion layer 354 may convert the blue light or the short-wavelength light (such as UV light) emitted from the light-emitting layer 342 of the third subpixel PX3 into light of the third color. In such an embodiment, the third wavelength conversion layer 354 may include a third base resin, a third wavelength shifter, and a third scatterer. The third base resin, the third wavelength shifter, and the third scatterer of the third wavelength conversion layer 354 are substantially the same as the first base resin, the first wavelength shifter, and the first scatterer, respectively, of the first wavelength conversion layer 352, and thus, any repetitive detailed descriptions thereof will be omitted.

The third wavelength conversion layer 354 may overlap the third color filter 373. Thus, some of the blue light or the short-wavelength light (such as UV light) provided by the third subpixel PX3 may pass through the third wavelength conversion layer 354 as it is and may then be emitted in the direction toward the second substrate 112 through the third color filter 373.

The second capping layer 355 may be disposed on the first, second, and third wavelength conversion layers 352, 353, and 354 and parts of the first capping layer 351 that are exposed without being covered by the first, second, and third wavelength conversion layers 352, 353, and 354. The second capping layer 355 prevents moisture or oxygen from infiltrating into the first, second, and third wavelength conversion layers 352, 353, and 354. The second capping layer 355 may include an inorganic film including, for example, silicon nitride, aluminum nitride, zirconium nitride, titanium nitride, hafnium nitride, tantalum nitride, silicon oxide, aluminum oxide, or titanium oxide.

The interlayer organic film 356 may be disposed on the second capping layer 355. The interlayer organic film 356 may be a planarization layer for planarizing height differences formed by the first, second, and third wavelength conversion layers 352, 353, and 354. The interlayer organic film 356 may include an organic film including an acrylic resin, an epoxy resin, a phenolic resin, a polyamide resin, or a polyimide resin.

The third capping layer 357 may be disposed on the interlayer organic film 356. The third capping layer 357 may include an inorganic film using, for example, silicon nitride, aluminum nitride, zirconium nitride, titanium nitride, hafnium nitride, tantalum nitride, silicon oxide, aluminum oxide, or titanium oxide.

The filler member FL may be disposed between the TFEL 305, which is disposed on the first substrate 111, and the third capping layer 357, which is disposed on the second substrate 112. The filler member FL may include or be formed of a material having a buffer function. In one embodiment, for example, the filler member FL may include an organic film using an acrylic resin, an epoxy resin, a phenolic resin, a polyamide resin, or a polyimide resin.

In a non-display area of the display panel 110, an adhesive layer for bonding the first and second substrates 111 and 112 may be disposed, and in a plan view, the filler member FL may be surrounded by the adhesive layer.

According to an embodiment, as shown in FIG. 40, the first, second, and third subpixels PX1, PX2, and PX3 emit a blue light or short-wavelength light such as UV light, the light from the first subpixel PX1 may be converted into light of the first color through the first wavelength conversion layer 352 and may then be output through the first color filter, light from the second subpixel PX2 may be converted into light of the second color through the second wavelength conversion layer 353 and may then be output through the second color filter, and the light from the third subpixel PX3 may be output through the third wavelength conversion layer 354 and the third color filter. Accordingly, white light may be output from the display panel.

According to the embodiment, as shown in FIG. 40, the first, second, and third subpixels PX1, PX2, and PX3 are driven in a top emission manner and emit light in the direction toward the second substrate 112, such that a first heat dissipation film including an opaque material such as graphite or Al may be disposed on the first substrate 111.

The effects of the invention are not limited by the foregoing, and other various effects are anticipated herein.

Although some embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A display device comprising:
a display panel; and
a first sound generating device disposed below the display panel, wherein the first sound generating device generates a sound by causing the display panel to vibrate; and
a second sound generating device disposed below the display panel, wherein the second generating sound generating device generates a sound by causing the display panel to vibrate,
wherein
the first sound generating device includes:
a first vibrator which vibrates in a first direction, which is a thickness direction of the display panel; and
a second vibrator which vibrates in the first direction, and
the second sound generating device includes:
a third vibrator which vibrates in the first direction; and
a fourth vibrator which vibrates in a second direction, which is perpendicular to the first direction.

2. The display device of claim 1, wherein
the first sound generating device is disposed adjacent to an end of the display panel, and
the second sound generating device is disposed adjacent to an opposing end of the display panel.

3. The display device of claim 1, wherein the second sound generating device generates sounds by driving the third vibrator to cause the display panel to vibrate in the first direction and provides haptic feedback by driving the fourth vibrator to cause the display panel to vibrate in the second direction.

4. The display device of claim 1, wherein
in a high-frequency range, a sound pressure level of sounds output by the first vibrator is higher than a sound pressure level of sounds output by the second vibrator, and
in a low-frequency range, the sound pressure level of the sounds output by the second vibrator is higher than the sound pressure level of the sounds output by the first vibrator.

5. The display device of claim 1, wherein
the first and second vibrators overlap each other in the first direction,
the third and fourth vibrators overlap each other in the first direction,
the second vibrator is attached to a bottom surface of the first vibrator, and
the fourth vibrator is attached to a bottom surface of the third vibrator.

6. The display device of claim 1, wherein
the first and second vibrators overlap each other in the second direction, and
the third and fourth vibrators overlap each other in the second direction.

7. The display device of claim 6, wherein
the second vibrator is attached to a side surface of the first vibrator, and
the fourth vibrator is attached to a side surface of the second vibrator.

8. The display device of claim 6, wherein
the first and second vibrators are spaced apart from each other in the second direction, and
the third and fourth vibrators are spaced apart from each other in the second direction.

9. The display device of claim 1, wherein each of the first and third vibrators includes:
a first electrode to which a first driving electrode is applied;
a second electrode to which a second driving voltage is applied; and
a vibration layer which is disposed between the first and second electrodes and contracts or expands based on the first and second driving voltages.

10. The display device of claim 9, wherein
the first electrode includes a first stem electrode and first branch electrodes which are branched off from the first stem electrode, and
the second electrode includes a second stem electrode and second branch electrodes which are branched off from the second stem electrode and are parallel to the first branch electrodes.

11. The display device of claim 10, wherein the first branch electrodes and the second branch electrodes are alternately arranged in a direction parallel to an extending direction of the first stem electrode.

12. The display device of claim 1, further comprising:
a first sound circuit board connected to the first sound generating device; and
a second sound circuit board connected to the second sound generating device.

13. The display device of claim 12, further comprising:
a display circuit board disposed below the display panel, wherein the first and second sound circuit boards are connected to the display circuit board.

14. The display device of claim 13, wherein the display circuit board includes a sound driving unit which outputs first and second driving voltages to the first and second sound generating devices, respectively.

15. The display device of claim 14, further comprising:
a middle frame disposed below the display circuit board, wherein a first receiving hole, in which the first sound generating device is disposed, and a second receiving hole, in which the second sound generating device is disposed, are defined in the middle frame.

16. The display device of claim 15, further comprising:
a main circuit board disposed below the middle frame and including a main processor,
wherein the main processor outputs sound data or haptic data to the sound driving unit.

17. A method of driving a display device, the method comprising:
outputting sounds in a sound output mode by causing a display panel of the display device to vibrate in a first direction using first and second sound generating devices of the display device; and
providing haptic feedback in a haptic mode by causing the display panel to vibrate in a second direction, which is perpendicular to the first direction, using the second sound generating device.

18. The method of claim 17, wherein the outputting the sounds, comprises, in a stereo mode, causing first and second vibrators of the first sound generating device and a third vibrator of the second sound generating device to vibrate in the first direction.

19. The method of claim 18, wherein the outputting the sounds, comprises, in a mono mode, causing one of the first, second and third vibrators to vibrate in the first direction.

20. The method of claim 19, wherein the providing the haptic feedback, comprises causing a fourth vibrator of the second sound generating device to vibrate in the second direction.

* * * * *